United States Patent
Sheldon

(10) Patent No.: US 8,712,896 B2
(45) Date of Patent: Apr. 29, 2014

(54) TARGET TRADING SYSTEM AND METHOD

(76) Inventor: Adam Sheldon, Chicago, IL (US)

( * ) Notice: Subject to any disclaimer, the term of this patent is extended or adjusted under 35 U.S.C. 154(b) by 0 days.

(21) Appl. No.: 13/228,430

(22) Filed: Sep. 8, 2011

(65) Prior Publication Data

US 2013/0066802 A1    Mar. 14, 2013

(51) Int. Cl.
*G06Q 40/00* (2012.01)
(52) U.S. Cl.
USPC .............................. 705/36 R; 705/35; 705/37
(58) Field of Classification Search
USPC ........................................... 705/35, 37, 36 R
See application file for complete search history.

(56) References Cited

U.S. PATENT DOCUMENTS 8,001,029 B2 *  8/2011  Staub ........................... 705/36 T
2012/0116994 A1 * 5/2012  Michaud et al. ............ 705/36 R

* cited by examiner

*Primary Examiner* — Ojo Oyebisi
(74) *Attorney, Agent, or Firm* — Richards Patent Law P.C.

(57) ABSTRACT

A method of reaching one or more target positions in a user-directed trading system includes the steps of: identifying target positions, wherein each target position includes a tradable instrument identifier and a target quantity; for at least one of the target positions, identifying a corresponding initial position including a current quantity associated with the tradable instrument identifier; and triggering the trading system to identify orders required to reach at least one target position from at least one initial position. A user-directed trading system includes: a user interface through which a user identifies target positions, wherein each target position includes a tradable instrument identifier and a target quantity; for at least one of the target positions, identifies a corresponding initial position including a current quantity associated with the tradable instrument identifier; and identifies orders required to reach at least one target position from at least one initial position.

22 Claims, 56 Drawing Sheets

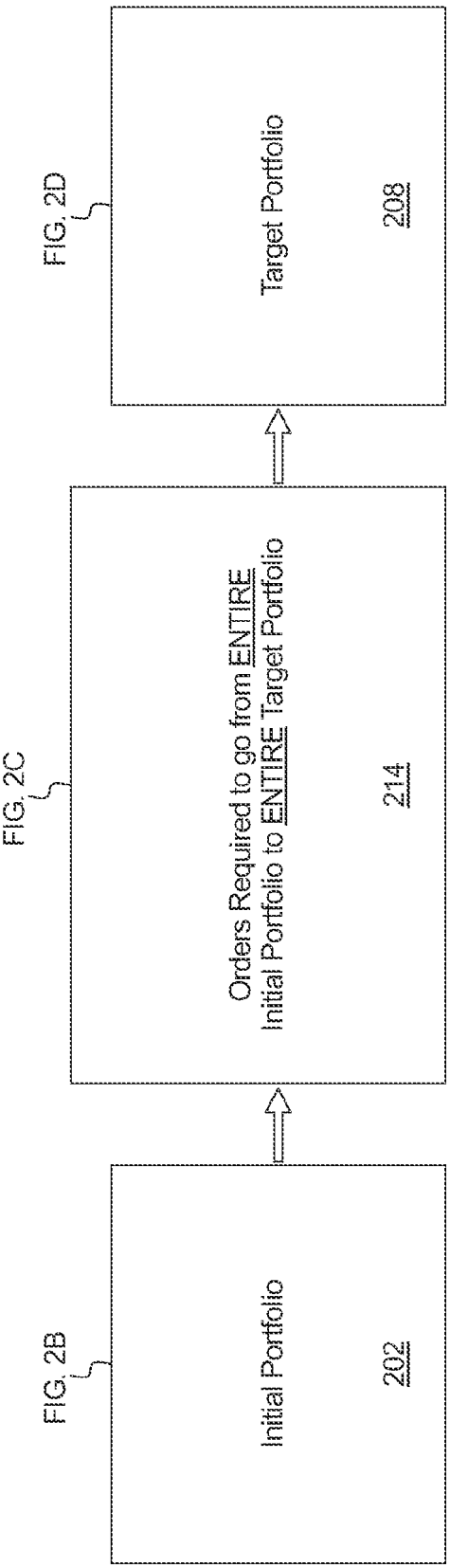

FIG. 2B

204 Initial Portfolio

| 220 | 222 Tradable Instrument Identifier (Name / Symbol / etc) | 224 Side of Initial Position | 226 Quantity (# Shares / # Contracts / etc) | 228 Price | 230 Absolute (Currency Value) |
|---|---|---|---|---|---|
| Initial Position 1 | AAA | Long | 400 | $ 51.27 | $ 20,508 |
| Initial Position 2 | BBB | Short | (1,100) | $ 8.79 | $ 9,669 |
| Initial Position 3 | CCC | Long | 800 | $ 13.44 | $ 10,752 |
| Initial Position 4 | DDD | Long | 1,900 | $ 8.19 | $ 15,561 |
| Initial Position 5 | EEE | Long | 800 | $ 22.76 | $ 18,208 |
| Initial Position 6 | FFF | Long | 200 | $ 109.44 | $ 21,888 |
| Initial Position 7 | GGG | Long | 100 | $ 78.99 | $ 7,899 |
| Initial Position 8 | HHH | Long | 200 | $ 14.87 | $ 2,974 |
| Initial Position 9 | III | Long | 600 | $ 30.66 | $ 18,396 |
| Initial Position 10 | JJJ | Short | (900) | $ 33.99 | $ 30,591 |
| Initial Position 11 | KKK | Long | 1,900 | $ 11.66 | $ 22,154 |
| Initial Position 12 | LLL | Long | 1,000 | $ 4.60 | $ 4,600 |
| | | | | | |
| | | | | | |
| | | | | | |
| | | | 5,900 | | $ 183,200 |

FIG. 2C

Orders Required to go from ENTIRE Initial Portfolio to ENTIRE Target Portfolio

| 222 Tradable Instrument Identifier (Name / Symbol / etc) | Portfolio Membership | | Order Components Required (to reach Target Portfolio from Initial Portfolio) | | | Optional Order Components 248 | | 250 |
|---|---|---|---|---|---|---|---|---|
| | 238 In Initial Portfolio? | 240 In Target Portfolio? | 242 Order Type(s) Required (Buy / Cover / Sell / Short) | 244 Quantity (# Shares / # Contracts / Value / etc) | 246 Type of Order (Limit / Market / etc) | Optional Order Condition 1 | Optional Order Condition 2 | Type of Transaction Required |
| AAA | YES | NO | Sell | (400) | Limit | (none) | (none) | Liquidate |
| BBB | YES | NO | Cover | 1,100 | Limit | (none) | (none) | Liquidate |
| CCC | YES | YES | — | — | — | — | — | None |
| DDD | YES | YES | Sell | (600) | Market | (none) | (none) | Liquidate |
| EEE | YES | YES | Sell | (400) | Market | (none) | (none) | Liquidate |
| FFF | YES | YES | Sell | (100) | Market | (none) | (none) | Liquidate |
| GGG | YES | YES | — | — | — | — | — | None |
| HHH | YES | YES | Buy | 500 | Market | (none) | (none) | Add |
| III | YES | YES | Sell | (300) | Limit | Non-Display | (none) | Liquidate |
| JJJ | YES | YES | Cover, Buy | 1,200 | Limit | (none) | (none) | Reverse |
| KKK | YES | YES | Sell | (1,000) | Limit | ICE | (none) | Liquidate |
| LLL | YES | YES | Sell Short | (3,200) | Limit | — | — | Reverse |
| MMM | NO | YES | Buy | 500 | Limit | AON | (none) | Add |
| NNN | NO | YES | Short | (1,000) | Limit | FOK | (none) | Add |
| OOO | NO | YES | Short | (700) | Limit | FOK | (none) | Add |

FIG. 2D

222 — Target Portfolio 210

| 232 Target Positions | Tradable Instrument Identifier (Name / Symbol / etc) | 234 Side of Target Position | 236 Quantity (# Shares / # Contracts / etc) | 228 Price | 230 Absolute (Currency Value) |
|---|---|---|---|---|---|
| Target Position 1 | CCC | Long | 800 | $ 13.44 | $ 10,752 |
| Target Position 2 | DDD | Long | 1,300 | $ 8.19 | $ 10,647 |
| Target Position 3 | EEE | Long | 400 | $ 22.76 | $ 9,104 |
| Target Position 4 | FFF | Long | 100 | $ 109.44 | $ 10,944 |
| Target Position 5 | GGG | Long | 100 | $ 78.99 | $ 7,899 |
| Target Position 6 | HHH | Long | 700 | $ 14.87 | $ 10,409 |
| Target Position 7 | III | Long | 300 | $ 30.66 | $ 9,198 |
| Target Position 8 | JJJ | Long | 300 | $ 33.99 | $ 10,197 |
| Target Position 9 | KKK | Long | 900 | $ 11.66 | $ 10,494 |
| Target Position 10 | LLL | Short | (2,200) | $ 4.60 | $ 10,120 |
| Target Position 11 | MMM | Long | 500 | $ 20.00 | $ 10,000 |
| Target Position 12 | NNN | Short | (1,000) | $ 40.00 | $ 40,000 |
| Target Position 13 | OOO | Short | (700) | $ 27.50 | $ 19,250 |
| | | | 1,500 | | $ 149,764 |

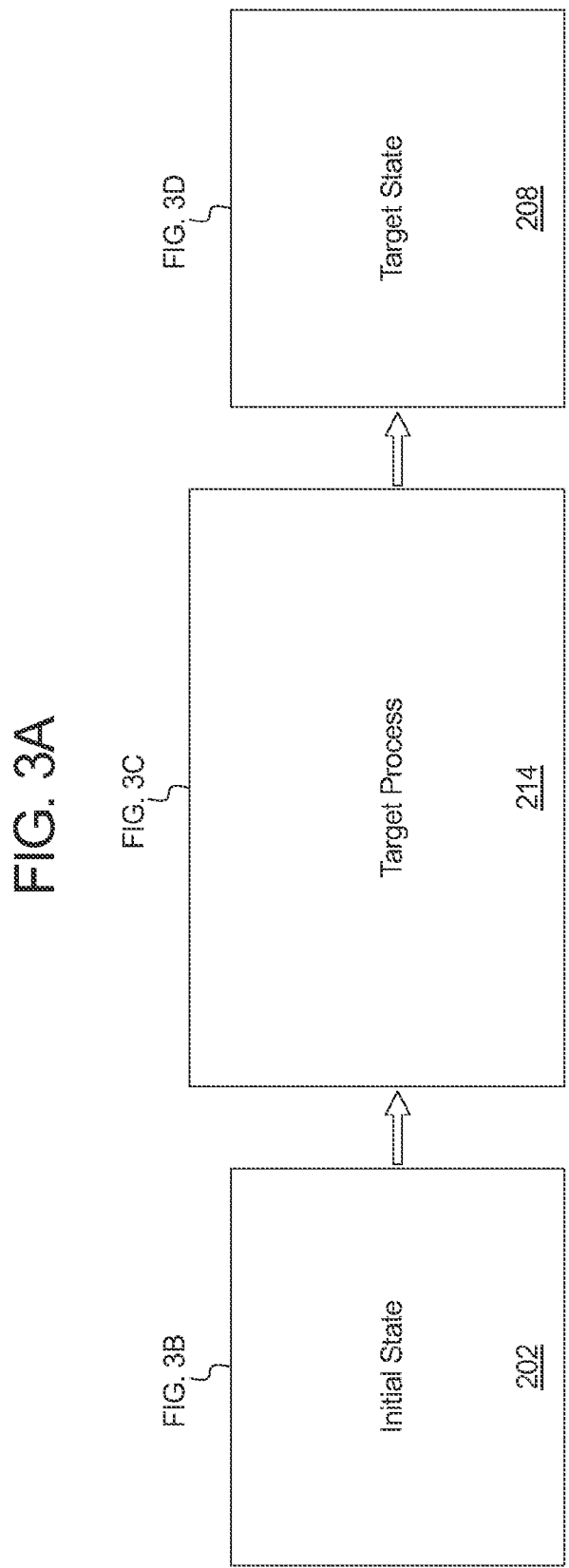

FIG. 3B

Initial State 202

Initial Portfolio 204

| 220<br>Initial Positions (IP) | 222<br>Identifier<br>(Name / Symbol / etc) | 224<br>Side of Initial Position | Initial Quantity<br>(# Shares / #<br>Contracts / Value<br>/ etc) 226 | 228<br>Price | 230<br>Currency Value |
|---|---|---|---|---|---|
| Initial Position IP-1 | Tradable Instrument IP-1 | Side IP-1 | Quantity IP-1 | Price IP-1 | Value IP-1 |
| Initial Position IP-2 | Tradable Instrument IP-2 | Side IP-2 | Quantity IP-2 | Price IP-2 | Value IP-2 |
| Initial Position IP-3 | Tradable Instrument IP-3 | Side IP-3 | Quantity IP-3 | Price IP-3 | Value IP-3 |
| Initial Position IP-... | Tradable Instrument IP-... | Side IP-... | Quantity IP-... | Price IP-... | Value IP-... |
| Initial Position IP-... | Tradable Instrument IP-... | Side IP-... | Quantity IP-... | Price IP-... | Value IP-... |
| Initial Position IP-N | Tradable Instrument IP-N | Side IP-N | Quantity IP-N | Price IP-N | Value IP-N |

Other Initial Conditions 206

Other Initial Condition 1
Other Initial Condition 2
Other Initial Condition 3
Other Initial Condition ...
Other Initial Condition ...
Other Initial Condition ...
Other Initial Condition N

FIG. 3C

Target Process 214

Orders Required for Target Process 216

| 222 Identifier (Name / Symbol / etc) | Portfolio Membership | | Orders Required (to reach Target Portfolio from Initial Portfolio) | | | Optional Order Conditions 248 | | 250 Type of Transaction Required |
|---|---|---|---|---|---|---|---|---|
| | 238 In Initial Portfolio? | 240 In Target Portfolio? | 242 Order (Buy / Cover / Sell / Short) | 244 Quantity (# Shares / # Contracts / Value / etc) | 246 Order Type (Limit / Market / etc) | Optional Order Condition 1 | Optional Order Condition 2 | |
| | | | | | | | | |

Other Processes 218

FIG. 3D

Target State 208

Target Portfolio 210

| 232 | 222 | 234 | Target Quantity (# Shares / # Contracts / Value / etc) 236 | 228 | 230 |
|---|---|---|---|---|---|
| Target Positions (TP) | Identifier (Name / Symbol / etc) | Side of Target Position | | Price | Currency Value |
| Target Position TP-1 | Tradable Instrument TP-1 | Side TP-1 | Quantity TP-1 | Price TP-1 | Value TP-1 |
| Target Position TP-2 | Tradable Instrument TP-2 | Side TP-2 | Quantity TP-2 | Price TP-2 | Value TP-2 |
| Target Position TP-3 | Tradable Instrument TP-3 | Side TP-3 | Quantity TP-3 | Price TP-3 | Value TP-3 |
| Target Position TP-... | Tradable Instrument TP-... | Side TP-... | Quantity TP-... | Price TP-... | Value TP-... |
| Target Position TP-... | Tradable Instrument TP-... | Side TP-... | Quantity TP-... | Price TP-... | Value TP-... |
| Target Position TP-N | Tradable Instrument TP-N | Side TP-N | Quantity TP-N | Price TP-N | Value TP-N |

Other Target Conditions 212

Other Target Condition 1
Other Target Condition 2
Other Target Condition 3
Other Target Condition ...
Other Target Condition ...
Other Target Condition ...
Other Target Condition N

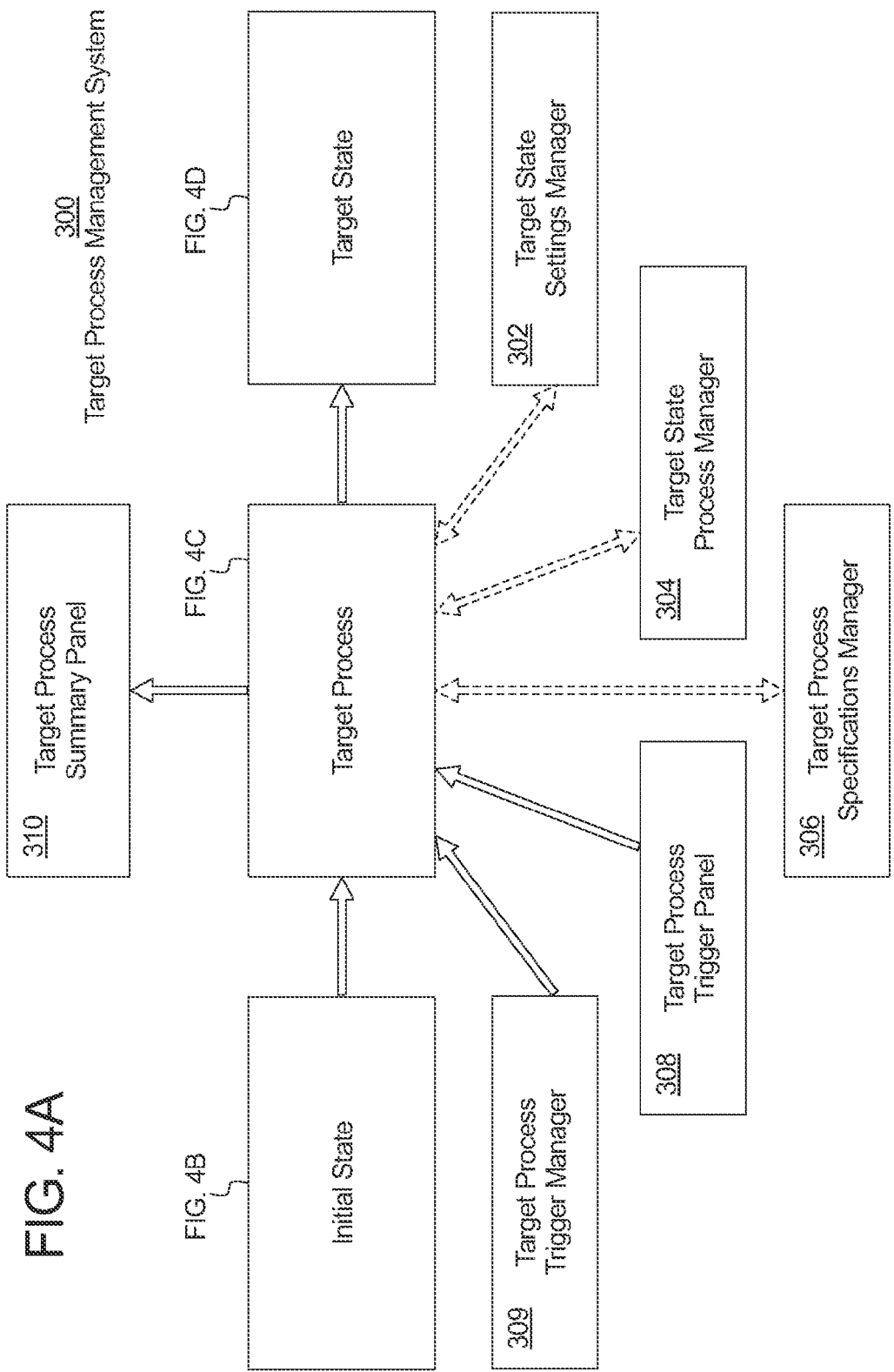

FIG. 4B

Initial State

Initial Portfolio

| Initial Positions (IP) | Identifier (Name / Symbol / etc) | Side of Initial Position | Initial Quantity (# Shares / # Contracts / Value / etc) | Price | Currency Value |
|---|---|---|---|---|---|
| Initial Position IP-1 | Tradable Instrument IP-1 | Side IP-1 | Quantity IP-1 | Price IP-1 | Value IP-1 |
| Initial Position IP-2 | Tradable Instrument IP-2 | Side IP-2 | Quantity IP-2 | Price IP-2 | Value IP-2 |
| Initial Position IP-3 | Tradable Instrument IP-3 | Side IP-3 | Quantity IP-3 | Price IP-3 | Value IP-3 |
| Initial Position IP-... | Tradable Instrument IP-... | Side IP-... | Quantity IP-... | Price IP-... | Value IP-... |
| Initial Position IP-... | Tradable Instrument IP-... | Side IP-... | Quantity IP-... | Price IP-... | Value IP-... |
| Initial Position IP-... | Tradable Instrument IP-... | Side IP-... | Quantity IP-... | Price IP-... | Value IP-... |
| Initial Position IP-N | Tradable Instrument IP-N | Side IP-N | Quantity IP-N | Price IP-N | Value IP-N |

Other Initial Conditions

Other Initial Condition 1
Other Initial Condition 2
Other Initial Condition 3
Other Initial Condition ...
Other Initial Condition ...
Other Initial Condition ...
Other Initial Condition N

FIG. 4C

Target Process

Orders Required for Target Process

| Identifier (Name / Symbol / etc) | Portfolio Membership | | Orders Required (to reach Target Portfolio from Initial Portfolio) | | | Optional Order Conditions | | Type of Transaction Required |
|---|---|---|---|---|---|---|---|---|
| | In Initial Portfolio? | In Target Portfolio? | Order (Buy / Cover / Sell / Short) | Quantity (# Shares / # Contracts / Value / etc) | Order Type (Limit / Market / etc) | Optional Order Condition 1 | Optional Order Condition 2 | |

Other Processes

FIG. 4D

Target State

Target Portfolio

| Target Positions (TP) | Identifier (Name / Symbol / etc) | Side of Target Position | Target Quantity (# Shares / # Contracts / Value / etc) | Price | Currency Value |
|---|---|---|---|---|---|
| Target Position TP-1 | Tradable Instrument TP-1 | Side TP-1 | Quantity TP-1 | Price TP-1 | Value TP-1 |
| Target Position TP-2 | Tradable Instrument TP-2 | Side TP-2 | Quantity TP-2 | Price TP-2 | Value TP-2 |
| Target Position TP-3 | Tradable Instrument TP-3 | Side TP-3 | Quantity TP-3 | Price TP-3 | Value TP-3 |
| Target Position TP-... | Tradable Instrument TP-... | Side TP-... | Quantity TP-... | Price TP-... | Value TP-... |
| Target Position TP-... | Tradable Instrument TP-... | Side TP-... | Quantity TP-... | Price TP-... | Value TP-... |
| Target Position TP-... | Tradable Instrument TP-... | Side TP-... | Quantity TP-... | Price TP-... | Value TP-... |
| Target Position TP-N | Tradable Instrument TP-N | Side TP-N | Quantity TP-N | Price TP-N | Value TP-N |

Other Target Conditions

Other Target Condition 1
Other Target Condition 2
Other Target Condition 3
Other Target Condition ...
Other Target Condition ...
Other Target Condition ...
Other Target Condition N

Trading Platform Order Entry & Variable Condition: 336

☐ Set Default Volume used for orders to a Minimum or Maximum Value, a Calculated Value, a Default Value, a Previously Existing Value or Variable, or another Value or Variable  [▸]

☐ Set Next Order size to a Minimum or Maximum Value, a Calculated Value, a Default Value, a Previously Existing Value or Variable, or another Value or Variable  [▸]

☐ Set whether Order Entry Settings are Applied/Unapplied for future orders

☐ Iceberg  ☐ Stop Limit  ☐ IOC  ☐ MOO  ☐ MIT  ☐ OCO  ☐ Trailing Stop

☐ Block  ☐ Stop Market  ☐ MOC  ☐ FOK  ☐ LIT  ☐ OSO  ☐ (other)

[ Cancel Changes ]    [ Save Conditions as part of Target State ]

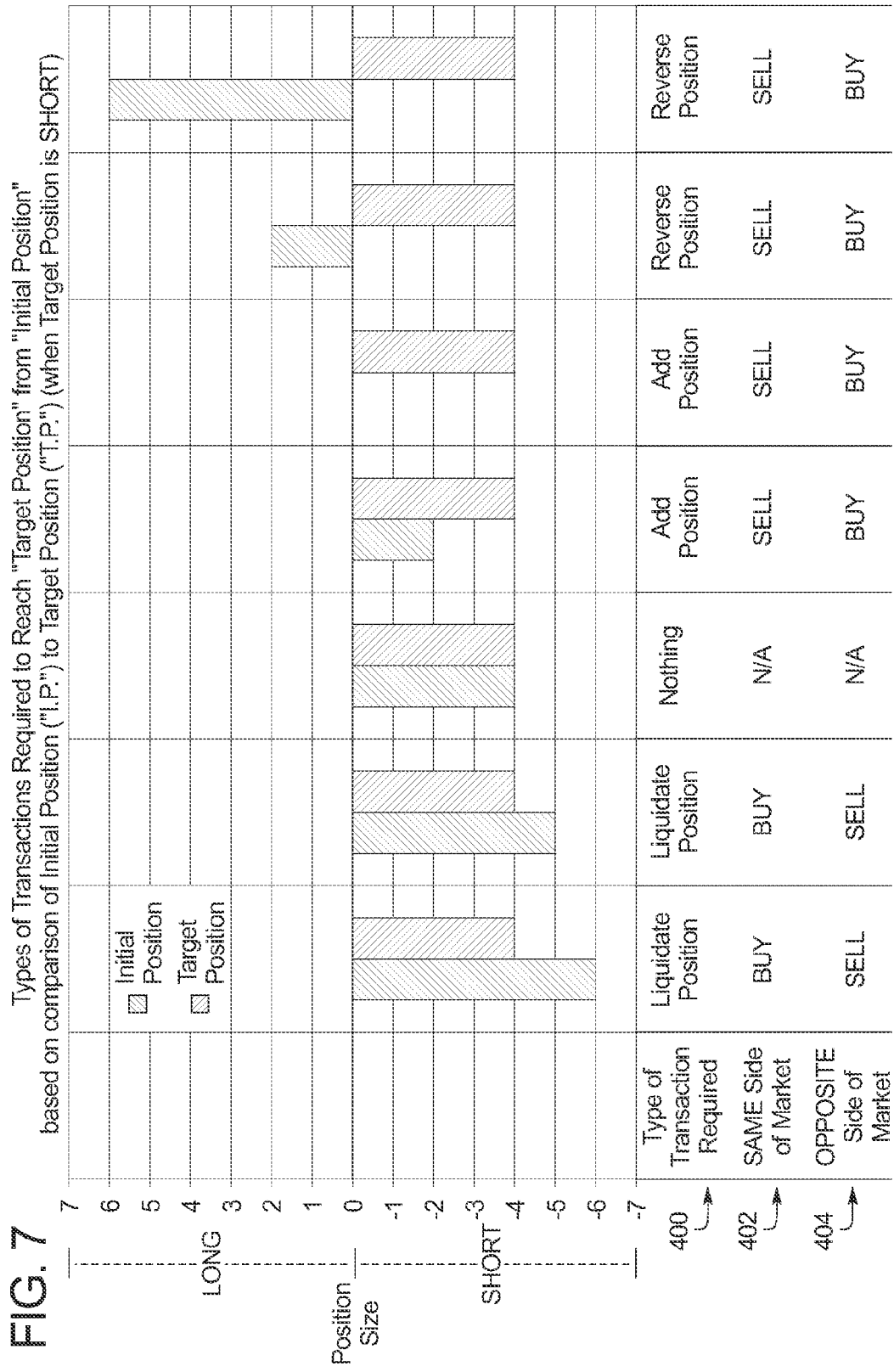

FIG. 8

Types of Transactions Required to Reach "Target Position" from "Initial Position" based on comparison of Initial Position ("I.P.") to Target Position ("T.P.") (when Target Position is FLAT)

| Position Size | | | | | | | | |
|---|---|---|---|---|---|---|---|---|
| 7 | | | | | | | | |
| 6 | | | | | | | | |
| 5 | | | | | | | | |
| 4 | | | | | | | | |
| 3 | | | | | | | | |
| 2 | | | | | | | | |
| 1 | | | | | | | | |
| 0 | | | | | | | | |
| -1 | | | | | | | | |
| -2 | | | | | | | | |
| -3 | | | | | | | | |
| -4 | | | | | | | | |
| -5 | | | | | | | | |
| -6 | | | | | | | | |
| -7 | | | | | | | | |
| 400 Type of Transaction Required | Liquidate Position | Liquidate Position | Liquidate Position | Nothing | Liquidate Position | Liquidate Position | Liquidate Position |
| 402 SAME Side of Market | BUY | BUY | BUY | N/A | SELL | SELL | SELL |
| 404 OPPOSITE Side of Market | SELL | SELL | SELL | N/A | BUY | BUY | BUY |

Legend: ▨ Initial Position, ▥ Target Position

LONG (positive), SHORT (negative)

FIG. 9

Type of Transactions Required to Reach "Target Position" from "Initial Position" based on comparison of Initial Position ("I.P.") to Target Position ("T.P.")

| Target Position | Type of Transaction: Reverse Position | Add Position | Liquidate Position | No Action |
|---|---|---|---|---|
| LONG or FLAT | any SHORT I.P. with LONG T.P. | FLAT or LESS LONG I.P. than LONG T.P. | LONGER I.P. than LONG or FLAT T.P. | I.P. = T.P. |
| SHORT or FLAT | any LONG I.P. with SHORT T.P. | FLAT or LESS SHORT I.P. than SHORT T.P. | SHORTER I.P. than SHORT or FLAT T.P. | I.P. = T.P. |

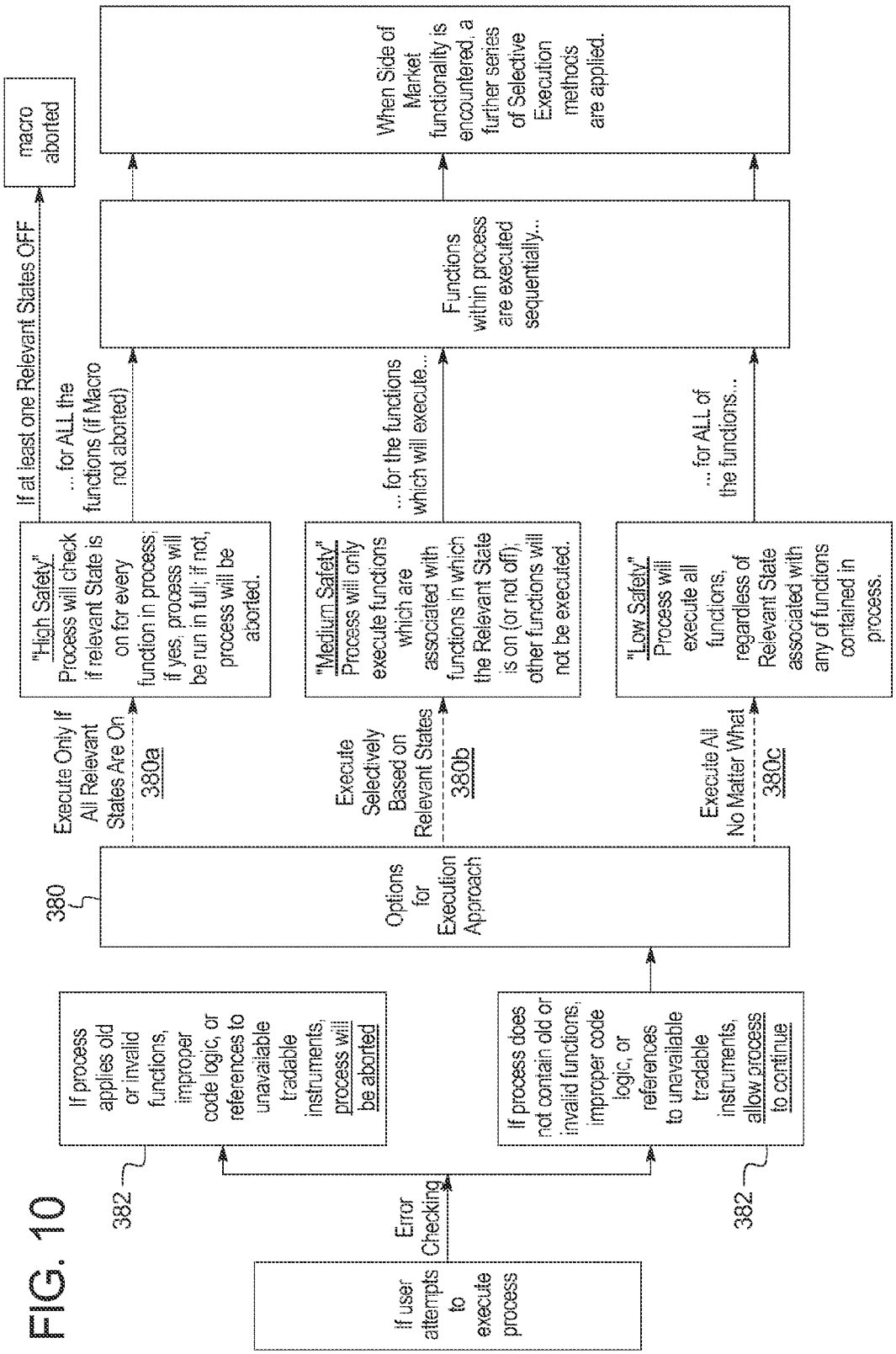

FIG. 11B

| Contracts | |
|---|---|
| Contract 1 | |
| Contract 2 | |
| Contract 3 | |

| Contract Functions | |
|---|---|
| Function | Variable Value |
| Volume, Liquidation | - |
| Raise Step On Volume Ladder | - |
| Lower Step On Volume Ladder | - |
| Next Volume: Position | - |
| Next Volume: Double Position | - |
| Next Volume: Max Order | - |
| Clear Special Volume Assignment | - |
| Trade to Zero Position | - |
| SAVE Position on Volume Ladder | - |
| RECALL Position on Volume Ladder | - |
| Target | - |
| Next Volume: Position To Target | - |
| Trade to Target Position | - |
| SET Target Position = 0 | - |
| SET Target Position = Target Position + Offset | - |
| SET Target Position = Target Position - Offset | - |
| Raise Target Position | - |
| Lower Target Position | - |

FIG. 11C

| | |
|---|---|
| Raise Target Position Offset | - |
| Lower Target Position Offset | - |
| SAVE Target Position | - |
| RECALL Target Position | - |
| Side Selection, Selective Execution | - |
| ASSESS VARIABLES | - |
| Choose SAME Side (as CURRENT POSITION) | - |
| Choose SAME Side (to Reverse towards Target) | - |
| Choose SAME Side (to Add towards Target) | - |
| Choose SAME Side (to Liquidate towards Target) | - |
| Choose SAME Side (to Reverse, Add towards Target) | - |
| Choose SAME Side (to Reverse, Liquidate towards Target) | - |
| Choose SAME Side (to Add, Liquidate towards Target) | - |
| Choose SAME Side (to Reverse, Add, Liquidate towards Target) | - |
| Choose OPPOSITE Side (as CURRENT POSITION) | - |
| Choose OPPOSITE Side (to Reverse towards Target) | - |
| Choose OPPOSITE Side (to Add towards Target) | - |
| Choose OPPOSITE Side (to Liquidate towards Target) | - |
| Choose OPPOSITE Side (to Reverse, Add towards Target) | - |
| Choose OPPOSITE Side (to Reverse, Liquidate towards Target) | - |
| Choose OPPOSITE Side (to Add, Liquidate towards Target) | - |
| Choose OPPOSITE Side (to Reverse, Add, Liquidate towards Target) | - |
| ALLOW ALL FUNCTIONS | - |
| Macro Tracker | |

FIG. 11D

| Macros | | | |
|---|---|---|---|
| Macro 7 | | | Name/Rename |
| MacroName | | | |
| Macro 1 | Safety_MEDIUM | ⌄ | Create Macro |
| Macro 2 | Safety_MEDIUM | ⌄ | |
| Macro 3 | Safety_MEDIUM | ⌄ | |
| Macro 4 | Safety_MEDIUM | ⌄ | |
| Macro 5 | Safety_MEDIUM | ⌄ | Copy Macro |
| Macro 6 | Safety_MEDIUM | ⌄ | |
| Macro 7 | Safety_MEDIUM | ⌄ | |
| Macro 8 | Safety_MEDIUM | ⌄ | |
| Macro 9 | Safety_MEDIUM | ⌄ | Delete Macro |
| Macro 10 | Safety_MEDIUM | ⌄ | |
| | 396 | | Cumulative (Actual) Execution Approach |
| Macro 1 | | ⌄ | |
| Insert Call to this Macro | | Add Call to this Macro | |

FIG. 11E

| Macro Functions | | | |
|---|---|---|---|
| Contact | Function | Variable Value | Macro |
| Contract 1 | SAVE Target Position | - | |
| Contract 1 | SET Target Position = 0 | - | |
| Contract 1 | Raise Target Position | - | |
| Contract 1 | Raise Target Position | - | |
| Contract 1 | Raise Target Position | - | |
| Contract 1 | ASSESS VARIABLES | - | |
| Contract 1 | Choose SAME Side (to Reverse, Add towards Target) | - | |
| Contract 1 | Next Volume: Position To Target | - | |
| Contract 1 | Buy Join | - | |
| Contract 1 | Sell Join | - | |
| Contract 1 | Clear Special Volume Assignment | - | |
| Contract 1 | RECALL Target Position | - | |

398

[ Move Down ] [ Move Up ]

[ Macro Validity Report ] [ Print Macros to File ] [ Close ]

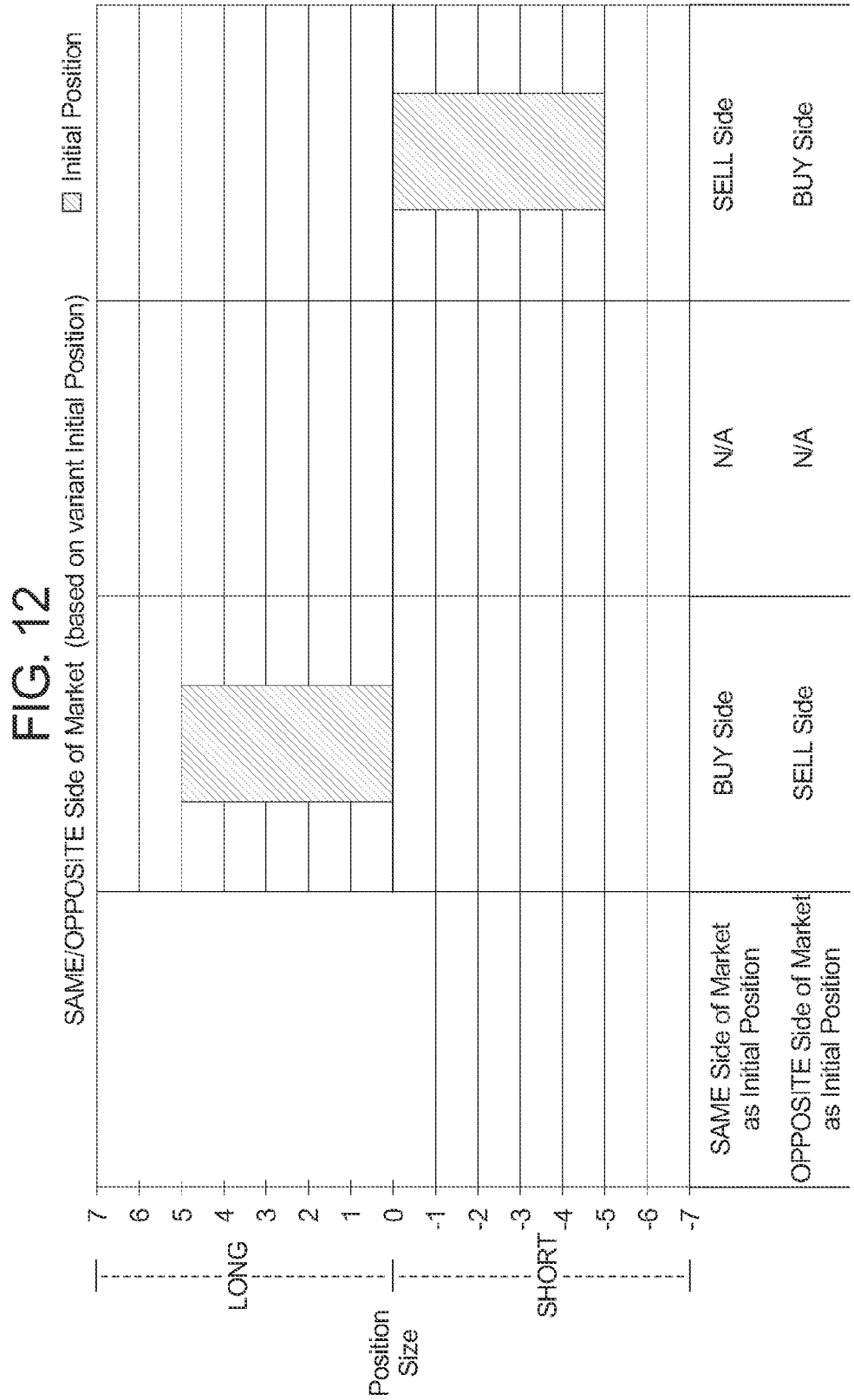

FIG. 13

| Function | Current Position: | What happens if user runs a Function to ... | | |
|---|---|---|---|---|
| | | LONG | SHORT | FLAT |
| Choose SAME Side (as CURRENT POSITION) | | Buy Functions Allowed | Sell Functions Allowed | NO Functions Allowed |
| Choose OPPOSITE Side (as CURRENT POSITION) | | Sell Functions Allowed | Buy Functions Allowed | NO Functions Allowed |

When "Buy Functions Allowed", Sell Functions are Disallowed
When "Sell Functions Allowed", Buy Functions are Disallowed
When "NO Functions Allowed", Buy Functions are Disallowed, Sell Functions are Disallowed

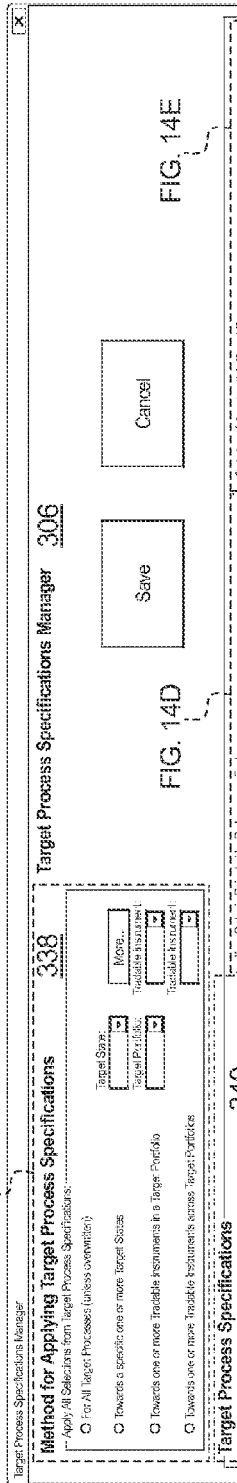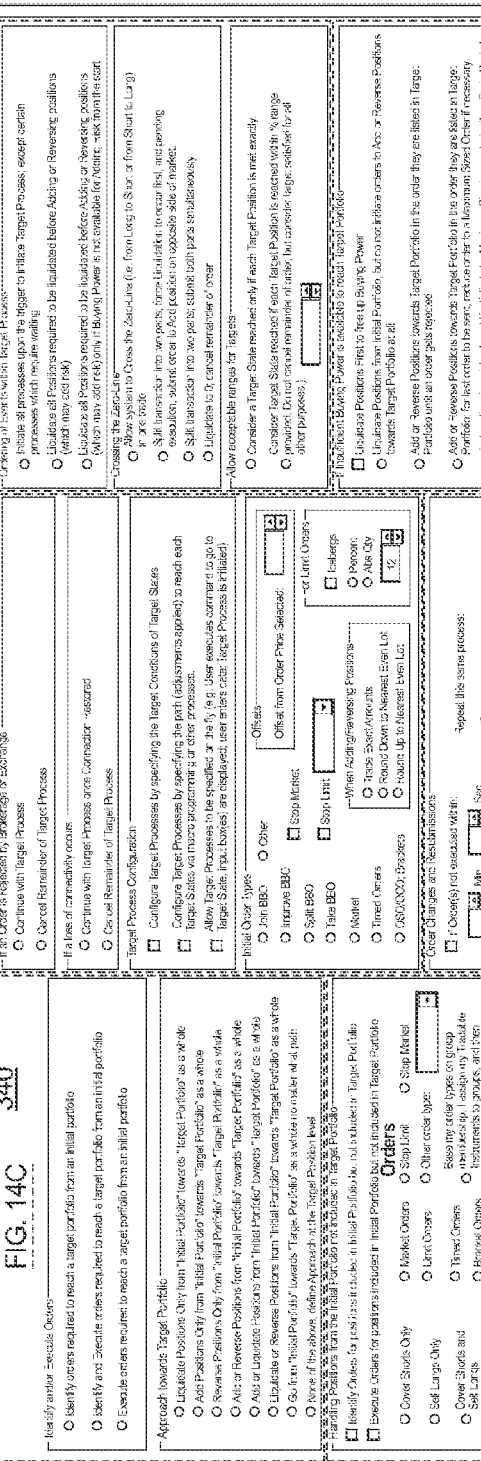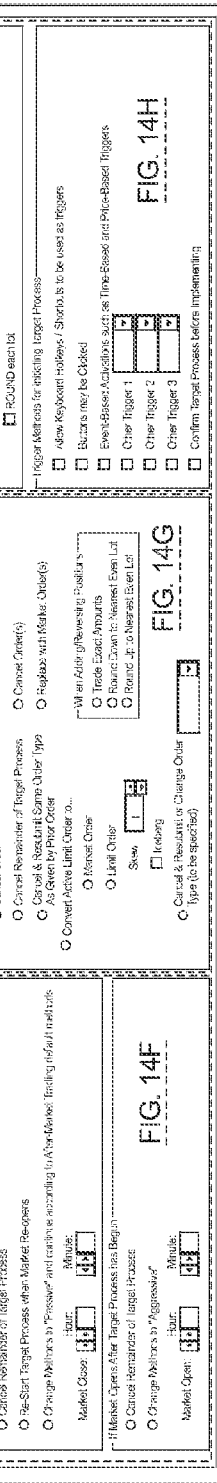

FIG. 14C

Target Process Specifications 340

Identify and/or Execute Orders

○ Identify orders required to reach a target portfolio from an initial portfolio
○ Identify and Execute orders required to reach a target portfolio from an initial portfolio
○ Execute orders required to reach a target portfolio from an initial portfolio

341

Approach towards Target Portfolio

○ Liquidate Positions Only from "Initial Portfolio" towards "Target Portfolio" as a whole
○ Add Positions Only from "Initial Portfolio" towards "Target Portfolio" as a whole
○ Reverse Positions Only from "Initial Portfolio" towards "Target Portfolio" as a whole
○ Add or Reverse Positions from "Initial Portfolio" towards "Target Portfolio" as a whole
○ Add or Liquidate Positions from "Initial Portfolio" towards "Target Portfolio" as a whole
○ Liquidate or Reverse Positions from "Initial Portfolio" towards "Target Portfolio" as a whole
○ Go from "Initial Portfolio" towards "Target Portfolio" as a whole no matter what path
○ None of the above, define Approach at the Target Position level

--- Handling Positions from the Initial Portfolio not included in Target Portfolio ---

☐ Identify Orders for positions included in Initial Portfolio but not included in Target Portfolio ☐ Execute Orders for positions included in Initial Portfolio but not included in Target Portfolio

Orders 343

○ Cover Shorts Only          ○ Market Orders          ○ Stop Limit          ○ Stop Market ○ Sell Longs Only            ○ Limit Orders           ○ Other order type: [    ]

○ Cover Shorts and           ○ Timed Orders           ○ Base my order types on group
  Sell Longs                                            membership. I assign my Tradable
                             ○ Bracket Orders           Instruments to groups, and then
                                                        assign order types to Groups directly.

--- If Market Closes before Target State has been reached --- 344

○ Cancel Remainder of Target Process

○ Re-Start Target Process when Market Re-opens

○ Change Methods to "Passive" and continue according to After-Market Trading default methods Hour:    Minute:
Market Close: [  ]  [  ]

--- If Market Opens After Target Process has Begun --- 346

○ Cancel Remainder of Target Process

○ Change Methods to "Aggressive"

Hour:    Minute:
Market Open: [  ]  [  ]

FIG. 16

Target Process Trigger Manager
309

Long Energy & Short Financial Stocks (Small Size)

Long Energy Stocks (Small Size)
Long Energy Stocks (Large Size)
Short Financial Stocks (Small Size)
Short Financial Stocks (Large Size)
Long Energy & Short Financial Stocks (Small Size)
Long Energy & Short Financial Stocks (Large Size)
Long Utility Stocks
Long Dividend Stocks
Long Commodity ETFs
Long Energy, Utility & Dividend Stocks, Short Financials  *Default*

Event-Based Triggers Setup
370

| | Tradable Instrument / Index / etc | Mathematical Operator | Price |
|---|---|---|---|
| ☐ Price | ▼ | ▼ | ▼ |

| | Mathematical Operator | Time |
|---|---|---|
| ☐ Time | ▼ | ▼ |

☐ Other

AND        OR

Event-Based Trigger Rules Applied to Trigger Target Process
372

| ARCA Oil Index | >= | $1350.00 |
| OR | | |
| TIME | >= | 3:55:00 EST |

Cancel        Apply to Selected Target State

FIG. 17A

Target Process Summary Panel — 310

Initial State

Initial Portfolio:

| | | |
|---|---|---|
| XOM | 400 Shares | Long |
| MUR | 100 Shares | Long |
| NE | 400 Shares | Long |
| RIG | 800 Shares | Long |
| SUN | 1,200 Shares | Long |
| CVS | 300 Shares | Short |
| TOT | 200 Shares | Long |
| BAC | 200 Shares | Short |
| JPM | 600 Shares | Short |

Open Orders: 406

| | | | |
|---|---|---|---|
| Buy | 200 | XOM | 70.65 |
| Sell | 100 | RIG | 90.22 |
| Sell | 300 | SUN | 60.34 |
| Short | 200 | BAC | 24.47 |

Target State

Target Portfolio:

| | | |
|---|---|---|
| XOM | 900 Shares | Long |
| MUR | 300 Shares | Long |
| NE | 400 Shares | Long |
| RIG | 600 Shares | Long |
| SUN | 400 Shares | Long |
| COG | 300 Shares | Long |
| COP | 200 Shares | Long |
| CVS | 300 Shares | Long |
| HES | 500 Shares | Long |
| TOT | 300 Shares | Long |
| BAC | 500 Shares | Short |
| JPM | 500 Shares | Short |
| C | 500 Shares | Short |

Open Orders: 408 (no working orders)

Other Target Conditions:
Long Buying Power Limit = 20
Short Buying Power Limit = 10
Set Volume to Minimum
Open Energy/Finan. Workspce
Move Mouse to (1280, 800)
Hotkeys turned Off

Orders Identified as part of Target Process

List of Orders Required:

| | |
|---|---|
| XOM | Buy 500 Shares |
| MUR | Buy 200 Shares |
| RIG | Sell 200 Shares |
| SUN | Sell 800 Shares |
| COG | Buy 300 Shares |
| COP | Buy 200 Shares |
| CVS | Buy to Cover 300 Shares |
| CVS | Buy 300 Shares |
| HES | Buy 500 Shares |
| TOT | Buy 100 Shares |
| BAC | Short 300 Shares |
| JPM | Buy to Cover 100 Shares |
| C | Short 500 Shares |

Initial Orders to Place:

| | | |
|---|---|---|
| XOM | Buy 500 Shares | (Join BBO) |
| MUR | Buy 200 Shares | (Join BBO) |
| RIG | Sell 200 Shares | (Join BBO) |
| SUN | Sell 800 Shares | (Join BBO) |
| COG | Buy 300 Shares | (Join BBO) |
| COP | Buy 200 Shares | (Join BBO) |
| CVS | Buy to Cover 300 Shares | (Join BBO) |
| HES | Buy 500 Shares | (Join BBO) |
| TOT | Buy 100 Shares | (Join BBO) |
| BAC | Short 300 Shares | (Join BBO) |
| JPM | Buy to Cover 100 Shares | (Join BBO) |
| C | Short 500 Shares | (Join BBO) |

Subsequent Orders to Place (Pending Initial Fills):

| | | |
|---|---|---|
| CVS | Buy 300 Shares | (Join BBO) |

Summary: 410

| | |
|---|---|
| Trades Required: | 13 |
| Initial Trades Identified: | 12 |
| Subsequent Trades Identified: | 1 |
| Total Shares Required: | 4,300 |
| Commission Schedule: | $0.0035 per share |
| Expected Commission: | $15.05 |
| Other Fees Expected: | $7.22 |
| Total Commission & Fees Expected: | $22.27 |

Progress Summary of Target Process

Target Process Messages...

All Open Orders have been Canceled
...Placing Initial Orders...
Open Order 1 (XOM Buy 500 Shares) has been pending execution for 28 seconds...
Open Order 2 (MUR Buy 200 Shares) has been executed in full...
Open Order 3 (RIG Sell 200 Shares) has a partial fill of 100 shares...
Open Order 4 (SUN Sell 800 Shares) has been executed in full...
Open Order 5 (COG Buy 300 Shares) has been pending execution for 28 seconds...
Open Order 6 (COP Buy 200 Shares) has been pending execution for 28 seconds...
Open Order 7 (CVS Buy To Cover 300 Shares) has been executed in full...
Open Order 8 (HES Buy 500 Shares) has been executed in full...
Open Order 9 (TOT Buy 100 Shares) has been pending execution for 28 seconds...
Open Order 10 (BAC Short 300 Shares) has been pending execution for 28 seconds...
Open Order 11 (JPM Buy To Cover 100 Shares) has been executed in full...
Open Order 12 (C Short 500 Shares) has been executed in full...
...Initial Orders Have all been placed...
Open Order 13 (CVS Buy 300 Shares) has been pending execution for 11 seconds...

Target Process Summary: 412

| | |
|---|---|
| Trades Executed if Full: | 6 |
| Trades with Partial Fills: | 1 |
| Trades Pending Execution: | 6 |
| Total Shares to be Executed: | 4,300 |
| Total Shares Executed So Far: | 2,500 |
| % Of Shares Executed: | 58% |
| Commission Schedule: | $0.0035 per share |
| Total Commissions & Fees Expected: | $22.27 |
| Total Commissions & Fees Expected (thus far towards Target) | $12.92 |
| Actual Commissions & Fees Assessed: | $13.07 |

Completed Changes in Position:

| | |
|---|---|
| MUR | Buy 200 Shares |
| RIG | Sell 100 Shares |
| SUN | Sell 800 Shares |
| CVS | Buy to Cover 300 Shares |
| HES | Buy 500 Shares |
| JPM | Buy to Cover 100 Shares |
| C | Short 500 Shares |

Pending Changes in Position:

| | |
|---|---|
| XOM | Buy 500 Shares |
| RIG | Sell 100 Shares |
| COG | Buy 300 Shares |
| COP | Buy 200 Shares |
| CVS | Buy 300 Shares |
| TOT | Buy 100 Shares |
| BAC | Short 300 Shares |

Other Completed Steps in Target Process:
Move Mouse to (1280, 800)
Hotkeys turned Off

Other Steps Pending Completion in Target Process:
Long Buying Power Limit = 20
Short Buying Power Limit = 10
Set Volume to Minimum
Open Energy Workspce

Buying Power

| | |
|---|---|
| Buying Power Available before Target Process Initiated | $56,922  414 |
| Expected Change in Buying Power as a result of Target Process | ($32,800) |
| Expected Buying Power Available after completion of Target Process | $24,122 |

FIG. 17B
FIG. 17C
FIG. 17D
FIG. 17E

Close

FIG. 17B

Target Process Summary Panel 310

Initial State
Initial Portfolio:
XOM 400 Shares Long
MUR 100 Shares Long
NE 400 Shares Long
RIG 800 Shares Long
SUN 1,200 Shares Long
CVS 300 Shares Short
TOT 200 Shares Long
BAC 200 Shares Short
JPM 600 Shares Short Open Orders: 406
Buy 200 XOM 70.65
Sell 100 RIG 90.22
Sell 300 SUN 60.34
Short 200 BAC 24.47

Target State
Target Portfolio:
XOM 900 Shares Long
MUR 300 Shares Long
NE 400 Shares Long
RIG 600 Shares Long
SUN 400 Shares Long
COG 300 Shares Long
COP 200 Shares Long
CVS 300 Shares Long
HES 500 Shares Long
TOT 300 Shares Long
BAC 500 Shares Short
JPM 500 Shares Short
C 500 Shares Short Open Orders: 408
(no working orders)

Other Target Conditions:
Long Buying Power Limit = 20
Short Buying Power Limit = 10
Set Volume to Minimum
Open Energy/Finan. Workspce
Move Mouse to (1280, 800)
Hotkeys turned Off

FIG. 17C

Orders Identified as part of Target Process

List of Orders Required:

| | | |
|---|---|---|
| XOM | Buy 500 Shares | |
| MUR | Buy 200 Shares | |
| RIG | Sell 200 Shares | |
| SUN | Sell 800 Shares | |
| COG | Buy 300 Shares | |
| COP | Buy 200 Shares | |
| CVS | Buy to Cover 300 Shares | |
| CVS | Buy 300 Shares | |
| HES | Buy 500 Shares | |
| TOT | Buy 100 Shares | |
| BAC | Short 300 Shares | |
| JPM | Buy to Cover 100 Shares | |
| C | Short 500 Shares | |

Initial Orders to Place:

| | | |
|---|---|---|
| XOM | Buy 500 Shares | (Join BBO) |
| MUR | Buy 200 Shares | (Join BBO) |
| RIG | Sell 200 Shares | (Join BBO) |
| SUN | Sell 800 Shares | (Join BBO) |
| COG | Buy 300 Shares | (Join BBO) |
| COP | Buy 200 Shares | (Join BBO) |
| CVS | Buy to Cover 300 Shares | (Join BBO) |
| HES | Buy 500 Shares | (Join BBO) |
| TOT | Buy 100 Shares | (Join BBO) |
| BAC | Short 300 Shares | (Join BBO) |
| JPM | Buy to Cover 100 Shares | (Join BBO) |
| C | Short 500 Shares | (Join BBO) |

Subsequent Orders to Place (Pending Initial Fills):

| | | |
|---|---|---|
| CVS | Buy 300 Shares | (Join BBO) |

Summary: 410

| | |
|---|---|
| Trades Required: | 13 |
| Initial Trades Identified: | 12 |
| Subsequent Trades Identified: | 1 |
| Total Shares Required: | 4,300 |
| Commission Schedule: | $0.0035 per share |
| Expected Commission: | $15.05 |
| Other Fees Expected: | $7.22 |
| Total Commission & Fees Expected: | $22.27 |

FIG. 17D

Progress Summary of Target Process

Target Process Messages...

All Open Orders have been Canceled
...Placing Initial Orders...
Open Order 1 (XOM  Buy 500 Shares) has been pending execution for 28 seconds...
Open Order 2 (MUR  Buy 200 Shares) has been executed in full...
Open Order 3 (RIG   Sell 200 Shares) has a partial fill of 100 shares...
Open Order 4 (SUN  Sell 800 Shares) has been executed in full...
Open Order 5 (COG  Buy 300 Shares) has been pending execution for 28 seconds...
Open Order 6 (COP  Buy 200 Shares) has been executed in full...
Open Order 7 (CVS  Buy To Cover 300 Shares) has been executed in full...
Open Order 8 (HES  Buy 500 Shares) has been executed in full...
Open Order 9 (TOT  Buy 100 Shares) has been pending execution for 28 seconds...
Open Order 10 (BAC  Short 300 Shares) has been pending execution for 28 seconds...
Open Order 11 (JPM  Buy To Cover 100 Shares) has been executed in full...
Open Order 12 (C   Short 500 Shares) has been executed in full...
...Initial Orders Have all been placed...
Open Order 13 (CVS  Buy 300 Shares) has been pending execution for 11 seconds...

Completed Changes in Position:

| | |
|---|---|
| MUR | Buy 200 Shares |
| RIG | Sell 100 Shares |
| SUN | Sell 800 Shares |
| CVS | Buy to Cover 300 Shares |
| HES | Buy 500 Shares |
| JPM | Buy to Cover 100 Shares |
| C | Short 500 Shares |

Pending Changes in Position:

| | |
|---|---|
| XOM | Buy 500 Shares |
| RIG | Sell 100 Shares |
| COG | Buy 300 Shares |
| COP | Buy 200 Shares |
| CVS | Buy 300 Shares |
| TOT | Buy 100 Shares |
| BAC | Short 300 Shares |

Target Process Summary: 412

| | |
|---|---|
| Trades Executed if Full: | 6 |
| Trades with Partial Fills: | 1 |
| Trades Pending Execution: | 6 |
| Total Shares to be Executed: | 4,300 |
| Total Shares Executed So Far: | 2,500 |
| % Of Shares Executed: | 58% |
| Commission Schedule: | $0.0035 per share |
| Total Commissions & Fees Expected: | $22.27 |
| Total Commissions & Fees Expected (thus far towards Target) | $12.92 |
| Actual Commissions & Fees Assessed: | $13.07 |

Other Completed Steps in Target Process:

Move Mouse to (1280, 800)
Hotkeys turned Off

Other Steps Pending Completion in Target Process:

Long Buying Power Limit = 20
Short Buying Power Limit = 10
Set Volume to Minimum
Open Energy Workspce

FIG. 17E

Buying Power

| | | |
|---|---|---|
| Buying Power Available before Target Process Initiated | $56,922 | 360 |
| Expected Change in Buying Power as a result of Target Process | ($32,800) | |
| Expected Buying Power Available after completion of Target Process | $24,122 | |

Close

FIG. 18A

| Function | Allowance of functions based on Type of Transaction and I.P. to T.P. comparison | | | | | | |
|---|---|---|---|---|---|---|---|
| | Reverse | | Add | | Liquidate | | None |
| | any SHORT I.P. with LONG T.P. | any LONG I.P. with SHORT T.P. | FLAT or LESS LONG I.P. than LONG T.P. | FLAT or LESS SHORT I.P. than SHORT T.P. | SHORTER I.P. than SHORT or FLAT T.P. | LONGER I.P. than LONG or FLAT T.P. | I.P. = T.P. |
| Choose SAME Side (to Reverse towards Target) | Buy Functions Allowed | Sell Functions Allowed | NO Functions Allowed | NO Functions Allowed | NO Functions Allowed | NO Functions Allowed | NO Functions Allowed |
| Choose SAME Side (to Add towards Target) | NO Functions Allowed | NO Functions Allowed | Buy Functions Allowed | Sell Functions Allowed | NO Functions Allowed | NO Functions Allowed | NO Functions Allowed |
| Choose SAME Side (to Liquidate towards Target) | NO Functions Allowed | NO Functions Allowed | NO Functions Allowed | NO Functions Allowed | Buy Functions Allowed | Sell Functions Allowed | NO Functions Allowed |
| Choose SAME Side (to Reverse, Add towards Target) | Buy Functions Allowed | Sell Functions Allowed | Buy Functions Allowed | Sell Functions Allowed | NO Functions Allowed | NO Functions Allowed | NO Functions Allowed |
| Choose SAME Side (to Add, Liquidate towards Target) | NO Functions Allowed | NO Functions Allowed | Buy Functions Allowed | Sell Functions Allowed | Buy Functions Allowed | Sell Functions Allowed | NO Functions Allowed |
| Choose SAME Side (to Reverse, Liquidate towards Target) | Buy Functions Allowed | Sell Functions Allowed | NO Functions Allowed | NO Functions Allowed | Buy Functions Allowed | Sell Functions Allowed | NO Functions Allowed |
| Choose SAME Side (to Reverse, Add, Liquidate towards Target) | Buy Functions Allowed | Sell Functions Allowed | Buy Functions Allowed | Sell Functions Allowed | Buy Functions Allowed | Sell Functions Allowed | NO Functions Allowed |

Notes:
"I.P." = Initial Position
"T.P." = Target Position
When "Buy Functions Allowed", Sell Functions are Disallowed
When "Sell Functions Allowed", Buy Functions are Disallowed
When "NO Functions Allowed", Buy Functions are Disallowed; Sell Functions are Disallowed

FIG. 18B

| Function | Allowance of functions based on Type of Transaction and I.P. to T.P. comparison | | | | | |
|---|---|---|---|---|---|---|
| | Reverse | | Add | | Liquidate | None |
| | any SHORT I.P. with LONG T.P. | any LONG I.P. with SHORT T.P. | FLAT or LESS LONG I.P. than LONG T.P. | FLAT or LESS SHORT I.P. than SHORT T.P. | SHORTER I.P. than SHORT or FLAT T.P. | LONGER I.P. than LONG or FLAT T.P. | I.P. = T.P. |
| Choose OPPOSITE Side (to Reverse towards Target) | Sell Functions Allowed | Buy Functions Allowed | NO Functions Allowed | NO Functions Allowed | NO Functions Allowed | NO Functions Allowed | NO Functions Allowed |
| Choose OPPOSITE Side (to Add towards Target) | NO Functions Allowed | NO Functions Allowed | Sell Functions Allowed | Buy Functions Allowed | NO Functions Allowed | NO Functions Allowed | NO Functions Allowed |
| Choose OPPOSITE Side (to Liquidate towards Target) | NO Functions Allowed | NO Functions Allowed | NO Functions Allowed | NO Functions Allowed | Sell Functions Allowed | Buy Functions Allowed | NO Functions Allowed |
| Choose OPPOSITE Side (to Reverse, Add towards Target) | Sell Functions Allowed | Buy Functions Allowed | Sell Functions Allowed | Buy Functions Allowed | NO Functions Allowed | NO Functions Allowed | NO Functions Allowed |
| Choose OPPOSITE Side (to Add, Liquidate towards Target) | NO Functions Allowed | NO Functions Allowed | Sell Functions Allowed | Buy Functions Allowed | Sell Functions Allowed | Buy Functions Allowed | NO Functions Allowed |
| Choose OPPOSITE Side (to Reverse, Liquidate towards Target) | Sell Functions Allowed | Buy Functions Allowed | NO Functions Allowed | NO Functions Allowed | Sell Functions Allowed | Buy Functions Allowed | NO Functions Allowed |
| Choose OPPOSITE Side (to Reverse, Add, Liquidate towards Target) | Sell Functions Allowed | Buy Functions Allowed | Sell Functions Allowed | Buy Functions Allowed | Sell Functions Allowed | Buy Functions Allowed | NO Functions Allowed |

Notes:
"I.P." = Initial Position
"T.P." = Target Position
When "Buy Functions Allowed", Sell Functions are Disallowed
When "Sell Functions Allowed", Buy Functions are Disallowed
When "NO Functions Allowed", Buy Functions are Disallowed; Sell Functions are Disallowed

FIG. 21

Contract 1

| Contract | NetPos |
|---|---|
| Contract 1 | 1 |
| Contract 2 | -7 |
| Contract 3 | 5 |

_392_

23:34:16 | ∧ | _386_
---|---|---
 | 131875 | 312
 | 131850 | 685
_394_ | 131825 | 338
 | 131800 | 357
 | 131775 | 129
 | 131750 | 
W: 2 | 131725 | 
36 | 131700 | 
143 | 131675 | 
127 | 131650 | 
196 | | 
186 | ∨ |

Contract 1 _388_

Position Boundaries
Long: 84
Short: 84

Default Quantity: 1
Next Order Size:

_390_

Toggle Trading State (Currently ON)

Volume Ladder
89
55
34
21
13
8
5
3
2
1

Contract 2

23:34:16 | ∧ | _386_
---|---|---
 | 232050 | 60
 | 232025 | 22
 | 232000 | 18
 | 231975 | 8
 | 231950 | 2
1 | 231925 | 
13 | 231900 | 
12 | 231875 | 
19 | 231850 | 
11 | 231825 | 
 | ∨ |

Contract 2 _388_

Position Boundaries
Long: 240
Short: 240

Default Quantity: 1
Next Order Size:

_390_

Toggle Trading State (Currently OFF)

Volume Ladder
89
55
34
21
13
8
5
3
2
1

Contract 3

23:34:16 | ∧ | _386_
---|---|---
 | 12386 | 14
 | 12385 | 
 | 12384 | 4
 | 12383 | 5
 | 12382 | 2
 | 12381 | 1
4 | 12380 | 
18 | 12379 | 
14 | 12378 | 
6 | 12377 | 
10 | ∨ |

Contract 3 _388_

Position Boundaries
Long: 60
Short: 60

Default Quantity: 1
Next Order Size:

_390_

Toggle Trading State (Currently ON)

Volume Ladder
89
55
34
21
13
8
5
3
2
1

TARGET TRADING SYSTEM AND METHOD

BACKGROUND OF THE INVENTION

The present subject matter relates generally to a trading system and method. More specifically, the present invention relates to a trading system that facilitates a "target" trading process.

Traders may place orders through trading software. Within trading software, there are typically various methods of order-entry. Specifically, traders specify what tradable instrument they would like to trade; they specify the amount they would like to trade; they may specify the desired route that the order should take to market; they may specify when they want to place the order, as well as other optional order features. Even though the exact components of the order-entry process vary by trading system and scenario, and even though the processes may be specified or planned in advance, the order-entry process itself is typically a process all traders use to get their orders to market. The current steps that make up the order-entry process in today's trading software, as well as the user involvement it requires, is the main topic of the background of the invention.

The term "tradable instrument" or "tradable instruments" mentioned above and used herein may refer to stocks, bonds, currencies, commodities, warrants, options, futures, spreads, synthetics, FOREX contracts, as well as any other type of tradable instrument, Further, other types of tradable instruments not specifically mentioned herein, or developed in the future, shall also be included as part of the term "tradable instrument" or "tradable instruments."

There are times when a trader's focus on orders and order-entry is really not a problem at all. For example, let's assume that a trader who trades DELL stock starts the day with zero shares of DELL. If his "target" is to own 500 shares of DELL, he simply places an order to buy 500 shares. Note that in this simple example, the trader focused on the order that was required to be sent, and that order was to buy 500 shares of DELL. However, more complex situations arise. Let's focus on a slightly modified version of the above example. Let's assume that a trader, already owning 500 shares of DELL, decides that he wants to own a total of 2,000 shares of DELL. We can consider this figure of 2,000 shares to be the trader's target position. In order for the trader to reach his target position, he again has to focus on the order he has to place, and that order is to buy 1,500 shares of DELL. The trader knew that his target was to own 2,000 shares and so he had to subtract the amount of shares he already owned from his target position, an extra calculation step, to reach the number of shares required for his order. In another example, a trader may wish to liquidate part of his position, i.e. go from a currently position size of 3,400 shares to a target position of 300 shares, in which case he has to sell 3,100 shares, this quantity also achieved via calculation. In still another example, a futures trader may wish to reverse the side of the market he is on. If he currently holds 17 contracts short, but wants to get to a target of 47 contracts long, he must buy 64 contracts, the quantity again achieved via calculation. The requirement that traders have to focus on the type of orders required (buy/sell/short/cover) as well as having to calculate order quantity, instead of simply focusing only on the desired target position(s) to be held when the process is complete, is typical in today's trading software.

A portfolio includes one or more positions. Further, each position includes a tradable instrument, a quantity of each tradable instrument, as well as a side of the market each position is on (long or short). In some systems, such as systems for managing cash accounts, wherein account holders may never enter short positions, there may be no side of the market variable, as the side may be inherently understood to be on the long side of the market. Further, in alternative scenarios, the quantity associated with each tradable instrument may be positive for long positions and negative for short positions, in which cases it is implicit that the side of the market position is either long or short (in these instances, the side of the market may not need to be explicitly included as part of each position other than by the negative or positive number).

A portfolio may be a currently held portfolio of one or more positions, a theoretical portfolio of one or more positions, a portfolio of one or more positions held in the past, a portfolio of one or more positions to optionally be held at any point in the future, a portfolio not intended to be held, but rather to be used for benchmarking purposes, etc. There are endless types and uses of portfolios. The tradable instruments held in a portfolio may span any asset class or combination of asset classes, depending on the system.

Herein, we refer to two types of portfolios: an "initial portfolio" and a "target portfolio." We use the term "initial portfolio" to refer to a portfolio of one or more positions, wherein the portfolio itself may be considered the starting point. We occasionally refer to the one or more positions held within an initial portfolio as one or more "initial positions." Quite often, we provide examples wherein the portfolio used to represent an initial portfolio is a currently held portfolio. However, an initial portfolio may be any starting portfolio, including a portfolio held in the past or to be held in the future, etc. We apply the term "target portfolio" to refer to a portfolio of one or more positions, wherein the portfolio itself may be considered the ending point, the end goal, the target, etc. We will occasionally refer to the one or more positions held within a target portfolio as one or more "target positions." Initial portfolios and/or target portfolios may further be specified to be portfolios that exist at a certain day and time, portfolios that exist pending market or other conditions or events, or by any other criteria.

As used herein, the terms initial portfolio and target portfolio are typically used in combination or as part of the same examples. In one example, a user starts with an initial portfolio of five stocks, and wishes to change his positions held such that at some point in the future he will hold a target portfolio of seven stocks. In another example, a user starts with a current portfolio (an initial portfolio) of two different futures contracts and the user wishes to reverse his positions in the market towards a target portfolio of the same two futures contracts, but with the opposite side of market position. In still another example, a user holds no positions currently, but has stop-orders working in the market which will, pending market action, give the trader an initial portfolio of one or more positions at some point in the future. The user may wish to go from this initial portfolio to be acquired in the future, to a different target portfolio, which may be otherwise specified. In another example, the initial portfolio may be specified to be the user's currently held portfolio at two minutes before the closing time of the stock market, which may be four hours from the current time, in which case the positions (or initial positions) held within that initial portfolio would be the positions held at that specific time. Further as part of this same example, the target portfolio may be a specific list of stocks. In this example, while the initial portfolio may contain variable initial positions, the target portfolio may have specific target positions.

The initial and target portfolios may have exactly the same tradable instruments associated with the positions contained in the portfolios. Further, the initial and target portfolios may have overlapping but not all the same tradable instruments associated with the positions contained in the portfolios. Still further, the initial and target portfolios may have no tradable instruments in common associated with the positions contained in the portfolios. Similarly, initial and target portfolios may have positions, associated with same or different tradable instruments, which are on the same or opposite sides of the market (long or short), and may further have positions, associated with same or different tradable instruments, which have same or different quantities.

Even though the current pitfalls of order-entry systems exist when traders want to take their account to a state where there exists only one target position as part of a target portfolio, the pitfalls are easier to see when we discuss examples wherein traders need to take their account towards a more complex target portfolio. Further, the process is even more complex when traders start with a larger or more complex initial portfolio as well.

Using current technologies, if a trader wishes to take his account from an initial portfolio to a target portfolio, many steps are typically required. See the example displayed in FIG. 1, which is split into three main sections. Shown on the left side of FIG. 1 is an example of an initial portfolio. Shown on the right side of FIG. 1 is an example of a target portfolio. Shown in the middle of FIG. 1 is a section labeled "orders required to go from entire initial portfolio to entire target portfolio." This middle section of FIG. 1 is an example of how many tasks traders may have to perform manually while trading, if they wish to go from an initial portfolio to a target portfolio. In the example shown in FIG. 1, we assume that the trader wishes to start with an initial portfolio exactly as shown in FIG. 1, and end up with their entire target portfolio exactly as is shown in FIG. 1.

In order for the trader to determine what transactions need to be executed in the account under this scenario, the trader may first identify all tradable instruments which exist in the initial portfolio but not the target portfolio (in the example shown in FIG. 1, tradable instruments "AAA" and "BBB") and prepare orders to liquidate these positions using the appropriate orders (cover/sell), quantities, and order types (limit/market/etc). Note that in the last column shown in the middle section of FIG. 1 labeled "Type of Transaction Required", the type of transaction listed for tradable instruments "AAA" and "BBB" is liquidate.

The trader may next identify all tradable instruments which exist in both the initial portfolio and the target portfolio (in this example, tradable instruments "CCC", "DDD", "EEE", "FFF", "GGG", "HHH", "III", "JJJ", "KKK", "LLL") and figure out if the sides of the position (long/short) and quantities differ. If they do differ, the trader must calculate the order types (buy/cover/sell/short), order quantities, and types of order (limit/market) required to change the market position for each tradable instrument. Note that in the last column shown in the middle section of FIG. 1 labeled "Type of Transaction Required", the type of transaction required varies for each order. Also note that for some tradable instruments, multiple transactions may be required, which can be seen for tradable instruments "JJJ" and "LLL" shown in FIG. 1. The reason multiple transactions may be required is that certain order-entry systems restrict the trader from crossing the zero-line, or going from short to long or long to short in one order.

The trader may further identify all tradable instruments which exist in the target portfolio but not initial portfolio (in this example, tradable instruments "MMM", "NNN", and "OOO") and prepare orders to add these positions using the appropriate order types (buy/short), quantities, and type of order (limit/market). Note that in the last column shown in the middle section of FIG. 1 labeled "Type of Transaction Required", the type of transaction listed for tradable instruments "MMM", "NNN", and "OOO" is add.

It should be noted that using the presently available systems, the list of orders required to go from the initial portfolio to the target portfolio, as shown in FIG. 1, needs to be manually calculated by the trader. It might take the average trader several minutes to compile the above list of required orders and associated conditions. Further, the trader will still have to place each of these orders individually. Even though sometimes traders have the luxury of time; most other times, time itself is a significant cost. Profits and losses may swing wildly as the markets fluctuate, and there is no reason that traders should be focusing on such mundane processes which could instead be automated. The trader's required order calculations and methods of order-entry are time consuming, error prone, annoying and quite often flat-out risky. With so much of the trader's attention and actions required to be allocated towards the manual processes which have been discussed, the trader is less focused on the market, and performance is severely impaired.

Existing order-entry systems which offer portfolio trading, i.e. trading more than one tradable instrument at a time using only one function, typically offer basket orders. Basket orders are ways in which traders can submit multiple orders at once by compiling orders into groups, or baskets, ahead of time. Traders must typically specify the tradable instruments, order type (buy/sell/short/cover), quantities, market/limit specification, and optionally other conditions as part of setting up each order to go into their basket. Because the orders themselves are required to be known ahead of time, basket orders do not address our problem where traders know what their target positions (portfolios) are, but they don't know what orders are required to reach these target positions and must calculate the orders manually. Therefore basket orders do not provide the solutions to the problems presented herein.

Because traders do not have methods at their disposal to trade to target portfolios, they have essentially two options. They may either still create their target portfolios, and then manually calculate the orders required to reach their target portfolio based on any initial portfolio. Or, they may skip this process, and instead start placing orders to try to get close to their preferred target portfolios. We have already discussed the first option in detail, and the time it will take towards generation of a list of orders required. If traders use the second option, while they may be faster to place their first orders, they may end up miscalculating the quantities to use for orders, they may end up taking improper amounts of risk on certain positions compared to others, and may further submit orders in error based on a lack of preparation.

In addition to the problems identified above with respect to trading to a target portfolio, existing trading systems and methods are not well adapted to execute complex multi-step processes and/or macros. For example, it is not so common for trading software to allow users to combine multiple functions into macros. However, for the platforms that do allow this, when it comes to run-time, these platforms will typically run the full macro upon a user-trigger. In other words, if a command to execute a macro is received, then the macro is executed in full, unless there is an error or some sort of break in the process. Some trading software platforms may allow users to turn the functionality of macros on or off in full; however, even if so, note that this is typically at the platform level. So if the functionality of macros within the platform is on, then if an input command to run a macro is received, then the entire macro is typically run in full.

Further problems with current trading methods exist because, as discussed, most trading systems are order-centric. As part of the order-entry process, existing methods require traders to specify the order (buy/sell/cover/short), the side of market applied and/or other specifications. These steps complicate the trading process and inhibit trader efficiency. For example, in many situations traders have the intention of performing an action regardless of the order required to complete the action. In one example, sometimes traders want to add to an existing position in their account, liquidate an existing position from their account, or reverse an existing position in their account.

In other examples, traders wish to cancel orders on the same side or the opposite of their existing position. In each of these situations, it is easily understood that the type of order (buy/sell/cover/short) required to be used for orders, or the side of market required to be used for other types of actions, is easy to determine when the user's position in the market is known. In addition, traders intend to perform an action on the same side of the market on which they currently hold a position; other times traders intend to perform an action on the opposite side of the market from which they currently hold a position. The action a trader intends to perform may be an order, a cancel of an order, or another action. However, existing trading software still requires the specification of the order type for orders, and if for other non-order actions (e.g. cancel buys or sells), still requires the specification of the side of market (buy or sell side) to apply within the function. This is an unnecessary requirement in many circumstances, and for reasons of trader efficiency and avoidance of errors, should be avoided whenever possible. However, there is currently no solution for this in the current market. What traders need is a quicker path to get orders to market; and a faster way to submit non-order actions such as cancel requests, i.e. they need for wasteful parts of the trading process to be eliminated whenever possible. In a primary example, traders need a way to send orders for a specific action, and have the system select which order type or side of market to apply the action towards.

As described, existing trading software has traders focusing on the order planning, order calculation, and order-entry processes. These order-centric methods are overly time-consuming and error-prone, and lead to reduced profitability for traders. Accordingly, there is a need for a system and method whereby a trader can specify a target portfolio of one or more target positions, and be able to execute the process of reaching these target portfolios from any initial portfolio with ease, efficiency, and accuracy. Further, in coordination with the need for traders to trade to target portfolios from any initial portfolio, there is an associated need for traders to be able to reach other target conditions as well. Further, traders are expected to benefit by applying various methods of selectively executing individual processes (either themselves or within more complex or multi-step processes), as well as methods in which user input of order types and side of market are not required steps of the trading process.

BRIEF SUMMARY OF THE INVENTION

As presented above, the manual calculation and entry of the orders required to move from an initial portfolio to a target portfolio is time consuming and inefficient. These problems are solved, at least in part, by the subject matter presented herein.

The present trading system provides users the ability to reach a set of target conditions from a set of initial conditions. In one example of such a trading system, a user may define a target state, wherein the target state includes a target portfolio, which in turn includes one or more target positions, such that when triggered, the system identifies orders required to reach the one or more target positions in the target portfolio from an initial portfolio (such as the user's current portfolio). Each of the components of the target portfolio (i.e., the identifiers, quantity, and side of market of each of the target positions, as well as the approach towards each target position, etc.) may be considered a target condition. As shown, the target state may be considered a set of target conditions (including conditions related to target positions as well as conditions related to various states within the trading system). Additionally, a "target portfolio" may be considered a set of target conditions (the set of conditions related to the target positions). In many of the examples presented herein, the target portfolio is used as an exemplary representative of a set of target conditions, though these examples are intended to be understood to be illustrative how the trading system may be used to reach one or more conditions (or one or more sets of conditions) in any target state, whether or not that target state includes a target portfolio.

In one example in which a trading system is used to reach a set of target conditions from a set of initial conditions (for example, reach a target portfolio from an initial portfolio), the trading system will compare the side of market and quantity of all target positions within the target portfolio to the side of market and quantity for all initial positions for the same tradable instruments within the initial portfolio, and as a result of this process, the system identifies orders required for the trader to reach all of the specified target positions within their target portfolio from their initial portfolio. (Note that in this example, the identified orders may or may not further include orders required for the trader to liquidate positions on tradable instruments held within the initial portfolio which are not also in the target portfolio.) In another example, the system will compare the side of market and quantity of a subset of the target positions within the target portfolio to the side of market and quantity for each initial position for the same tradable instrument within the initial portfolio, and as a result of this process, the system identifies orders required for the trader to reach the one or more target positions within their target portfolio from their initial portfolio. There are many methods in which a subset of the target positions may be selected, of which one method is user specification. (Note that in this example, as in the first example, the identified orders do not necessarily, but may include orders required for the trader to liquidate positions on tradable instruments held within the initial portfolio which are not also in the target portfolio.)

As noted, the identified orders may include orders required for the trader to liquidate some or all positions on tradable instruments held within the initial portfolio which are not also in the target portfolio. In one example, the system identifies orders required for the trader to hold only the target portfolio, having liquidated positions from an initial portfolio not included in the target portfolio. Note that the identified orders in this example includes both the orders required for the trader to reach all of the target positions within their target portfolio from their initial portfolio, as well as the orders required for the trader to liquidate positions on all of the tradable instruments held within the initial portfolio which are not also in the target portfolio.

There are multiple scenarios for how the identified orders may involve tradable instruments which are to be liquidated from the initial portfolio. In one example, the target portfolio includes a non-zero position for a tradable instrument that is included in the initial portfolio. In this case, the position quantity to be liquidated is the difference between the position quantity of the initial position compared to the target position. In another example, the target portfolio includes a zero position for a tradable instrument that is included in the initial portfolio. In this case, the position quantity to be liquidated is the position quantity of the initial position. In still another example, the target portfolio does not include a corresponding position for a tradable instrument that is in the initial portfolio. In this last case, the system may simply liquidate the position from the initial portfolio. It is contemplated that certain embodiments of the system may be adapted to simply ignore initial positions that have no corresponding target position or offer the trader the option to consider or ignore these positions.

In another example, if a trader holds an initial position of 200 shares long of a given first stock, an initial position of 300 shares short of a given second stock, and then executes a trigger for the system to go to a prescribed target state including a target portfolio including only a target position of 500 shares long for a given third stock, the system may, as part of the target process, liquidate the short position on the second stock held in the initial portfolio, but not liquidate the long position on the first stock held in the initial portfolio. This could be due to a user specification assigned to the target state such that all short positions included in the initial portfolio but not included in the target portfolio be liquidated, without any action specified on long positions included in the initial portfolio but not included in the target portfolio. This may be a very useful option when the target portfolio is set to contain only long positions. In another example, long positions held within an initial portfolio but not included within the target portfolio may be liquidated, while short positions held in the initial portfolio are maintained. Of course, system design or user specifications may allow for other scenarios as well.

Herein, the "target process" shall refer to the process that is applied to take the system from an initial state to a target state. The target process includes the identification of orders required for the trader to reach one or more target positions in a target portfolio from an initial portfolio.

The target process may further include the identified orders, or may include the execution of a subset of the identified orders. For example, the system may selectively execute identified orders based on one or more criteria.

As part of the target process, the identified orders required for the trader to reach one or more target positions in a target portfolio from an initial portfolio may be output to the user, suggested to the user, and/or made available to be automatically executed, or executed upon user instruction.

A user may trigger the target process by clicking a button on a toolbar, by pressing a key on a keyboard, or via other simple input method. Further, the target process may be initiated via automatic means, such as via event-based activation methods.

Aside from the identification of orders required for the trader to reach one or more target positions within a target portfolio from an initial portfolio, and further for the optional execution of one or more of these order actions, the target process may further perform other actions to reach the conditions defined by the target state from the conditions defined by the initial state. As used herein, the term "condition," including initial conditions and target conditions, refers to the collective state or condition of components within the system, including components which are part of the software or hardware, as well as components which are transitory and/or user-directed or controlled. Examples of conditions may include the condition of whether and what open orders exist in the market, the condition of whether and what new orders may be working in the market as part of a target condition after a target portfolio has been reached, the condition of buying power and risk in the account, such as whether the buying power limits are able to be changed or not, the condition of any software related states, such as whether or what specific workspace may be loaded, the condition of whether sound, mouse-trading, hotkey-trading, or alerts are on or off, the condition of variables used within the trading platform, such as the default volume used for orders, etc. In use, the number and various types of conditions that may be adjusted by the target process may provide users greatly expanded control over their trading system.

There are various types of transactions that may take place in trading. Herein, when we refer to the various "types of transactions", we refer to the following: an order may be placed to liquidate a position, an order may be placed to reverse a position (long to short or short to long), an order may be placed to add a position, etc. These transactions may be considered different types, even if actual orders that may be required to perform the transaction may be identical. As discussed above, the orders identified by the target process may be restricted to include only orders which are required for the trader to reach a subset of the target positions in the target portfolio. The types of transactions as discussed above may be one criterion by which that subset is specified. For example, when triggered, the system may identify orders required for the trader to reach one or more target positions in their target portfolio from their initial portfolio wherein only orders which serve to reverse a position are identified.

In other examples, the identified orders required to reach the one or more target positions in the target portfolio from an initial portfolio may themselves not be limited to specific types of transactions, but the identified orders required may include information regarding the types of transactions that each of the identified orders involves. Or, the system may not include information regarding the types of transactions that each of the identified orders involves, but this information may be obvious or unnecessary to be specified. The system may then execute only the subset of the identified orders, such that the only orders executed are the orders which involve one or more specific transaction types. In one example, the system may execute only the identified orders that serve to liquidate positions from the initial portfolio towards the target portfolio. In another example, the system may execute only the identified orders that serve to reverse an initial position or add towards a target position.

It is understood that the systems and methods described herein enable a trader to more efficiently move from one portfolio to another. Accordingly, it is contemplated that a user may develop a plurality of prescribed target portfolios, wherein each of target portfolios included one or more target positions as well as the specifications of the target process. As a result, order actions may be executed by the trader using the systems and methods described herein to easily shift trading positions and strategies. For example, a trader may define varied target portfolios that correspond to varied strategies, such as, "long industrials" or "short financials." In another example, the trader may have two prescribed target portfolios each including a set of five target positions, with the first target portfolio containing $5,000 of each of the five target positions and the second target portfolio containing $10,000 of each of the same five target positions. Accordingly, if the trading conditions suggest to the trader that it is most likely beneficial to be more heavily invested in each of the five tradable instruments, the trader may efficiently trigger the target process to the appropriate target portfolio (the one including the larger target positions).

There are nearly limitless manners in which the target process may be applied by traders. One use of the target process may be to re-weight positions based on a methodology that defines the percent of currency value to be associated with each position in the target portfolio. For example, the target portfolio may specify that 50% of the portfolio equity is to be in Product A, 30% is to be in Product B and 20% is to be in Product C. The trader may execute the target process, which may identify orders required to achieve the target portfolio as well as possibly execute one or more of these orders. It may be valuable to execute such a target process whether or not trades have been made on the tradable instruments included in the target portfolio since the last reweighting, since the percent equity in each tradable instrument may shift due to changes in the valuation.

In another example, the target process may be adapted to set the appropriate order quantities for one or more orders required to move from an initial portfolio to a target portfolio. For example, an order quantity may be set for the next order for one or more tradable instruments referred to in the identified orders, such that the quantity is the amount required to bring each tradable instrument to its prescribed target position from its given initial position. The orders may then be placed by the trader at the moment deemed appropriate.

The target process may be used to improve a trader's ability to trade around a core position. For example, there are times, particularly in a strongly trending market, in which a trader may want to consistently hold some number of contacts on the long or short side. For example, when the market is consistently trending upwards, a trader may intend to maintain a consistent position of five futures contracts long. In other words, although at any given point in time the trader may be long or short any number of contracts for the position, the trader's intention may be to trade around a baseline, or core position, of five contracts. The invention discussed herein makes shifting between positions and portfolios much easier, and therefore trading around a core position becomes much easier.

In one example of using the target process to maintain a core position, consider a situation in which a trader has been trading a group of twelve stocks over the last three months. The trader has profited based on a strategy of holding a core portfolio of approximately $10,000 invested in each of these stocks. Even though his position has varied throughout each trading day, he has consistently held his core portfolio overnight. Over the last few months, there have been some days in which the trader has sold some of his stock inventory in the morning, believing the stocks could be purchased cheaper later in the day, yet still intending to revert to the core portfolio by market closing time. There have also been days in which the trader has bought extra stock in the mornings, with the intention of selling his extra inventory in order to revert back to his core portfolio later in the day and before market closing time. Sometimes the amount of stock the trader acquires or sells in the morning is in even lots (e.g., 500 shares, 1,000 shares, etc.), and there are other times the amounts are in odd lots (e.g., 245 shares). Whether the lots are even or odd may be a result of the trader's intentions, but is more likely a result of the fills that were received on his limit orders. Let's assume that on the current day, the trader bought extra of certain stocks that the trader expected to move up strongly. In addition, due to news that came out related to one of the stocks, the trader sold some of that position. For some of the stocks, the trader made purchases or sales in only one order, while for other stocks the trader scaled into the current position. Assume the time is now 3:58 pm EST and that the stock market closes in two minutes (4:00 pm EST). The trader is happy with his profits during the day, but wants to stick to overnight margin limits and his self-imposed rules and strategy of maintaining a core portfolio of $10,000 per stock. Using the methodologies discussed herein, the trader can now trigger the target process, to return to his core holding preferences as discussed. Instead of this process having to be manually performed, it can now be automated, with a higher degree of precision and speed than the trader could have performed manually. By avoiding the hectic processes of manually trading back towards a core portfolio using other systems, the systems provided herein allow the trader to more easily revert to a core portfolio, thereby improving the trader's ability to maintain profitable trading strategies.

Using the systems and methods described herein, a trader may execute a simple target process (or a subset of a more complex target process) wherein the order quantity to be executed would equal the absolute value of the difference between the current position size the target position size. For example, if the target position for a given tradable instrument is prescribed as 500 shares and the current position size is 2,000 shares, a trade to target command would execute a sell order for 1,500 shares. Similarly, if the target position for a given tradable instrument is prescribed as 2,500 shares and the current position size is 2,000 shares, a trade to target command would execute a buy order for 500 shares. It is understood that there are numerous ways to reference and/or reach a target position within calculations and execution of commands.

In another example, a trader may have a prescribed target position of 5 contracts long with a current position size of 27 contracts long. The execution of a simple target process may place an order to sell 22 contracts. Similarly, a trader may have a prescribed target position of 20 contracts short and a current position size of 27 contracts long. The execution of a simple target process may place an order to sell 47 contracts. The target process may be initiated, for example, in any manner appropriate within the trading system, such as via a mouse click or a keyboard shortcut.

While the execution of a target process may initiate all of the order-entry calculations and functions required to bring a tradable instrument to the prescribed target position from the initial position, the target process may be subject to further specifications or restrictions on execution. For example, a trader may assign a specification that stock trades in the target process are required to be in round lots (with a minimum round lot size of 100 shares). Accordingly, if the initial position of a stock has a quantity of 5,200 shares, and the quantity for the target position is calculated using a model to be 5,123 shares, then no transaction may take place because the size required for this order (77 shares) is less than the minimum round lot size of 100 shares.

As opposed to requiring the trader to manually calculate the positions to buy or sell, to calculate order quantities required, to determine the side of market to place orders on, and to place all orders and perform other related tasks to reach a target state, the target process may shorten task time, limit errors and reduce risk in a trader's trading day. Further, the trader may be able to focus more strongly on the market data, and may see profitability increase. Still further, the trader may more easily and more accurately maintain a desired target portfolio using the subject matter described herein.

An example of a method of reaching one or more target positions in a user-directed trading system includes the steps of: identifying one or more target positions, wherein each target position includes a tradable instrument identifier and a target quantity; for at least one of the target positions, identifying a corresponding initial position including a current quantity associated with the tradable instrument identifier; and triggering the trading system to identify one or more orders required to reach at least one target position from at least one initial position. The one or more initial and/or target positions may further identify the side of market of the position. The method may further include the step of triggering the trading system to execute one or more of the orders identified as being required to reach the at least one target position from the at least one initial position.

In additional and alternate examples, the trading system may be configured to take a selected execution approach in executing the one or more of the orders identified as being required to reach the at least one target position from the at least one initial position, wherein the execution approach is based on the tradable instrument state of the tradable instrument associated with the target position. For example, there may be at least two identified target positions and the execution approach is selected from the group consisting of: the one or more of the orders identified as being required to reach the target positions from the initial positions will be executed if the tradable instrument state of the tradable instrument associated with each target position is on, if not, none of the one or more of the orders identified as being required to reach the target positions from the initial positions will be executed; only those orders identified as being required to reach the target positions from the initial positions for which the tradable instrument state of the tradable instrument associated with the target position is on will be executed; and the one or more of the orders identified as being required to reach the target positions from the initial positions will be executed regardless of whether or not the tradable instrument state is on for each of the one or more target positions.

The tradable instrument state is just one example of a state used for selective execution. Other states, aside from tradable instrument state, may be applied within the trading system, such as the state of an exchange, the state of an account, the state of a group manageable by a user, etc. In more granular methods, a state may be applied to specific functions, such as the state of volume applied to a particular tradable instrument. This may specifically control whether volume functions may be active or inactive. The state of an exchange may specifically control whether functions related to all contracts part of that exchange may be active or inactive, etc.

The one or more of the target positions may be user defined. Alternatively, the target positions may be defined by one or more functions provided in the trading system. The triggering of the trading system to identify one or more orders required to reach at least one target position from at least one initial position may be based on a user input trigger or an event based trigger.

Additionally, each target position may further include an approach towards target position condition, wherein the approach towards target position condition is any combination of approaches selected from the group consisting of liquidate, add, and reverse. The one or more orders required to reach at least one target position from at least one initial position may include at least one order to add a position to a non-zero quantity initial position, wherein the non-zero quantity initial position has the same tradable instrument identifier as the target position. The one or more orders required to reach at least one target position from at least one initial position may include at least one order to reverse a non-zero quantity initial position to a non-zero quantity target position, wherein the absolute value of the quantity of the initial position is not equal to the absolute value of the quantity of the target position. The one or more orders required to reach at least one target position from at least one initial position may include at least one order to liquidate an initial position to a non-zero quantity target position, wherein the non-zero quantity target position has the same tradable instrument identifier as the initial position.

The method may further include the step of triggering the trading system to selectively execute one or more of the orders identified as being required to reach at least one target position from at least one initial position. The selective execution may be based on any combination of categories selected from the group consisting of order, order type, type of transaction, tradable instrument state, and exchange state.

An example of a user-directed trading system includes: a user interface; and a controller directed through the user interface, wherein the controller is adapted to: identify one or more target positions, wherein each target position includes a tradable instrument identifier and a target quantity; for at least one of the target positions, identify a corresponding initial position including a current quantity associated with the tradable instrument identifier; and identify one or more orders required to reach at least one target position from at least one initial position.

The controller may be further adapted to provide, through the user interface, a process manager through which a user defines a process for identifying the orders required to reach at least one target position from at least one initial position. The controller may also be further adapted to provide, through the user interface, a settings manager through which a user defines one or more conditions of a target state, wherein the target state includes the one or more target positions. Moreover the controller may be further adapted to provide, through the user interface, a target process specifications manager through which a user may manage specifications related to the identification of orders required to reach at least one target position from at least one initial position. In addition, the controller may be further adapted to execute one or more of the orders identified as being required to reach at least one target position from at least one initial position. The controller may execute the one or more of the orders identified as being required to reach at least one target position from at least one initial position upon receiving a user trigger through the user interface.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements. Throughout the disclosure herein, groups of related Figures will be referred to singularly. For example, FIGS. 2A-2D are referred to herein as FIG. 2.

FIG. 2 is a schematic representation of a target process.

FIG. 3 is another schematic representation of a target process.

FIG. 4 is a schematic representation of a target process management system.

FIG. 7 is a chart illustrating the types of transactions required to reach a short target position from a given initial position.

FIG. 8 is a chart illustrating the types of transactions required to reach a flat target position from a given initial position.

FIG. 9 is a chart illustrating the types of transactions required to reach a target position from an initial position based on a comparison of the initial position to the target position.

FIG. 10 is a flow chart illustrating one example of a process in which three options for execution approach are provided.

FIG. 11 is a representative example of a target state process manager.

FIG. 12 is a chart illustrating the relationship of initial position to side of market; the relationship may be used in a side-selection process.

FIG. 13 is a chart illustrating an example of the logic that may be implemented in a side-selection process.

FIG. 16 is a representative example of a target process trigger manager.

FIG. 17 is a representative example of a target process summary panel.

FIG. 18 is a chart illustrating the various side-selections that may be derived in the context of the three mutually exclusive types of transactions.

FIGS. 19-25 are representative examples of a trading environment used to illustrate a target process.

DETAILED DESCRIPTION OF THE INVENTION

Figure 1:
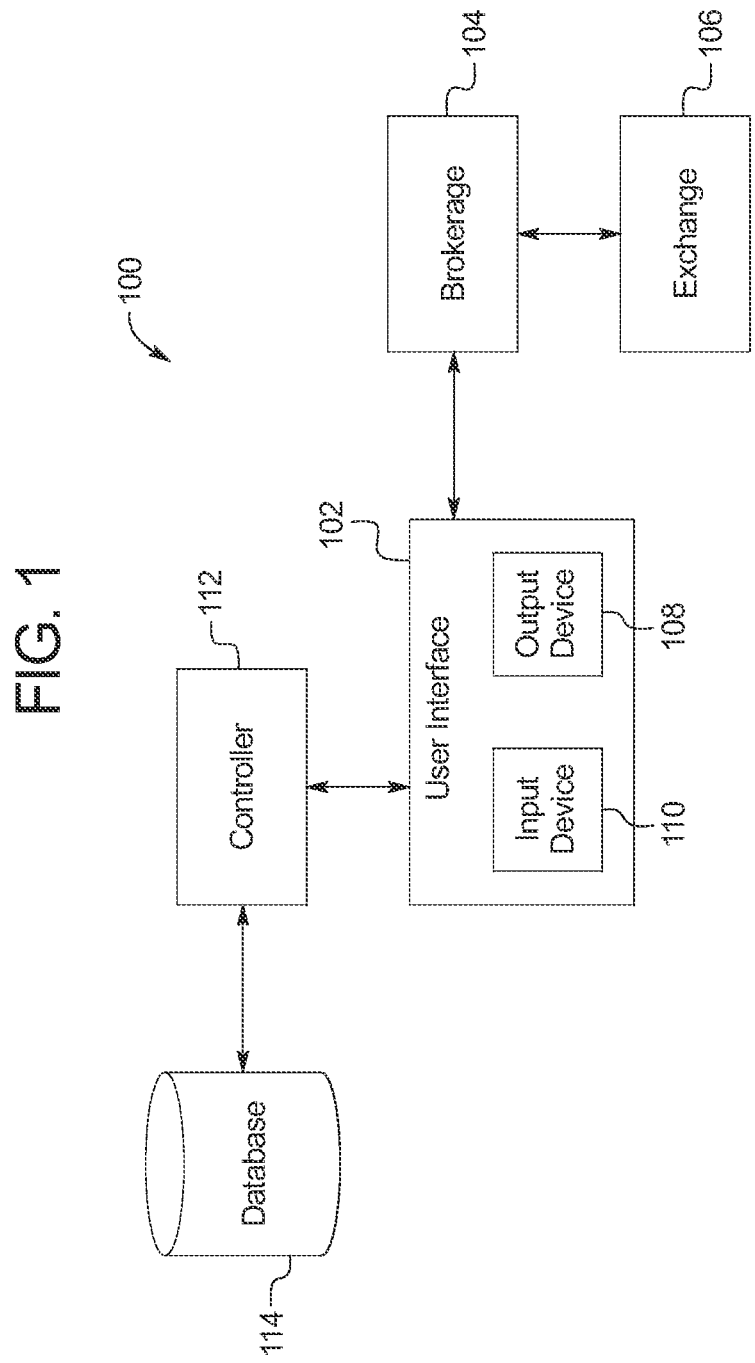
FIG. 1 is a block diagram of a trading system including target position functionality.
Figure 5B:
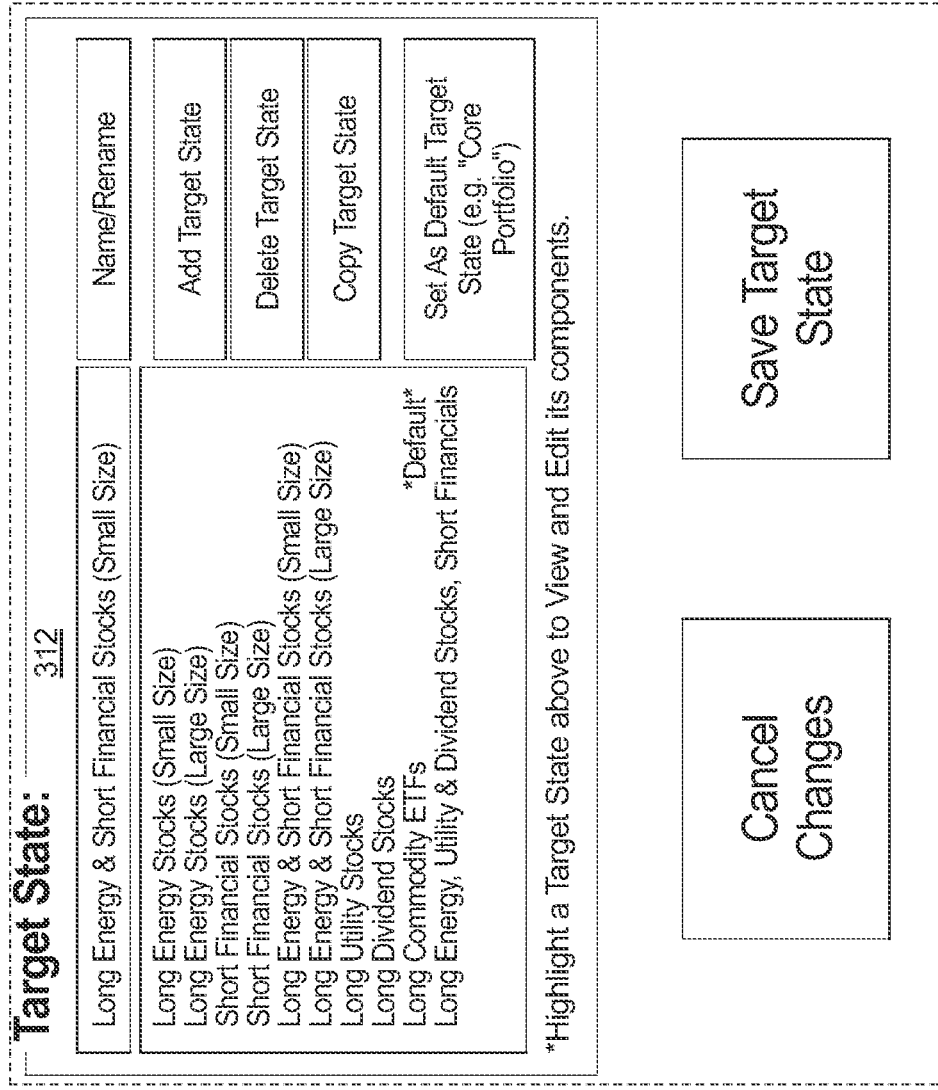
FIG. 5 is a representative example of a target state settings manager.
Figure 5C:
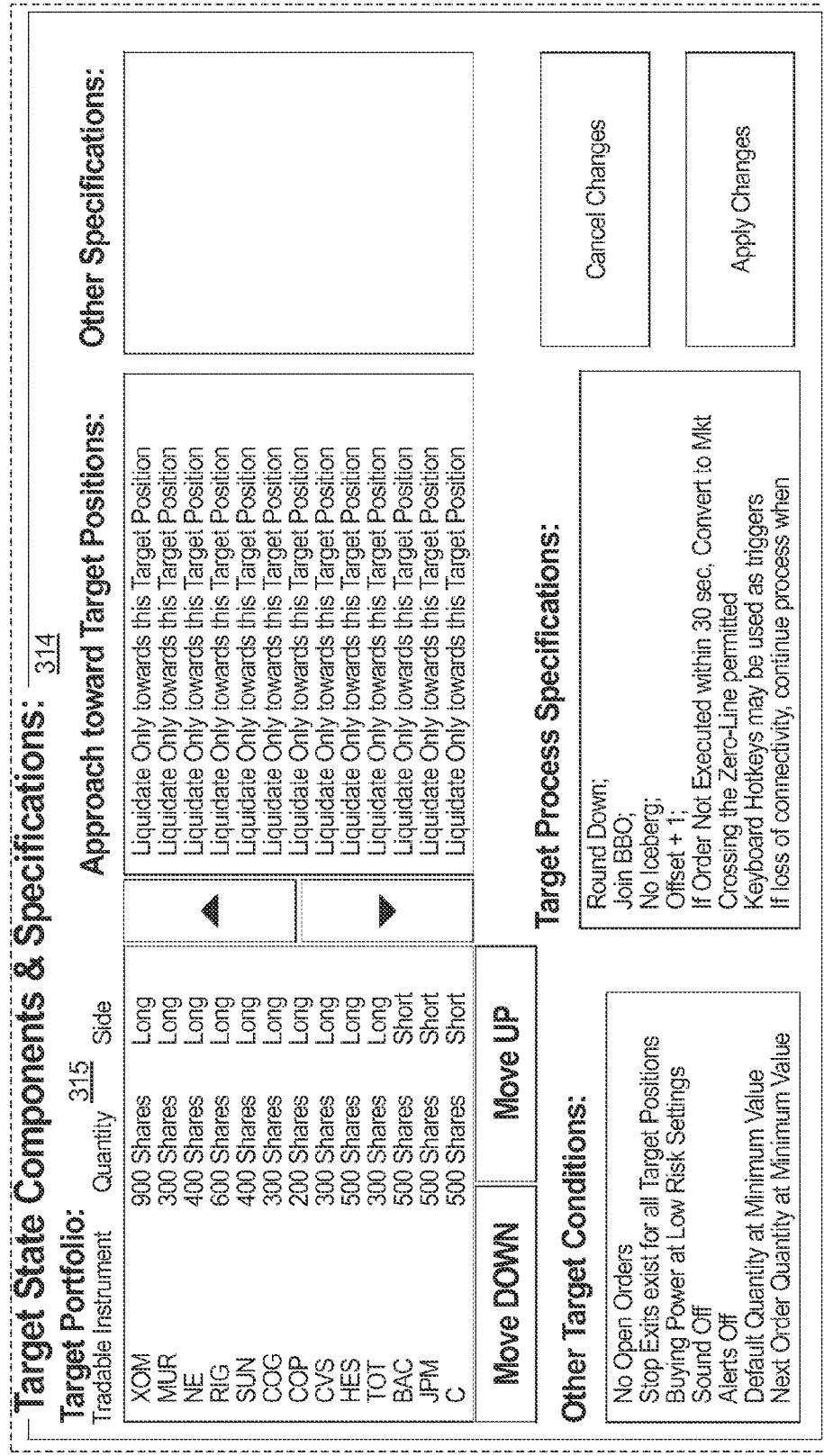
Figure 5D:
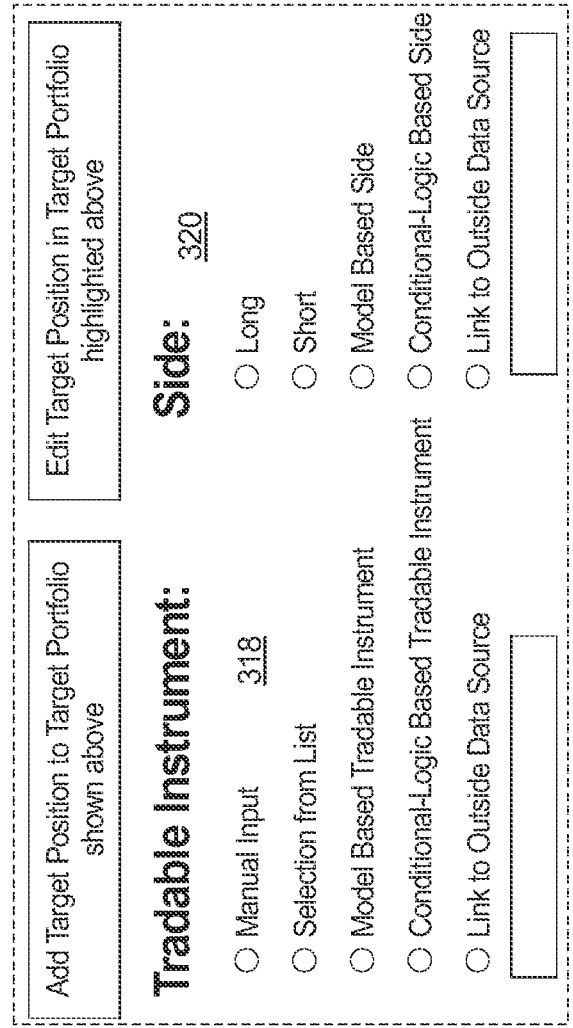
Figure 5E:
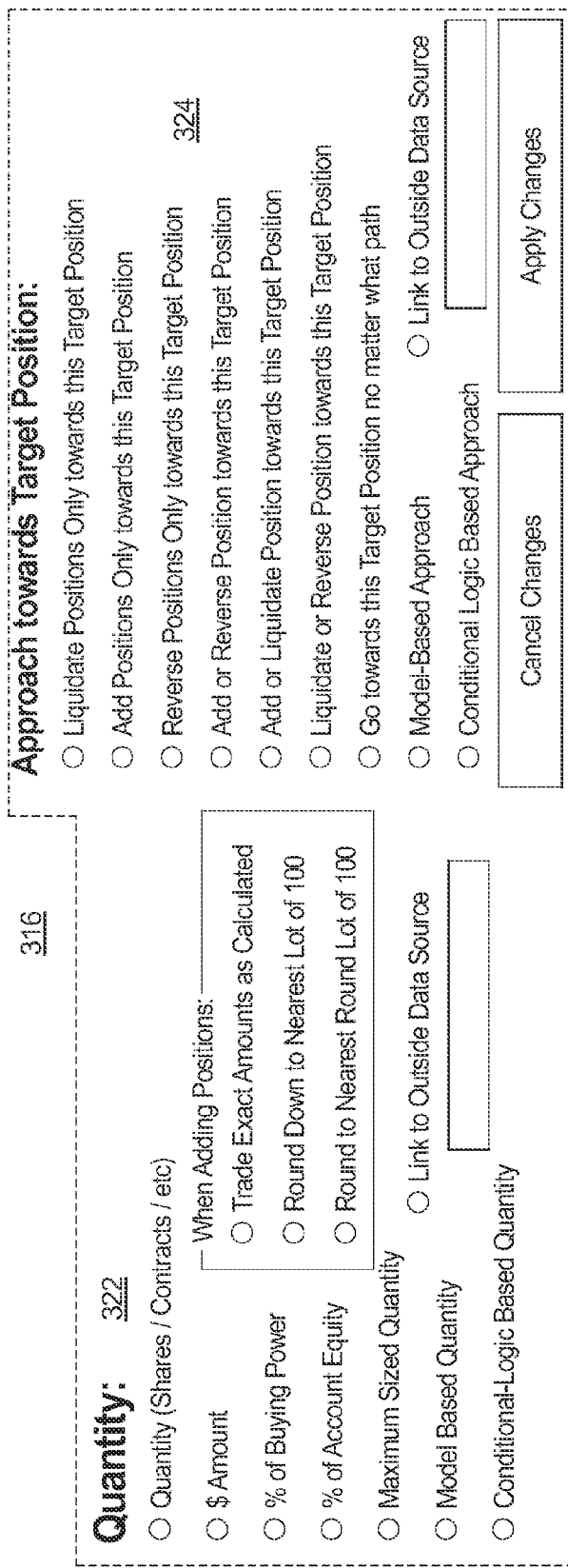
Figure 5F:
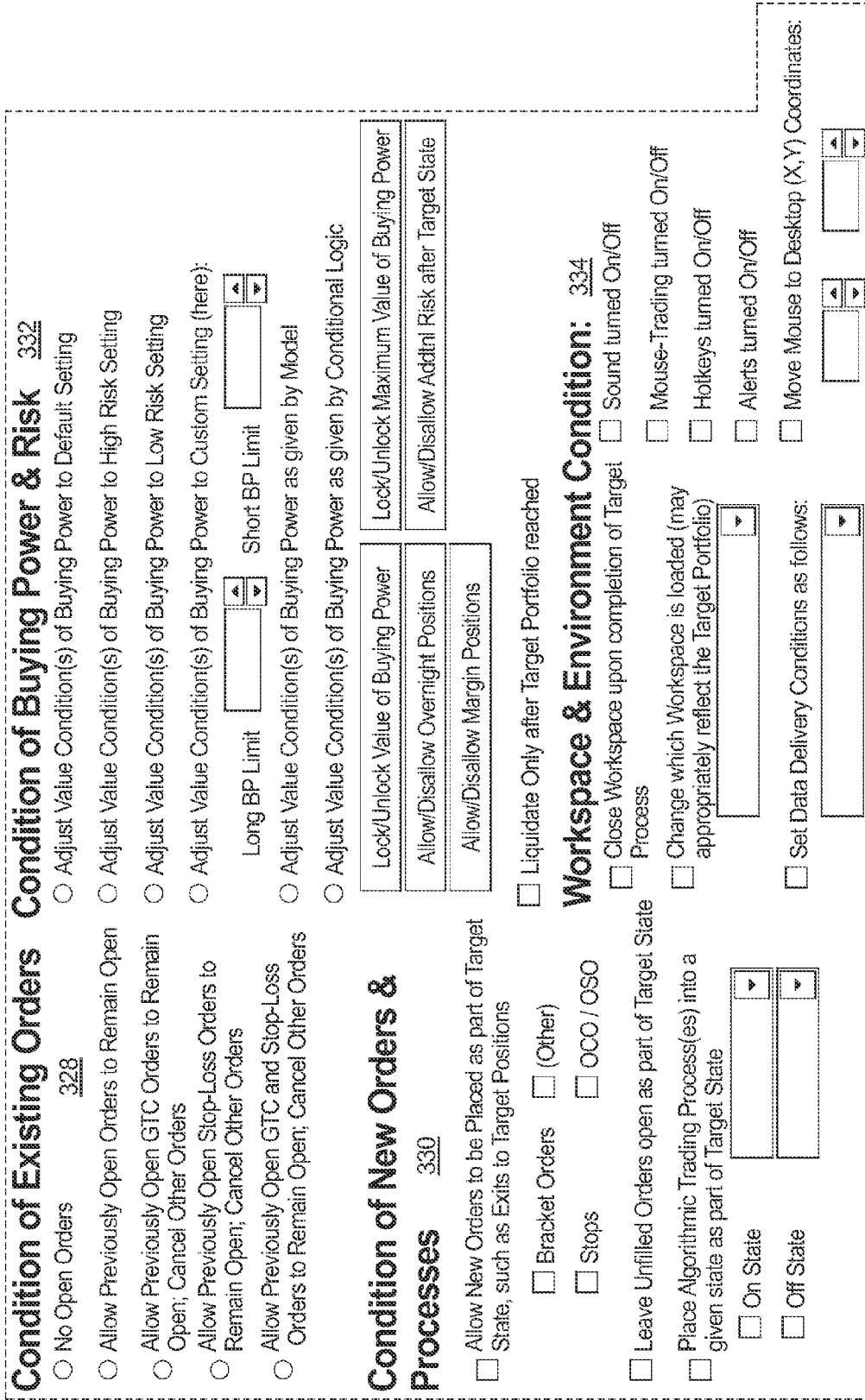

FIG. 1 illustrates a trading system 100 including a user interface 102 configured to place orders through a brokerage 104 to an exchange 106. As shown in FIG. 2, the user interface 102 includes one or more output devices 108 and one or more input devices 110, through which a user may interact with the trading system 100. The trading system 100 shown in FIG. 1 is particularly adapted to define one or more target states, each target state including a target portfolio of one or more target positions such that when triggered, the trading system 100 identifies orders required to reach the one or more target positions in the target portfolio from the initial state.

Aspects of the trading system 100 shown in FIG. 1 are controlled by one or more controllers 112. The one or more controllers 112 may run a variety of software applications, may access and store data, including accessing and storing data in associated databases, and may enable one or more interactions via the output devices 108 and input devices 110. Typically, the one or more controllers 112 are implemented by one or more programmable data processing devices. The hardware elements operating systems and programming languages of such devices are conventional in nature, and it is presumed that those skilled in the art are adequately familiar therewith.

For example, the one or more controllers 112 may be a PC based implementation of a central control processing system utilizing a central processing unit (CPU), memories and an interconnect bus. The CPU may contain a single microprocessor, or it may contain a plurality of microprocessors for configuring the CPU as a multi-processor system. The memories may include a main memory, such as a dynamic random access memory (DRAM) and cache, as well as a read only memory, such as a PROM, an EPROM, a FLASH-EPROM, or the like. The system may also include mass storage devices such as various solid-state drives, disk drives, etc. In operation, the main memory may store at least portions of instructions for execution by the CPU and data for processing in accord with the executed instructions.

The one or more controllers 112 may also include one or more input/output interfaces for communications with one or more processing systems. Although not shown, one or more such interfaces may enable communications via a network, e.g., to enable sending and receiving instructions electronically. The physical communication links may be wired or wireless. For example, these links may be used to communicate with a brokerage 104 and/or exchange 106.

The one or more controllers 112 may further include appropriate input/output ports for interconnection with the one or more output devices 108 (e.g., monitors, printers, etc.) and the one or more input devices 110 (e.g., keyboard, mouse, voice, touch, bioelectric devices, magnetic reader, RFID reader, barcode reader, etc.). For example, the one or more controllers 112 may include or be connected to a graphics subsystem to drive a display 108. The links to the peripherals may be wired or wireless connections.

Although summarized above as a PC-type implementation, those skilled in the art will recognize that the one or more controllers 112 also encompasses systems such as host computers, servers, workstations, network terminals, and the like. In fact, the use of the term controller 112 is intended to represent a broad category of components that are well known in the art.

Aspects of the trading system 100 encompass hardware and software for controlling the relevant functions. Software may take the form of code or executable instructions for causing a controller 112 or other programmable equipment to perform the relevant steps, where the code or instructions are carried by or otherwise embodied in a medium readable by the controller 112 or other machine. Instructions or code for implementing such operations may be in the form of computer instruction in any form (e.g., source code, object code, interpreted code, etc.) stored in or carried by any readable medium.

The brokerage 104 shown in FIG. 1 is a financial institution, which in many instances acts as an intermediary between the user interface 102 and the exchange 106. However, it is understood that some embodiments of the trading system 100 may connect directly to the exchange 106, without an intermediary such as the brokerage 104 shown in FIG. 1.

The exchange 106 shown in FIG. 1 is a forum where tradable securities, commodities, currencies, futures, and options contracts are bought and sold. For example, the exchange 106 may be a stock exchange, securities exchange, commodity exchange, futures exchange, foreign exchange market, etc. It is understood that the exchange 106 shown in FIG. 1 may be any forum in which tradable instruments are bought and sold.

As shown in FIG. 2, using the trading system 100 shown in FIG. 1, a user may define one or more target states. The target states may include a target portfolio of one or more target positions. When triggered, the trading system 100 may identify one or more orders required to reach the one or more target positions in the target portfolio from an initial portfolio. The identified orders may be automatically executed, in whole or selectively in part, or may be manually executed at the user's command. For example, a single user action may identify the orders and trigger their execution. In another example, the user may be presented with a list of identified orders, from which the user may choose to execute one or more of the identified orders. Of course it is also understood that the trading system 100 shown in FIG. 1 may be adapted to execute, or selectively execute, the orders required to reach the target portfolio without identifying one or more orders required to reach the one or more target positions in the target portfolio from an initial portfolio.

It is further contemplated that the trading system 100 shown in FIG. 1 may be adapted to execute, or selectively execute, the orders required to reach a target portfolio without user action, and based on one or more triggers provided in the trading system 100. For example, the trading system 100 may be automatically triggered to execute, or selectively execute, one or more orders required to reach a target portfolio based on the monitored status of factors and/or functions. Examples of such factors and functions are provided in U.S. patent application Ser. No. 13/046,677, filed on Mar. 11, 2011, the entirety of which is incorporated by reference herein. The examples of factors and functions provided in U.S. patent application Ser. No. 13/046,677 are described therein relative to the adjustment of conditions related to buying power; however, as used herein, the examples of factors and functions may relate to the adjustment of conditions from an initial state to a target state. For example, one or more trader performance based factors, one or more temporal based factors, one or more market condition factors, and/or other factors and/or functions which may be individually or collectively monitored by the trading system 100 such that the target process may be triggered by the conditions of the one or more factors and/or functions. In a specific example, a trader may manually defined a target portfolio to contain a target position long four contracts light sweet crude oil futures and a target position short two contracts natural gas futures. The goal of the trader is to make extra money during the market day, but if the trader's intraday trading performance begins to suffer, such as by surpassing a given loss threshold, then the target process will be triggered to automatically take the trader's account to the prescribed target portfolio from the current portfolio. In this example, the trader's intraday trading performance may be monitored in real-time using a standalone factor such as total intraday profit/loss on the day, or may possibly be combined with other "trader profile"/"trader performance" factors such as the number of profitable trades compared to the number of unprofitable trades, average profit per winning trade compared to the average loss per losing trade, etc. Other examples are provided herein and still further examples will be apparent to one skilled in the art based on the disclosure provided herein.

The factors and/or functions may further be used to determine the components of one or more target positions, including the tradable instrument, quantity, side of market, approach towards target position (as described further herein), etc. This is true regardless of whether the components of one or more target positions are manually or automatically set or adjusted using a target state settings manager 302 (described further herein with reference to FIGS. 4 and 5). In one example, a function involving multiple factors reflects a bullish market bias and low volatility. Accordingly, the system may react automatically or in response to user input to set the side of market for a target position to long and set the quantity of the target position to a relatively high value of 50 contracts. In another example, a function involving multiple factors reflects a bearish market bias, high volatility, and poor trader performance so far during the trading day. Accordingly, the system may react automatically or in response to user input to set a relatively small value of short 10 contracts to reflect the higher volatility and higher risk due to poor trader performance. Similarly, the tradable instruments themselves and the approach towards target position may be derived using functions and/or factors. Still further, the factors and/or functions may be used to supply the target process specifications. In one example, a market volatility factor is used to determine the offsets used as order components. For instance, in a high volatility environment, buy and sell orders are offset by three price ticks. In a low volatility environment, buy and sell orders are offset by only one price tick. Further examples are left out for simplicity, but include a variety of ways in which one or more target positions in a target portfolio may have their components derived or adjusted using factors and/or functions, target process specifications may be derived or adjusted using factors and/or functions, or other conditions as part of a target state may be derived or adjusted using factors and/or functions. It is noted that regardless of the methods in which factors and/or functions are applied, the triggers applied within the trading system 100 may be submitted manually such as by mouse-click, hotkey-press or other user action, or may be event-based triggers, automatic triggers based on factors and/or functions, etc.

Turning now to FIG. 3, a schematic representation of elements of the trading system 100 is provided. In use, the trading system 100 may include and/or identify the following elements: an initial state 202, including an initial portfolio 204 and other initial conditions 206; a target state 208, including a target portfolio 210 and other target conditions 212; and elements of the target process 214 including the orders required for target process 216; and other processes 218 that are part of the target process 214.

As shown in FIG. 3, the initial portfolio 204 may include identification of the initial position 220, the identifier 222 (i.e., whatever is used to identify the tradable instrument within the trading system 100, for example, a symbol, an abbreviation or such), the side of initial position 224, the initial quantity 226, the price 228 and the currency value 230. Similarly, the target portfolio 210 may include identification of the target position 232, the identifier 222, the side of the target position 234, the target quantity 236, the price 228 and the currency value 230. Although the conditions identified as part of the initial portfolio 204 and the target portfolio 210 in FIG. 3 are discussed in the preferred embodiments described herein, it is understood that a given embodiment of the trading system 100 may include and/or identify any lesser or greater number of conditions as will be appreciated by one of ordinary skill in the art based on the disclosure herein.

The orders required for target process 216 identified in FIG. 3 include: the identifier 222; identification of portfolio membership in the initial portfolio 238 (i.e., whether the identifier 222 is included in the initial portfolio 204); identification of portfolio membership in the target portfolio 240 (i.e., whether the identifier 222 is included in the target portfolio 210); the order 242 (e.g., buy, cover, sell, short); the quantity 244; the order type 246 (e.g., limit, market, stop, etc.); optional order conditions 248 (e.g., iceberg, fill or kill, the exchange the order is routed to or through, etc.); and the type of transaction required 250 (e.g., liquidate, add or reverse).

Referring now to FIG. 4, a further schematic representation of processes and elements of the trading system 100 is provided. As shown in FIG. 4, the portion of the trading system 100 shown represents a target process management system 300. Within the target process management system 300 shown there is a target state settings manager 302, a target state process manager 304, a target process specifications manager 306, a target process trigger panel 308, a target process trigger manager 309, target process summary panel 310.

As example of a target state settings manager 302 is shown in FIG. 5. The first section shown on FIG. 5 is a target state section 312. In this area, users may add and name new target states 208, rename existing target states 208, delete existing target states 208, copy existing target states 208 in order to create similar target states 208, and set any of the selected target states 208 as a default target state 208 stored within the trading system 100. By highlighting one of the existing target states 208 in the list, a user may view and edit its components and specifications.

Shown next on FIG. 5 is a "target state components & specifications" section 314. In the first part of this 314, "target portfolio" section 315 containing a target portfolio 210 of one or more target positions 232 is displayed. As can be seen, the target portfolio 210 includes numerous target positions 232, each target position 232 including an identifier 222, as well as the target quantity 236, the side of the target position 234. In some systems 100 wherein account holders may never enter short positions, such as systems 100 adapted for managing cash accounts, there may be no side of the target position 234, as the side may be inherently understood to be on the long side of the market. In other scenarios where the target quantity 236 may be a positive or negative value, the side of the target position 234 may not need to be provided. Note that in the target portfolio section 315 shown in FIG. 5, there are "move down" and "move up" buttons. These buttons are intended to represent ways in which the target positions 232 may be ordered within the target portfolio 210. This is given because in some situations, priority may be given to go towards target positions based on their user-directed ordering such as is shown here. To the right of the box including an example of a target portfolio 210, other up and down arrows are shown. These arrows are intended to represent ways in which different target positions 232 within the target portfolio 210 may be highlighted. Whichever of the target positions 232 is highlighted, the specifications set for that target position 232 may be prescribed or edited as is shown in the section "tradable instrument, side, quantity, approach towards target position" section 316, shown in FIG. 5.

As can be seen, there are other components to the "target state components & specifications" section 314 on FIG. 5. The "approach towards target position" section is read-only, and is based on settings that may have been applied in the "tradable instrument, side, quantity, approach towards target position" section 316 shown below. The "other target conditions" section is read-only and may be based on settings that have been applied in the "Other Target Conditions" section 326 on FIG. 5. The "target process specifications" section is read-only and may be based on output of the target process specifications manager 306 (described further herein). The "other specifications" section is the section in which other specifications that may exist as part of a target state 208 may be represented.

In the example shown in FIG. 5, the target state section 312 displays a target state 208 named "long energy & short financial stocks (small size)." The target portfolio 210 which is a component of this target state 208 is shown in the "target state components & specifications" section 314. In the example displayed, the target portfolio 210 contains the identifiers of 13 tradable instruments, along with their target quantity 236 and side of the target position 234. (As used herein, "identifiers" refers to the name or symbol used to identify a tradable instrument, and may sometimes be referred to simply as the tradable instrument.) Further, in the "tradable instrument, side, quantity, approach towards target position" section 316 in FIG. 5, the user may add and edit target positions 232 within the target portfolio 210. Target positions may be added to the target portfolio by clicking the button "add target position to target portfolio shown above," and existing target positions may be edited by clicking the button "edit target position in target portfolio highlighted above."

It should be noted that not all of the components displayed in the example of the "target state components & specifications" section 314 shown in FIG. 5, as well as other sections on the target state settings manager 302 example shown in FIG. 5 may be required components of a target state settings manager 302. Further, additional components and specifications of a target state settings manager 302 may be provided, beyond those displayed in these examples. Still further, the target state settings manager 302 may be set up in the form of a software wizard, which may be an appropriate context due to the complex nature and interaction of components and specifications within the target state settings manager 302.

It should also be noted that many of the methods and specifications provided in the trading system 100 may be applied at various levels within the trading system 100 (e.g., target portfolio level, target position level, etc.). It is understood that examples used to specifications applied at the target portfolio level may be alternatively applied at the target position level and vice versa.

As further shown in FIG. 5, there is a "tradable instrument, side, quantity, approach towards target position" section 316. Within this section 316 there are four components: a "tradable instrument" section 318, a "side" section 320, "quantity" section 322, and an "approach towards target position" section 324. In the "tradable instrument" section 318, users may add tradable instruments for a new target position 232 within the target portfolio 210 shown in the "target state components & specifications" section 314, or may edit tradable instruments for an existing target position 232 within the target portfolio 210. The ways by which tradable instruments may be added or edited include but are not limited to: manual input, selection from list, model based, conditional-logic based, and linked (or pulled) from an outside data source. While the manual input and selection from list options may be intuitive, as described further herein.

In the side section 320, users may select the side of the target position for inclusion in the target portfolio in the "target state components & specifications" section 314. If the user just added a new target position within the target portfolio, such as by pressing the "Add Target Position to Target Portfolio shown above" button, then this may be the default target position which is selected by default for editing the side applied. However, users may also select any other target position for which to edit the side applied. As is shown in the example in FIG. 5, the sides applied may be but are not limited to the long side, the short side, a side based on a model, a side based on conditional logic, or a side based on a link to an outside data source. While the long side and short side options may be intuitive, as described further herein.

In the quantity section 322, users may select the quantity of the target position which is currently highlighted in the target portfolio above. If the user just added a new target position within the target portfolio by pressing the "add target position to target portfolio shown above" button, then this may be the default target position which is selected by default for editing the quantity applied. However, users may also select any other target position for which to edit the quantity applied. As is shown in the example in FIG. 5, the quantity applied may be input in various formats, such as but not limited to as a quantity of shares, contracts, or any other metric, as a dollar or currency amount, as a percent of buying power, as a percent of account equity, as a maximum sized quantity, as a model-based quantity, as a conditional-logic based quantity, or a quantity which is linked in from an outside data source, or other methods. While some of these methods may be intuitive, as described further herein. Also shown in this section is that users are given multiple options for rounding the quantity amounts, such as share amounts, down, up, or not at all, if applicable. Note that the rounding options are contained within a box labeled "when adding positions." The reason for this is that it is envisioned that in most scenarios, when a user holds an odd-lot of a given tradable instrument that they need to liquidate as part of a process from an initial state 202 to a target state 208, then there is high likelihood that the user would want the entire position held to be liquidated. However, in situations wherein the user is prescribed to add a target position to the account, the user may be more likely to round the quantity up or down, as opposed to possibly trading an odd-lot amount. This is why the options shown is not displayed for all order amounts; however, in other cases, that may be the desired method of such a system.

Using a process described herein as selective execution, the trading system 100 selectively executes one or more functions using one of multiple methods. There are two primary examples used herein to illustrate the selective execution methods. The first example represents a selective execution method in which the selective execution is based on a user selected command. The second example represents a selective execution method in which the selective execution is based on derivation of one or more conditions assessed by the trading system 100.

In the first example of a selective execution method, a user may selectively execute only the orders that involve any one or more of specific types of transactions which are submitted by a user or system (reverse position, add position, liquidate position and no action) or may exclude orders that reflect any one or more of specific types of transactions which are submitted by a user or system.

In the second example of a selective execution method, a user may selectively execute functions as is derived from a side-selection process (i.e., a process through which the same side, opposite side or no side of the market is selected by the trading system 100 based on a reference to one or more variables). There may be multiple methods of implementing the side-selection process. In one example, functions such as buy orders, sell orders, cancel buys, cancel sells, etc. may exist in a macro or other process, and by implementing a selective execution method including a side-selection process, the trading system 100 may execute only the buys (buy orders, cancel buys, etc) and not execute the sells (sell order, cancel sells, etc). In another example, one or more functions are provided without a side of market component (buy/sell/ buy to cover/sell short). Prior to execution of the functions, a selective execution method including a side-selection process is invoked through which the trading system 100 assigns a side of market to the one or more functions previously lacking a side of market component. For instance, a join function and a cancel (side) function may exist in a macro. When the macro is executed (or prior thereto), the buy side is assigned to both functions, which are then executed as buy join and cancel buys functions.

The selective execution may be applied to any or the functions provided by the trading system 100. It is contemplated that methods of selective execution may be particularly useful for traders managing portfolios of positions. However, there may still be significant benefit in applying selective execution methods for choosing which transactions to execute towards specified target portfolios of only one or a few target positions.

It is important to note that, particularly in the discussion of selective execution herein, the use of the terms "allow," "allowed," "allowed to execute," "execute," "executed," "selectively executed," etc. in the context of functions generally mean functions that are allowed, functions that are not disallowed, functions that are able to be executed, or functions that are executed, depending on the context. Further, the use of the terms "disallow," "disallowed," "not allow," "not allowed," "disallowed to execute," "not execute," "not executed," "not selectively executed," "selectively not executed," etc. in the context of functions, describe functions that are disallowed, functions that are not allowed, functions that are not able to be executed, or functions that are not executed, depending on the context.

In one example of the application of selective execution within the trading system 100, a user might want to take one or more steps towards a specified target portfolio, but may or may not wish to have the entire process automated. The user might wish to automate the liquidation of positions or the adding of positions, or the reversal of positions, or a combination of such transaction types, but not all of them. In one scenario, the user may be of the opinion that the liquidation process is best automated, because it uses a sophisticated algorithm of bracket orders involving multiple order components; meanwhile the adding or reversal of positions may best be performed manually. In a related example, a user may wish to automate the execution of orders for all stocks with high volume and high liquidity, but manually execute orders for all stocks with low volume and/or low liquidity. In another example, a trader may focus on trading one stock, and may choose to manually enter all orders for that stock, but may choose to automate all orders for all other stocks. Reasons for how traders may wish to apply methods of selective execution methods are expected to vary by trader, with possibly explicit reasons or simply for reasons of preference. Based on varied user requirements, the target process may be adaptable to meet such varied needs.

Execution of functions in the trading system 100 may further be selected based on the order (cover/sell), order type (limit/market/etc.), type of transaction required (add/liquidate/reverse/etc.). In another example, if a trader has already used up a significant portion of the available buying power, it could be possible that due to buying power constraints the trader may only liquidate positions before new positions could be added. Accordingly, the trading system 100 may be adapted to selectively execute only orders to liquidate.

Because of variant goals and trading styles amongst traders, it is expected that users may wish to apply selective execution methods in unique and varied ways. To that end, it is understood that selective execution methods may be applied at different levels and using varying processes of any magnitude of interactivity and complexity. For example, various selective execution methods may be applied to operate at the level of a target position, the level of a target portfolio, the level of all target positions for a specified tradable instrument for all target portfolios, or the level of all target positions for all target portfolios. Further, selective execution methods may be assigned at more than one of these levels, with rules governing which assignments take precedence. Similarly, other types of settings and specifications, aside from selective execution methods, may be applied at multiple levels as well. Excessive details have been omitted for simplicity.

For example, turning back to FIG. 5, as described above, the example of a target state settings manager 302 includes an "approach towards target position" section 324. Specifications that are set to apply at the level of the target position, such as in the "approach towards target position" section 324, may be overwritten and/or superseded by other specifications applied to one or more entire target portfolios, such as the specifications that may be provided in the "approach towards target portfolio" section 342 shown in FIG. 14. Further, specifications that are set in the "approach towards target position" section 324 may overwrite or supersede specifications applied to one or more entire target portfolios, as will be understood in light of the description of the "approach towards target portfolio" section 342 provided further herein.

As is shown in the "approach towards target position" section 324 shown in FIG. 5, seven initial options are provided to the user: "liquidate positions only towards this target position," "add positions only towards this target position," "reverse positions only towards this target position," "add or reverse positions only towards this target position," "add or liquidate positions only towards this target position," "liquidate or reverse positions only towards this target position," and "go towards this target position no matter what path." Given the prior discussion related to selected execution, all of these options are expected to be understood. However, a brief example is provided for clarity. If an initial portfolio contains an initial position of long 500 shares of INTC, and a target portfolio contains a target position of long 200 shares of INTC, then if the option selected in the "approach towards target position" section 324 was "add positions only towards this target position," either no order to liquidate 300 shares of INTC would be generated in the list of identified orders required to go from the initial position to the target position, or the order to liquidate 300 shares of INTC would be generated in the list of identified orders required to go from the initial position to the target position, but the order would not be executed. If, on the other hand, the user-selection in the "approach towards target position" section 324 was "liquidate positions only towards this target position", "add or liquidate positions only towards this target position", "liquidate or reverse positions only towards this target position," or "go towards this target position no matter what path," then the order would be generated in the list of identified orders required to go from the initial position to the target position and/or, based on system design or user-preference, the order would be executed. In this example, this type of behavior would operate on the INTC position regardless of the settings applied to other positions in the target portfolio. Variant settings may further be applied to any other target positions which may exist, thereby allowing the target process to be extremely controllable by users. Aside from the initial seven options discussed above, two other methods are shown including a model-based approach a conditional-based logic approach, which were both introduced earlier in the context of factors and/or functions. Lastly, approach towards target position may be defined based on a link to an outside data source.

It is further noted that even though the main categories for types of transactions described herein (and particularly with respect to the "approach towards target position" section 324) were categories to liquidate positions, add positions, reverse positions, as well as the combinations of these categories as discussed previously, there are other possible categories for the type of transaction. For example, the reverse positions category could be split into multiple categories, wherein one category of reverse position has the effect of reversing position while reducing risk exposure in the market, while another category of reverse position has the effect of reversing the position while increasing risk exposure in the market, and while the last category of reverse position has the effect of reversing the position while keeping the risk exposure in the market constant. Whether a transaction fits into the first, second, or third type of reverse position category is dependent on whether the absolute value of the quantity of the target position is less than, greater than, or equal to the absolute value of the quantity of the initial position. As can be seen, even though other categories may exist, not all categories have been explained in as much detail as the types of transaction categories to liquidate, add or reverse positions. These other types of transactions have largely been left out of the description for simplicity's sake. It is further expected to be understood that the same types of methods discussed here in the context of the types of transactions may also be applicable to other elements and variables in the trading system 100, not just to the type of transactions.

The systems and methods described herein provide trading systems 100 adapted to enable a trader, or other user, to utilize any function, such as a model or method of conditional-logic, to prescribe many of the inputs to (or components of) target positions, such as the tradable instrument, the side, the quantity, or the approach towards target position. By this method, or by other related methods, each target position within a target portfolio, as well as the target portfolio as a whole, may be considered to be variable. The function used to identify the tradable instrument, the side, the quantity, or the approach towards target position of one or more target positions may include various factors such as one or more user triggered variables, one or more trader performance based variables, one or more temporal based variables, one or more market condition variables, etc.

In one example, statistical or other modeling may be used, in whole or in part, to calculate one or more target conditions, such as, components of target positions. Generally, examples of factors to be used in establishing or calculating appropriate target positions may include: the day and/or time; calendar events (e.g., economic events, contract expiration dates, planned political events, etc.); the trader's trending performance and other activity (e.g., is the trader currently on a winning or losing streak and what is the magnitude of that streak, trade size, risk of the position(s) already held, percentage of recent trades that have been profitable); the market conditions (e.g., is it a trending or a choppy market); any other categorical, Boolean or scaled variables entered by the users. Further, the factors may be adapted in any combination and may be designated to hold any importance and/or effect on the outcome of function as understood to be most beneficial to the developer of the particular function. Moreover, in some situations, all of the factors may play a noticeable role in the variability of the function output, whereas in other scenarios, only two or three factors may account for the function's variability.

It is also understood that the calculations and/or implementation of the function toward any one or more of the components of the target position may be performed continuously, at predetermined intervals or in response to a user command or other event trigger. In some examples of the systems and methods provided herein the function calculation of target position may occur in approximately in real time, such that the function is more or less continuously adapting one or more components of one or more of the trader's target positions in response to changing factors. Accordingly, in systems and methods incorporating a function used, at least in part, to calculate one or more components of one or more target positions, the one or more components of the one or more target positions may be variable in response to conditions, such as market conditions, time of day, trader-performance, etc. The described variable target position functionality may therefore allow for target portfolios to vary quite dramatically based on current conditions. Further, the variable target position functionality may incorporate elements of risk management functionality in cases in which the model used to influence prescribed target positions is adapted to correspond to changing conditions.

In one example, a trader has been trading a slow moving, very inactive stock one morning. He notices that the energy markets are becoming highly volatile and highly liquid, which usually represent conditions associated with profitable trading. The trader decides he wants to liquidate his initial portfolio and take a position in energy markets. However, the trader does not want to spend time thinking about what orders to place to reach his goal; he just wants his account to contain a target portfolio of positions in the energy markets which are most likely for the tradable instruments most likely to be profitable over the immediate future, on the most profitable side of the market, in a quantity that is reasonable given the trader's profit/loss profile for the day, and approach the target positions in any way. Then, after the positions are taken, which may take just seconds or less, the trader will have time to get acquainted with his new portfolio, as well as the market data for the energy markets. The trader's goal in the situation described may be summarized as wanting to be involved in a given market, but not knowing and not wanting to think about what initial steps to take. The approach would only be justified from a risk perspective if the function based target portfolio has been deemed profitable over the longer term. In this scenario, wherein the trader desires to hold a function based target portfolio (i.e., a target portfolio derived by a model or conditional-logic), the methods used to calculate the target portfolio (including target positions), i.e., what type of function which may be applied to calculate each component of each of the one or more target positions, as well as the factors included in each function, may be exceedingly complex. However, a simple example is provided. Assume that a trader has decides that if the stock market starts to break out to the upside of a tight range, he would want to join this move in the market. Let's assume this happens, and the trader triggers a method to start the target process in order to reach a target portfolio, for example a target portfolio which is long the market. This trigger serves to invoke the following automated processes as defined by the user (or as a system default): the system performs a query or applies a market scanner to determine the leading sector or sectors of the last 3 days, then combines it with intraday data to pick the appropriate one or more sectors. The system further finds a group of not fewer than three and not more than seven stocks within the sector or sectors defined. Based on the number of stocks in total, the dollar amount to be allocated to each stock is determined, which is then applied to reach a target position quantity for each stock. Further, based on the spread and volatility and volume of each stock, the appropriate order type is automatically applied for each tradable instrument. Further, the approach towards target position in this case may be set to "approach or reverse towards target portfolio" as a whole, based on the consideration that the user wants to initiate positions or take risk in the markets. Similarly, other variables or components of the trading process may be automated as well towards a target portfolio or as part of the target process in general.

In one example, target conditions may be selected to be identified, generated, calculated, etc. by one or more functions in the "tradable instrument, side, quantity, approach towards target position" section 316, as shown in FIG. 5. Specifically, the "tradable instrument" section 318, the "side" section 320, the "quantity" section 322, and the "approach towards target position" section 324 each include an option for the user to select the conditions are to be identified, generated, calculated, etc. using as model based or conditional-logic based functions. When a user selects "model-based" or "conditional-logic" based methods in any of these sections, the user may be provided with further options for how the function should operate. A software wizard may be provided to step the user through the complex process of creating or identifying an appropriate function. Similarly, the option shown to "link to outside data source" may link to the output of an external function or other data source used to provide the specific target condition.

As used herein, "tradable instrument state" refers to whether a tradable instrument has its trading functionality, and other related functionality, turned on or off. As an example, if the tradable instrument state for a particular tradable instrument is on, the trading system 100 enables functionality related to and/or incorporating the tradable instrument. Alternatively, if the tradable instrument state for a particular tradable instrument is off, the trading system 100 disallows functionality related to and/or incorporating the tradable instrument. It is understood that the tradable instrument state of a given tradable instrument may be used to allow or disallow elements of a process or function that spans more than one tradable instrument. As a simple example, if the execution of an order were to liquidate positions for two distinct tradable instruments, but the tradable instrument state of one of the instruments is "off," the order may only liquidate the position of the tradable for which the tradable instrument state is "on."

Other states, aside from tradable instrument state, may be applied within the trading system 100, such as the state of an exchange, the state of an account, the state of a group manageable by a user, etc. In more granular methods, a state may be applied to specific functions, such as the state of volume applied to a particular tradable instrument. This may specifically control whether volume functions may be active or inactive. The state of an exchange may specifically control whether functions related to all contracts part of that exchange may be active or inactive, etc. Even though tradable instrument state is the exemplary example of a state discussed herein, in general the methods discussed for tradable instrument state may be generalized to all other states as well.

In the trading system 100 provided herein, traders may toggle the tradable instrument state on or off for one or more tradable instruments to temporarily enable or disable trading and associated functionality for any one or more specific tradable instruments. In one example, the trader may launch the trading software platform in the beginning of the work day, and upon doing so, may turn on the tradable instrument state for only one of the three tradable instruments that is typically traded, and leave the other two tradable instruments with their tradable instrument state turned off. A trader may do this to remind himself to start trading slowly, one tradable instrument at a time until the trader becomes confident he is trading well. If the trader attempts to make a trade on one of the tradable instruments with its tradable instrument state turned off, whether by mistake or due to habit, the order will not get executed. Users may also like this functionality when they wish to temporarily stop trading for some time to focus on other tasks; mistakes can be prevented if tradable instrument states are temporarily turned off in these types of situations.

In some examples, there may be other enhancements to the tradable instrument state functionality, such that the tradable instrument state may have time of day or other factors associated with them. In one example, if tradable instrument state is turned on, then if the current time of day is before 8:00 am, there is a time delay of 10 minutes before the enabling of the tradable instrument state change takes effect; if the current time of day is between 8:00 am and 9:00 am, there is a time delay of five minutes before the enabling of the tradable instrument state takes effect; if after 10:00 am, there is no time delay. Such methods may be used for managing risk in a trading environment. Other qualifying methods or adjustments of the tradable instrument state functionality may be applied in conjunction or in replacement of the time factors discussed.

With various states able to be controlled by users, traders may selectively execute functions depending on the status of one or more states. For example, with the tradable instrument state (or other states) controllable by users, traders may selectively execute functionality for one or more tradable instruments depending on the status of one or more associated tradable instrument states (or other states). Using these methods, traders may create macros (combinations of one or more executable functions) whereby the functions included within a macro may be selectively executed based on tradable instrument state or other states. In one example using the described methods, traders may create complex macros ahead of time, inclusive of functions applicable to a wide variety of tradable instruments. At runtime, the tradable instrument state for each of the tradable instruments associated with each of the functions will be checked, and functions will be selectively executed based on whether their tradable instrument states are on or off. If a user creates a macro with ten functions, one function for each of ten tradable instruments, then in one scenario, when the user executes the macro while three of ten tradable instrument states are enabled, three corresponding functions will be executed. In another scenario, when the user executes the macro while four of ten tradable instrument states are enabled, the four corresponding functions will be executed. As discussed, if the states are controlled at levels other than tradable instrument, such as the exchange level, then the methods could alternatively apply towards exchange, etc. The described methods are expected to be extremely powerful for computer savvy or otherwise technical users, allowing users to be extremely dynamic and powerful in their trading methods. As described, the toggling of various states (such as the tradable instrument state) in combination with the selective execution methods provided herein offers an extremely flexible trading solution. One main benefit is that users may adjust which tradable instruments they trade on the fly without having to re-write macros.

There are many ways in which the selective execution methods may be applied, but an illustrative example is provided in FIG. 10. In the example shown, the trading system 100 may allow the user to select between three options for execution approach as shown in "options for execution approach" section 380. In the example shown, the three options for execution approach that are provided are: (a) "high safety"—the process will check if the relevant state(s) (e.g. tradable instrument state) are on for every function in the process; if yes, the process will be run in full; if not, process will be aborted; (b) "medium safety"—the process will only execute functions that are associated with functions in which the relevant state(s) are on (or not off); other functions will not be executed; and (c) "low safety"—the process will execute all functions, regardless of the relevant state(s) associated with any of functions contained in process. Note that if multiple states related to one or more functions exist, further settings may be required to determine whether functionality should or should not be executed.

For example, as shown in FIG. 10, when the first option for execution approach 380*a* is selected ("high safety"), when a macro is triggered for execution/selective execution, all of the functions contained in the macro are examined, and the relevant state or states for each executable function is checked. If all of the relevant states are on, the macro will execute in full. If any of the relevant states are off, the entire macro will be aborted.

When the second option for execution approach 380*b* is selected ("medium safety"), when a macro is triggered for execution/selective execution, as functions in the macro are encountered, the relevant state for each executable function is checked. For each function whose relevant state is turned off, the function will not execute. For each executable function whose relevant state is turned on, the functions will execute. (PDR: reversed these; in FIG. 10 too)

When the third option for execution approach 380*c* is selected ("low safety"), when a macro is triggered for execution/selective execution, the macro will execute all functions, regardless of the state associated with any of functions contained in process. (PDR: reversed these; in FIG. 10 too)

The exact method for how execution approach is defined or when relevant states are checked may vary by system. Note that in the above examples, execution approach may be assigned by the user for each macro (lacking a user assignment, there may be a system default setting). However, even if a certain execution approach (e.g. "high safety", "medium safety", "low safety") may be assigned to each macro, the execution approach applied at execution time may be based only on the execution approach defined for the macro itself, or may be further based on the execution approach for all macros which are contained and/or called by the macro in question, and the associated execution approaches assigned to those macros. In other words, the highest level safety setting selected for any of the macros referenced by a given macro will be the safety method applied at execution time. This will be discussed in more detail later. In other examples of selective execution at a more granular level, the user-option for selective execution could be applied at the function level. While likely less user friendly, such trading systems 100 may be more powerful.

As can be seen from this example, trading systems may combine methods of selective execution with methods that do not rely on selective execution; selective execution may be a user-option at the macro-level or at other levels, depending on how selective execution is applied. Even though macros are the method used for the many examples discussed herein, there are other methods of applying selective execution. For example, any process or set of processes may be selectively executed similarly to the selective execution of macro functionality described herein.

The discussed methods of selective execution may be further applied to avoid errors and/or invalid platform states, etc. In one example shown in FIG. 10, before executing a process (e.g., macro), the trading system 100 checks to see whether each tradable instrument that is associated with each function included in the macro is a valid tradable instrument with an active data feed, available to have functions related to it executed. If one or more of the referenced tradable instruments is either invalid or does not contain an active data feed, then either the entire macro may be aborted, or only the functions which reference the invalid tradable instrument or same with an inactive data feed may be skipped, while functions which reference valid tradable instruments and active data feeds may have their functions executed. In another example, the trading system 100 will perform other types of error-checking, such as the existence of invalid or old functions in a macro or other process, or may check for cyclic dependency (infinite loops). The trading system 100 may further check for the validity of the code used with in the process, including but not limited to the ordering of the functions applied, and the syntax. In a different type of example, the trading system 100 may apply selective execution to smartly choose the type of order, such as a passive limit order or an aggressive market order, to apply in a situation, depending on the spread, liquidity, and volatility of the tradable instrument. In a specific example, a user may create a macro which contains both a passive limit order and an aggressive market order. Then, the user executes this macro while the trading environment is one of low volatility; therefore, using a method of selective execution, the passive limit order is executed and the aggressive market order is not executed. It is expected to be understood that a wide variety of selective execution methods may be applied is the ways suggested herein.

Returning to FIG. 5, the last main area shown in this example of a target state settings manager 302 is the "Other Target Conditions" section 326. The first part this section 326 is the "Condition of Existing Orders" section 328. The functionality shown is provided to enable users to specify how they want exiting open orders (as part of an initial state 202) to be managed in the target state 208. The first option "No Open Orders" means that regardless of what orders exist when the user triggers the target process, these orders will not exist (remain) as part of the target state 208. Most often, when this option is selected, the open orders will simply be cancelled. However in other scenarios, the existing open orders might be used in the process of reaching the target state 208. In such cases, rather than canceling the open orders, they may be executed to reach the target state 208. Other options in the "Condition of Existing Orders" section 328 allow the user more flexibility for how to handle their existing orders: "Allow Previously Open Orders to Remain Open," "Allow Previously Open GTC Orders to Remain Open; Cancel Other Orders," "Allow Previously Open Stop-Loss Orders to Remain Open; Cancel Other Orders," "Allow Previously Open GTC and Stop-Loss Orders to Remain Open; Cancel Other Orders." Of course additional or alternate options may be provided, as will be understood by one skilled in the art based on the description provided herein.

The next section shown in the example in FIG. 5 is the "Condition of New Orders & Processes" section 330. The first option "Allow New Orders to be Placed as part of the Target State, such as Exits to Target Position", is functionality which allows orders, aside from the orders required to reach the target portfolio, to be placed as part of the target process. For example, ten orders may be required to go from an initial portfolio to a target portfolio, but in addition, the user may include as part of the target state 208 for orders to be placed which will exit one or more target positions as part of the target portfolio. As shown, the exit orders may be bracket orders, stop losses, OCO/OSO, or any other order not provided in the example shown in FIG. 5.

The next option shown in FIG. 5 is the option to "Leave Unfilled Orders open as part of the Target State." This handles a variety of situations, such as when a target state 208 does not require an absolute Target Position to be reached, but instead allows a target range; it also handles other less common situations.

The last option shown in the "Condition of New Orders & Processes" section 330 is "Place Algorithmic Trading Process(es) into a given state as part of Target State." Further options shown allow the user to place any number of algorithmic trading processes into an on or off state as part of the target state 208. This functionality opens up an enormous number of options for users. In one example, consider where a target portfolio is included as part of the target state 208, and where the target state 208 further includes the status of an algorithmic trading process being placed into an "on" state. The algorithmic trading process may include the operation to exit positions included in the Target Portfolio. As may be appreciated, one large benefit of including this process being turned into an "on" state as part of target state 208 is that, in the case where a user wishes to have orders to exit the target portfolio as part of target state 208, the time and prices for when and where to place these exit orders may not be knowable ahead of time. It may be more profitable for users to exit positions when the most appropriate time arrives in the market—and the exit method may best be executed algorithmically at some point in the future.

In one example of the application of an algorithmic trading process within a target state 208, the user may manually trigger the target process, including the liquidation and addition of multiple stocks. In total, twelve transactions on tradable instruments may be included in the target process. Once the Target Portfolio has been reached, the target condition specified in the "Place Algorithmic Trading Process(es) into a given state as part of Target State" option will cause the trading system 100 to turn on the state of an algorithmic trading process to exit the positions taken as part of the target portfolio, pending a combination of factors such as changes in time and market conditions. As the state of the algorithmic trading process is now on, the target condition with respect to the algorithmic trading process being turned on has been reached. The liquidation of positions entered into as part of the target portfolio may occur later during the trading day, the next trading day, any other time, or not at all.

As described herein, an algorithmic trading process may include any type of process typically associated with the terms in the trading industry, such as the automated buying and selling of tradable instruments, the automated spreading of multiple tradable instruments, and other methods. There may be an unlimited number of algorithmic trading processes placed into the on or off state as part of the target state 208. These processes may include order-entry, order modification, order cancels, adjustments to risk, orders on multiple tradable instruments, and any other methods common to a trading environment. Processes may be placed into an on or off state as part of the target state 208 regardless of their state prior to reaching the target state 208.

Even though almost all of the discussion herein reflected a target state 208 including a target portfolio, or a target process which included the path towards a target portfolio, in some contemplated examples, it can be seen to be useful to have a target state 208 which does not include a target portfolio, as well as a target process which does not include the path towards a target portfolio.

The next section shown in the example in FIG. 5 is the "Condition of Buying Power & Risk" section 332. The set of functionality provided here is very valuable for users who wish to not only reach their target portfolio as part of the target process, but also reach a specified condition for risk and/or buying power as well. As shown in the example in FIG. 5, the functionality provided allows users to adjust the value condition(s) of buying power to default settings, high risk settings, low risk settings, custom (specified) settings, or to be settings provided using a model or conditional-logic. Further, other conditions of buying power and other risk-related conditions may be set as part of the target state 208 as well. Shown in FIG. 5 are toggle buttons to lock or unlock the value of buying power, lock or unlock the maximum value of buying power, allow or disallow overnight positions, allow or disallow additional risk after reaching the target state 208 and all or disallow margin trading. Also shown is a setting to allow the user to set the account to liquidate only after the target portfolio is reached. Accordingly, there may be a huge number of ways in which the user may prescribe for the condition of buying power and/or risk to be set as part of the target state 208. The options provided in FIG. 5 are by no means intended to be limiting.

An example of how a user may prescribe conditions of buying power and risk as part of a target state 208 is now provided. In one example, a user may prescribe target state 208 intended to be applied to the user's account towards the end of the day's trading, in which case the user typically wants to take their account to its core holdings and reduce risk. In this example, the target state 208 may be set to include a target portfolio, which may be a portfolio of core holdings that are typically held overnight, and the target state 208 may further prescribe for the value condition of buying power to be set to low risk settings, and further for the value of buying power to be locked at this low risk setting. In this example, it can be seen how the reduced risk in the buying power settings goes hand in hand with the settings for the target portfolio for the user's purposes of setting the account to appropriately low risk and core holdings at the end of the trading day. In another example, wherein the target process is initiated during an earlier time of the trading day, the buying power settings applied may more flexibly applied, such as being provided by a model or by conditional-logic which may be based on market variables such as volume and an overbought-oversold indicator, and may further be based on trader-performance variables such as profit/loss during the trading day.

The next part of the "Other Target Conditions" section 326 shown in the example in FIG. 5 is the "Workspace & Environment Conditions" section 334. These conditions are further ways in which the user may automate processes in a trading environment. The first item in the list of "Workspace & Environment Conditions" section 334 allows the user to prescribe for the workspace within the trading software to be closed as part of the target state 208. The next item allows the user to select which workspace is loaded and active as part of the target state 208. It is expected that the largest use of this functionality would be to match the workspace loaded appropriately with the target portfolio. In one example, if the target portfolio is set to include a grouping of energy stocks, then the workspace loaded may also be set to include charts and market data specifically for the same energy stocks, and possibly supplemental data such as energy futures and other energy indexes. Other items in the "Workspace & Environment Conditions" section 334 include allowing the target state 208 to include having the sound turned on or off, the mouse-trading turned on or off, the keyboard hotkeys turned on or off, the alerts turned on or off, and the data delivery conditions specified. The last item in the list allows the user to specify for a location on the user's desktop for which to place the mouse pointer, using X,Y coordinates. This may be useful for traders who typically need to perform all trading-related activities quickly, and therefore having a "home base" location for their mouse will provide time efficiencies compared to when a user has to search for where their mouse pointer is located across the multiple monitor setup typical for traders. The list discussed here as shown in FIG. 5 is by no means all-inclusive; many other workspace and environment conditions may be prescribed as part of a target state 208.

In one example of how the "Workspace & Environment Conditions" section 334 settings may work in conjunction with the target process, consider a scenario where a target process includes the identification of orders required to go to a target portfolio of financial stocks, further where the target process closes the current workspace and opens a workspace displaying a plethora of information regarding financial stocks, further where a list of the identified orders required to go to the target portfolio may be presented to the user smartly on the screen in the new workspace environment. The target process as described here may be separate from or may further include the execution of the orders as described. If the execution of the orders is separate, the user may trigger the execution of the orders or may cancel the execution of the orders using a simple input mechanism such as a mouse-click or hotkey press.

The last part of the "Other Target Conditions" section 326 shown in the example in FIG. 5 is the "Trading Platform Order-Entry & Variable Conditions" section 336. The first item in this list allows the user to set the default volume used for orders to a minimum or maximum value, a calculated value, a default value, a previously existing value or variable, or another value or variable, and the specific setting may be selected in the combo box shown. The next item in this list allows the user to set the next order size to a minimum or maximum value, a calculated value, a default value, a previously existing value or variable, or another value or variable, and the specific setting may be selected in the combo box shown. The third item in the list allows the user to include as part of the target state 208 settings for whether certain order-entry settings are applied or unapplied for future orders. The settings as shown may apply to any or all tradable instruments in the target portfolio, or even tradable instruments not included in the target portfolio.

Note that even though it is not shown for simplicity, the settings applied for many of the "Other Target Conditions" section 326 in FIG. 5 may be applied for all or one or more tradable instruments part of the target portfolio, or in some cases even tradable instruments not included in the target portfolio. Also note that even though it may not be shown, some of the settings shown in the example in FIG. 5 may become more powerful by incorporating additional associated inputs.

It should be noted that the target state settings manager 302 may be very complex, and may be best operated with a software wizard. It is expected to be understood that based on how a user interacts with the target state settings manager 302, further inputs and specifications may be required. Further, it is expected to be understood that options similar in scope to the conditions applied in the example in FIG. 5 are possible.

The next portion of the description provided herein addresses how wasteful parts of the order management process may be eliminated. Specifically, how to eliminate the need for traders to have to specify the side of the market or corresponding order type when sending orders or other functions to market.

In order to provide an improved method for sending orders and other functions to market, the trading system 100 provided herein may be adapted to selectively execute (or selectively not execute) one or more functions on either, both, or neither side of the market based on the condition of one or more variables. For example, a user may select to only execute functions on the same side of the market as an existing position, wherein one of the one or more variables which are tested may be a positive, negative or null value of the existing position quantity. Alternatively, the user may select to only execute functions on the opposite of the market as an existing position. The selection of whether to execute functions on the same or opposite sides of the market may be based on user selection or may be based on reference to another factor (such as, market conditions).

In one example, a user may trigger a macro which includes executable functions on both sides of the market, wherein at the time of execution, based on the user's prior direction (e.g., settings, macro functions, pre-selected factors or functions, etc.), the trading system 100 assesses the condition of one or more variables, and further selectively execute only the buy side functions, only the sell side functions, or none of the buy or sell functions. It is noted that buy and sell functions are not exclusively intended to represent orders. For example, "cancel buys" may be regarded as a buy function, "cancel sells" as a sell function, "convert buy order to market" a buy function, etc. Further, other functions other than buy and sell functions included in the macro may be executed or not executed regardless of the condition of the one or more variables. Such an example allows a user to create and trigger a macro which includes functions on one or both sides of the market knowing that the execution of the function can be selectively tailored to adapt to varied conditions.

In another example, a user may trigger an order (e.g., join) and the trading system 100 may select the side of the market based on reference to one or more associated factors (e.g., market factors, user position factors, etc.). For example, the user may trigger a join order and the trading system 100 may apply the order as a "buy join," "sell join" or no order. In other words, the user may trigger an order and the trading system 100 may determine the side of the market to which to apply the order and automatically assign the required order type (buy/cover/sell/short) to the order, if an order is to be sent at all. In alternative examples, the user may specify both "buy join" and "sell join" orders, and the system may execute one, both, or neither of these orders.

As noted, in order to selectively execute one or more functions on one, both or neither side of the market, the trading system 100 may use data related to user's current position in the market, market data, and/or other variables. Most of the examples applied herein, reflect the use of the user's current position in order to automatically selectively execute functions on the appropriate side of market, but first is a brief description of using market data.

In one example, a trader may wish to place an order on the side of the market that is currently representing a larger amount of liquidity (bids or offers). In another example, the trader may wish to place an order on the side of the market on which the last trade was executed. Specifically, if the last trade executed in the market (not necessarily by our user) was the removal of liquidity on the buy side (such as via a sell market order or a sell limit order), then the buy side is the side of the market on which the last trade was executed. In another example, a trader may wish to place an order on the opposite side of the market that is currently overbought, if applicable. As shown, there are a wide variety of ways in which the trading system 100 can selectively choose an order (buy/sell/cover/short) or side of market (buy or sell side) to use for orders and other actions.

Turning now to FIG. 12, an example of how the status of a trader's initial position variable may be used as a source of information for how the trading system 100 may automatically derive a side of market to selectively execute functions is shown. As elsewhere in this description, the term "initial position" will be used to include various types of positions which may be considered a current state or starting point, depending on scenario, and includes but is not limited to an existing position, a current position, etc.

As can be seen by the chart in FIG. 12, if the trader holds a long position, then the same side of the market as the trader's position is the buy side. If the trader holds a long position, then the opposite side of the market as the trader's position is the sell side. If the trader holds a short position, then the same side of the market as the trader's position is the sell side. If the trader holds a short position, then the opposite side of the market as the trader's position is the buy side. If the trader holds no position, then the same and opposite sides of the market as the trader's position do not exist. In other examples, the user's initial position variable might be replaced or supplemented with other information, such as market data, to use a source for system selection of order and/or side of market.

In order for the trading system 100 to operate as described, there needs to be a specific time when the one or more variables are referenced. In one example, users may apply a function referred to herein as "Assess Variables," The assessed values may then be used in the selective execution of functions (which may come later in the same or future process) on either, both, or neither side of the market. As a result of this reference to the one or more variables, a particular side of the market may be chosen (i.e., buy side, sell side, no side). In other contemplated but potentially less useful examples, both sides may be chosen.

If the user chooses to selectively execute functions on the same or opposite side of the market based on the reference to the one or more variables, there needs to be a specific time when the selection of the appropriate same or opposite side is to be made/applied. The selection may be applied before, after or approximately at the same time as the one or more variables are referenced (i.e., assessed), depending on the configuration of the trading system 100. For example, an executable macro may first include a function which directs the system to choose the same or opposite side of the market which is referenced by one or more variables, and may then be followed by a function which directs the system to assess the one or more variables. Alternatively, the executable macro may first assess the one or more variables, which may then be followed by a same or opposite "side-selection" methodology.

In one example of how the timing and coordination of these methods is applied, the one or more variables are first referenced using an "Assess Variables" function; next an (optional) side-selection function is applied to select the same or opposite side of the market; lastly the functions are selectively executed based on the assessed one or more variables and the side-selection to apply functions to the same or opposite side of the market.

The number of functions, or the period of time, or the conditions under which, etc, that the selective execution remains in effect is a matter of trading system 100 design or possible the design of a given macro or other set or sets of executable functions. In one example, the selective execution remains in effect until the end of a macro. In another example, the selective execution remains in effect until a function to allow all functions is executed, in which case this "allow all functions" function terminates the effect of selective execution based on the side-selection, even if this function may not impact selective execution based on other methods (i.e., selective execution not based on the side-selection) applied within the same process. Further, even if an "allow all functions" function may temporarily disengage the selective execution, in some instances, the selective execution may be re-engaged to apply the same selection methodologies which were assigned prior to the "allow all functions" function.

The described functionality may be included within one or more macros, with each macro containing one or more executable functions stacked together. Alternatively, some steps may be left as independent functions, not included within macros. Whether the steps are contained in macros or remain as functions, the functions and/or macros may be still be called on in combination as part of one "parent" macro or process, able to be triggered by one command or input method. A macro or series of functions and macros may be user-defined or generated by a system, and may further be user-triggered or triggered by a system such as via an event-based macro activation. In other methods, the described steps and options to the described processes may be encapsulated into toolbar buttons which are pre-programmed for use by an end-user, not to be user-adjustable. In still other situations, the described processes may not be shown to users at all, but simply inherent in the logic of a particular system or method.

In a specific example, a user may have programmed a macro to contain a series of functions. First, a user-position variable is referenced using an "Assess Variables" function. If we assume that the user-position is long twenty contracts, then the side-selection based on the user-position variable is derived to be the buy side. Next, a side-selection function run from the macro is applied to choose the same side of market as was derived using the reference to the user-position variable. Because the buy side of market was derived based on the reference to the user-position variable, and because the side-selection function is applied to choose the same side of market as this derivation, the resulting side of market that is applied to selectively execute functions is the buy side. Due to the selective execution of the buy side functions, then one or more buy side functions which are further included in the macro will be executed, and one or more sell side functions which are further included in the macro will not be executed. Note how in this example, the trading system 100 selectively executes one or more functions on one side of the market, wherein the selective execution is based on a reference to one or more variables, and is further based on a user-direction to selectively execute functions on the same or opposite side of the market as is derived using the reference to one or more variables.

In the example just discussed, triggered functions applying to one side of the market are executed (e.g. buy functions) and triggered functions applying to the other side of the market are not executed (e.g. sell functions). In an alternative example, there only exists one set of one or more functions type (e.g., "join" or "market" orders, or "cancel orders"), and the side of market which those functions are applied to are assigned before being sent to be executed. In an example of this method, if the side of market derived from a user-position variable is the buy side, and if the side-selection function is to choose the same side of market as was derived, then the resulting side of market applied to selectively execute functions is the buy side. Therefore, the system may apply the buy side for the purposes of assigning the order type (buy or buy to cover) to order functions, and may apply the buy side to be used with other non-order actions, such as the action to cancel orders on the buy side of the market, to raise volume for orders on the buy side of the market, etc. Accordingly, the order (buy or buy to cover) that is applied within the previously composed executable function may be custom tailored to the later arising situation, as will be recognized by those skilled in the art based on the description provided herein. Further, this methodology may also accommodate the scenarios where no functions are to be executed. Note how in this example, the system selectively execute functions on the same or opposite side of the market as is derived using the reference to one or more variables. In these examples, the trading system 100 automatically assigns the required order (buy/cover/sell/short) to order functions and automatically assigns the side of market to apply for non-order functions.

FIG. 13, is an example of how the described methods of applying a combination of a reference to user-position data and a side-selection to choose the same or opposite side of market as the referenced user-position data may be used to derive a side of the market for which to selectively execute functions. As is shown in FIG. 13, if the user runs a function to choose to only execute orders on the same side of the market as the trader's current position and the trader holds a current position that is long, the subsequent buy functions will be allowed and sell functions will be disallowed (or functions will be assigned to the buy side). If the user runs a function to choose to only execute orders on the same side of the market as the trader's current position and the trader holds a current position that is short, the subsequent buy functions will be disallowed and sell functions will be allowed (or functions will be assigned to the sell side). If the user runs a function to choose to only execute orders on the opposite side of the market as the trader's current position and the trader holds a current position that is long, the subsequent buy functions will be disallowed and sell functions will be allowed (or functions will be assigned to the sell side). If the user runs a function to choose to only execute orders on the opposite side of the market as the trader's current position and the trader holds a current position that is short, the subsequent buy functions will be allowed and sell functions will be disallowed. If the trader runs a function to choose to only execute orders on the same side of the market as the trader's current position and the trader holds no position, then both buy functions and sell functions will be disallowed (or functions will not be assigned at all or the functions will simply not be sent). Note that while FIG. 13 outlines the derivations of the side-selection based in part on the user-position variable, similar derivations of the side-selection may be created for any type of variable. For example, rather than using user-position variables to determine the side-selection, the trading system 100 may be adapted to determine the side-selection based in part on, market variables related to the overbought/oversold condition of a given market; a combination of market variables such as new highs and lows in conjunction with market volume on the new highs or new lows, or any other variable or combination of variables. Further, user-performance variables may also be applied. For example, if a trader is making consistent money on the long side of the market one day, and consistently losing money on the short side, then future commands to take positions on the long side may be selectively executed while commands to take positions on the short side may be selectively not executed. Further, market variables, user-performance variables, user-position variables, and other variables may be used in combination as well.

In one example, a trader wants to fade a move seen in certain market, i.e., take a position opposite to the market action seen over a recent period of time. The trader executes a process including the following functions which are executed sequentially. First, a function is executed that assesses a variable related to whether the market has been going up or going down over the last hour, and as an output of that assessment, the methodology derives the side of market which has been dominant over that period of time. In this example, the direction has been down for the last hour, and therefore the dominant direction resolves to the sell side of the market. Next, a function is executed that chooses to apply the opposite side of the market for purposes of selective execution actions which follow, which in this case will be the buy side. Accordingly, the system applies the buy side of the market for use with actions to follow. In this example, functions for multiple orders are provided, without a side of the market attached. The multiple orders are spaced out in a pre-determined way by the trader, in a way that may be typical for a trader fading a move in a given market. The orders in this example may be limit orders, spaced out by 25 cents each in price. Based on the methods described herein, and due to the fact that the trader does not hold a short position (to cover) in this example, the system automatically applies the order type of buy to all of the orders and submits the orders to market. In a more complex example, the orders could have multiple legs or brackets attached to them, such as may be the case with "OSO" or "OCO" orders. In a different version of the example, there may be no step of side-selection of the same or opposite side of market as the derived side of market based on the one or more variables, and it may simply be contained within the logic of the process for it to choose the opposite side, or the same side. Similarly, this different type of methodology can easily apply to other examples discussed herein as well.

In another example, a user may submit multiple side-selection functions as part of the same process. Specifically, a user may submit a side-selection function to choose the same side of the market as derived from the one or more variables, which may then be followed by the selective execution of functions on the same side of the market as the derived value, and then to be followed by a side-selection function to choose the opposite side of the market as derived from the one or more variables, which may then be followed by the selective execution of functions on the opposite side of the market as the derived value. Optionally, the process may then include even another side-selection function to choose the same side of the market as derived from the one or more variables, which may then again be followed by the selective execution of functions on the same side of the market as the derived value. These functions may be applied in any order, and may be valuable to users who wish to perform multiple actions on both sides of the market for specific purposes. In one simple example of why traders may wish to perform multiple actions on multiple sides of the market, consider an example of a trader who wants to take a long position. He may find it important to first cancel any existing sell orders (opposite side of the market as buy side), then place a buy order (same side of the market as buy side), and then, place an order to sell (opposite side of the market as buy side) which may not get triggered unless the buy order is first executed. As is expected to be understood, even though our description has applied to particular sides of the market in this example, once this process is automated, it can apply to either side of the market, and the process can be based off of the side of market which is derived from any of one or more variables assigned by a user or determined by the trading system 100.

The functions that may be selectively executed may be submitted in multiple ways. In one example, a user may submit paired buy and sell functions, wherein the functions applied to the buy and sell side are identical. Because only one side of the market, if any, is typically chosen, the paired functions assure that the same function is run on either the buy or sell side, if any side is chosen. In another example, the types of functions applied in the pair of functions may differ. In one example, the paired functions may be a "Limit Buy to Join (ICE)" along with a "Sell Market Order." There are a variety of circumstances wherein users may wish to apply different behavior on one side of the market compared to the other. This may be the case where the tradable instrument may have a distinct direction (trending up or down), where the other market participants may show differing behavior on each side of the market (buy versus sell sides), or where the trader specifically selects tradable instruments due to their one-sided behavior. Many traders often use watch lists, where they only trade tradable instruments that are either higher or lower by 10 percent or more on the day. In these types of situations, functions (e.g., limit orders) on the strong side of the market may best be applied aggressively, while functions (e.g., limit orders) on the weak side of the market may best be applied passively. In one example, a trader who wants to smartly allow orders for only the opposite side of the market as their current position, possibly in an attempt to liquidate their position at the best possible price, may have a macro which will smartly choose to pay ten cents less than the current bid to cover a short position on a strong stock, but sell at fifty cents above the highest offer to sell a long position on the same strong stock, conditionally based on their current position. Other scenarios are not discussed for sake of clarity with more simple examples, however, a wide variety of scenarios may exist that make it valuable for a trader to apply different types of functions for each side of the market using the methods discussed herein. In another example the user will not pair buy and sell functions, and will only submit one or more buy or one or more sell functions only. This may be useful in a circumstance where a trader wishes to conditionally send one or more buy functions, or conditionally send one or more sell functions, with no intention to ever submit the other type of (sell or buy) functions.

While varied embodiments of this invention may be applied, in the examples discussed herein, side-selection functions and the selective execution functions which follow them operate based on when the assessment (invoked by the "Assess Variables" function) occurred. This means that even in a scenario where a user gets filled on a position during the middle of a macro, which may shift the user's initial (current) position from one side of the market to another (or to or from a flat position), the side-selection functions that occur later in the macro will still operate as the user expected when they submitted the macro, rather than possibly sending orders on the wrong side of the market, simply because of an outlier event involving a very fast fill before the macro has completed processing. While other approaches may be applied, there is certainly value in the predictability of this approach.

Note that in previously existing trading systems, if a trader wanted to perform any action in the market, such as increasing position size, he would have to specify the order type (buy/short) to use with the order. If the trader were using a programmable keyboard to trade, he would require two keys on his keyboard, one to increase a long position, and one to increase a short position. Using the systems and methods contained herein of selective execution, applied using side-selection methods, the trader only needs one function to execute his action. A trader using a keyboard with which to trade now only needs one key on the keyboard. A trader using a mouse to trade no longer has to move the mouse to one area of a screen to buy and another area to sell, and no longer has to select the order from a drop down box. Traders may either just press or click (or apply another input method) to trigger the action they intend to execute, and save significant time in the process. The ability of the described systems and methods to be able to eliminate intermediate steps previously required for order management is crucial. The described methods are expected to greatly reduce the amount of mental work required to enter orders and provide faster trading and a greater avoidance of errors.

Now let's consider more complex examples of side-selection and optionally selective execution wherein at least two variables are tested. In one example, the first of the variables is a user-position variable, wherein it is commonly referred to as an "initial position" variable, and the second of the variables is the target position variable as has been discussed in detail earlier. It is understood that additional variables may be tested beyond these two variables, though the example will be limited to two variables for purposes of clarity.

If a trader wants to liquidate an initial position towards a smaller target position, the trading system 100 may reference the initial position and the target position to determine whether to place an order to sell if the initial position is long or place an order to buy to cover if the initial position is short. Similarly, if a trader wants to add a position to the account and is less long than intended, the trading system 100 needs to place an order to buy, and if the trader is less short than intended, the trading system 100 needs to place an order to sell (or sell short). Further, if a trader wants to reverse the position from the long side to the short side, the trading system 100 needs to place an order to sell (and maybe sell short as a second additional step), and if the trader wants to reverse the position from the short side to the long side, the trading system 100 needs to place an order to buy (and maybe a first additional step of buy to cover). It is noted that the type of order that the trading system 100 needs to place is dependent on the combination of the trader's initial and target positions.

In many trading platforms, workspaces may be saved such that, when a user opens a workspace, the last saved version of that workspace is loaded. Certain information saved along with workspaces may include tradable instruments applied to charts, time intervals applied to charts, order-entry defaults, other conditions and settings used for order-entry, the locations of windows, risk settings, and other such conditions and settings. As used herein, the information saved to and recalled from workspaces is described as "long-term memory." Using the trading system 100 described herein, users may further save information to and recall information from a repository which may be considered more of a "short-term memory." Specifically, users may save information which may be beneficial to recall for use 10 milliseconds from now, 10 seconds from now, 10 minutes from now, or any time period in the future, etc. Further, users may recall information for use that may be been saved 10 milliseconds prior, 10 seconds prior, 10 minutes prior, or any other time period back, etc. The information stored in the repository may be saved/recalled at the direction of the user, or automatically saved/recalled by the trading system 100, may be saved/recalled as part of a macro, etc. The data may be saved or recalled only upon certain triggers, or may be saved or recalled at specific times or time intervals. In a common example, the information saved in the repository may have a lifetime that ends when a workspace is closed. In another example, the information saved in the repository may persist for an extended or indefinite period of time, and may be saved separate from and unrelated to workspace information. Any of the variables or conditions or settings which are able to be saved may have just one storage location in the repository, or they may have multiple storage locations for which to store data to or recall data from. Using this "short-term memory", variables or conditions may be recalled from prior points in time. Exactly what information is stored in the repository and recalled for use may be wide-ranging. In one example, a user may apply an order quantity of five contracts to most of his orders during the current trading day, which may be considered a small figure in this example, and may not be applying an iceberg condition, specifically because the order quantity is small. If over the course of a 30 minute period on the current day, however, the trader has accumulated a position of 50 contracts which may be considered large, he may wish to place one large order equal to his position size, and may wish to hide the size of his full order from the market by assigning to it an iceberg condition. However, after that one trade, the trader may wish to subsequently stop applying the iceberg condition. If we generalize from this example, we can see how a trader may wish to, in certain circumstances, save the current status of a condition (e.g. iceberg condition), then send an order with the condition applied, and then recall the status of the previously saved condition, whether on or off. In this way, the user is assured that the next order to be sent applies the iceberg condition, but that after this order has been sent, the status of the condition which existed previously is re-applied. In other examples, the variables, settings and conditions which may be saved to the repository and later recalled may be wide-ranging such as but not limited to the status of various order conditions such as stops and brackets, all-or-none, fill-or-kill, etc., the values applied for order quantities, whether position limits are locked or unlocked, the values applied for position limits, etc. In another example, the save and recall methods described may be applied for use with position limits, position boundaries, buying power limits, etc. as provided in U.S. patent application Ser. No. 13/046,677. The save and recall functionality may further be applied to a target position quantity. In one example, a target position quantity of 10 may be saved, then the target position quantity may be changed to a value of two, then an order sent to market, and then the target position quantity of 10 may be recalled. Further note that both the save and recall functionality may be contained within one or more macros, and in some examples, the save function may happen first, followed by one or more intermediate functions, followed by a recall function.

The value of the functionality described above (e.g., the target process, derivation of the type of transaction required, selective execution of functions on the same or opposite side of the market as is derived using a reference to one or more variables, selective execution based on states such as tradable instrument state, saving and recalling workspace settings, etc.) becomes significantly more apparent when the trading system 100 is adapted to automate the described processes, apply them in combination and apply them to one or more tradable instruments at a time. Specifically, the processes may be valuable when the used in combination to automate the target process for multiple tradable instruments. The processes may further be valuable when automating the selective execution of functions based on the type of transactions required to go towards a target portfolio including multiple tradable instruments. Further, when automating the execution control methods based on tradable instrument state or other states for multiple tradable instruments at a time. Further, when automating the side-selection for multiple tradable instruments at a time. Further, when applying methods for storing values to or recalling values from a short-term repository for settings and/or conditions of a trading platform for multiple tradable instruments at a time. And still further, when combining the target process, along with selective execution of types of transactions, along with execution control methods based on tradable instrument state or other states, along with side-selection, and along with the storing and/or recalling of values to/from a short-term repository for settings and/or conditions of a trading platform for multiple tradable instruments at a time. Any of the discussed methods may be used as standalone or in combination as appropriate.

In furtherance of the trading system 100 described herein, a user interface may be provided to allow a user to build one or more macros containing two or more functions for one or more tradable instruments using one or more macro content controlling mechanisms wherein one of the one or more content controlling mechanisms inserts a function into a macro without the user to have to write code or functions references. Accordingly, the selective execution commands may be easily programmed by users. The user interface mechanism may include methods for: error checking for function sequence, error checking for cyclic dependency, the ability to include a macro within another macro, inserting a function or macro, removing a function or macro, ending a function or macro, moving up/down a function or macro, adding a function or macro, etc.

For example, as shown in FIG. 11, a target state process manager 304 may be provided in the form of a "Macro Builder." Similar to the target state settings manager 302 shown in FIG. 5, a user may set the conditions of the target process directly in the target state process manager 304 by either specifying what the target position component values are (tradable instrument, quantity, etc.), or by linking to the values, etc. However, in the target state process manager 304, there is a stronger focus on specifying the processes required to reach a target condition, or target state 208 more generally, which may include the component values of the one or more target position(s) themselves. A macro builder, such as the as target state process manager 304 shown by example in FIG. 11 may be used for methods which don't involve the target process at all, such as allowing users to create macros to perform side-selection methodologies, various order send or cancel methods, the assignment of execution approach and the associated use of selective execution based on states such as tradable instrument state, the selective identification and/or the selective execution of orders based on the approach towards a target position based on the type of transaction which would be required, etc.

As shown in the example in FIG. 11, a group of macros is provided at the top right of the screen in the "Macros" section 396, with one macro highlighted. Executable functions included within the highlighted macro are shown in the "Macro Functions" section 398 at the bottom right of FIG. 11. Using the interface shown, macros may be created, copied, deleted, etc. Further, functions for any tradable instrument and calls to any macros may be selected and inserted into any macro, and further the order of these functions and macro calls may be adjusted using the move up and move down buttons provided. In the example shown, testing may be performed for whether macros are executable based on data connectivity for every tradable instrument referred to within each macro, and this may be required for each macro to execute at all or in part. Further testing may be performed to validate whether all functions referenced within the macro are currently supported functions within the trading platform, and this may further be required for each macro to execute. The testing procedures may be invoked in various ways within the system, such as when a macro is triggered by a user (wherein the results of the testing determines the resulting system behavior), whenever a workspace is opened, or when a user wishes to see the current testing results, or at other times. In the example shown in FIG. 11, the user may view the testing results by pressing the macro validation report button, and further the testing is automatically implemented whenever a macro is invoked before allowing macro execution.

In regards to execution approach as previously discussed, if a parent macro references four child macros and two grandchild macros, then the execution approach defined for each of these children and grandchildren may influence the cumulative (actual) execution approach applied for the parent macro at run-time. If a user presses the "Cumulative (Actual) Execution Approach" button while a parent macro is highlighted, the user may see what the actual execution approach for the parent will be at run-time, based on the execution approach defined for the parent as well as all of the children and grandchildren, etc. In the examples that follow, more detail will be provided pertaining to how execution approach of a macro may be determined at run-time (execution time), and further how this execution approach will translate into the functionality of a macro.

Using a target state process manager 304 like the one shown in FIG. 11, a user can specify a target process such as is shown in the following example which is referred to herein as "Macro 1". In this example, we assume that Macro 1 sets the target position for a tradable instrument to a value of three. It does so by stacking four functions, first a function to set the target position to zero, and then three consecutive functions to raise the target position. While the increment for which the target position may be raised (or lowered, in other examples) may vary, we assume that the increment is one and therefore as a result of the macro, the target position is set to three.

Macro 1:
SET Target Position to Zero
Raise Target Position
Raise Target Position
Raise Target Position Note that even though many examples provided herein with respects to the target state process manager 304 showed how the target position quantity could be set by using functions to raise target position (or lower target positions, in other examples), a target state process manager 304 may also allow target position components (identifier, side, quantity, etc) to be specified by direct input. In such an example, instead of seeing the four steps like were shown in the example referred to herein as "Macro 1", a macro builder or other example of a target state process manager 304 might instead allow the user to set the target position directly to a value of three, most likely using an input mechanism of some sort. If this procedure became part of a process like a macro, you might see a macro function called "SET Target Position=3", or "SET Target Position=" which is then shown along with a user input, or other similar methods.

In the next example, referred to as "Macro 2" herein, the same steps are performed as in Macro 1 except in Macro 2 there is also a last step included which places an order to trade to the target position using a market order if the account does not already contain the exact target position of three for the tradable instrument applied within the example.

Macro 2:
SET Target Position to Zero
Raise Target Position
Raise Target Position
Raise Target Position
Trade To Target Position In the next example, referred to as "Macro 3" herein, volume which is used to send orders for a particular tradable instrument is set to a minimum, which may be a value of one or any other number depending on settings within the system. Note that in this case, the macro builder has allowed the creation of a macro which has nothing to do with the target process, as it does not include any references to set or adjust target position, any trade to target commands, or the setting of any target conditions. All it does is set the volume to be used for order to a minimum.

Macro 3:
Lower Step On Volume Ladder
Lower Step On Volume Ladder
Lower Step On Volume Ladder
Lower Step On Volume Ladder
Lower Step On Volume Ladder
Lower Step On Volume Ladder
Lower Step On Volume Ladder
Lower Step On Volume Ladder
Lower Step On Volume Ladder In the next example, referred to as "Macro 4" herein, Macro 2 and Macro 3 are combined and expanded upon. Macro 4 first contains a call to Macro 2 to set and trade to a target position using a market order, next a call to Macro 3 to set the volume to apply to future orders to a minimum, and then follows with the placing of three orders, each with the minimum volume of one, which can be assumed because we have just reduced the volume to a minimum in the prior step. Whereas Macro 2 sets the target position quantity to a value of three on the long side of the market and trades to that figure, we see that Macro 4 further places orders to liquidate this long position of three with three sell orders, each offset by a different amount from the inside offer. This is an example of how a target state 208 may include, and a target process may specify, the steps to set and optionally trade to one or more target positions, as well as further set other conditions within the trading environment, such as setting volume for future orders, placing orders to exist target positions or other orders, etc.

Macro 4:
   Call to Macro 2:
   Call to Macro 3:
Sell Join Offset (C) –3
Sell Join Offset (F) –5
Sell Join Offset (D) –7

In the next example, referred to as "Macro 5" herein, a side-selection is applied. In this example, the target process is not involved. As shown, Macro 5 will first perform an assessment of the user's current position variable (based on the "Assess Variables" function), and next will selectively execute only the functions on the same side as the current position, if a position exists (based upon the side-selection function "Choose SAME Side (as CURRENT POSITION)"). If the trader holds a long position, the "Next Volume: Max Buy" and "Buy Join" functions will be executed and the "Next Volume: Max Sell" and "Sell Join" functions will be ignored. If the trader holds a short position, the "Next Volume: Max Sell" and "Sell Join" functions will be executed and the "Next Volume: Max Buy" and "Buy Join" functions will be ignored. If the trader held no position, all four functions would be ignored. Regardless of the trader's current position, any special volume assignment (e.g., the setting of Next Volume: Max Buy or Next Volume: Max Sell) will be cleared at the end of the macro. Even though this may not seem necessary given the example provided, it is a best-practice using the technologies as discussed herein, and does further resolve the scenario where a user has already reached their long and/or short position limit in which case Next Volume: Max Buy or Next Volume: Max Sell would resolve to zero. In summary, Macro 5 has the effect of attempting to increase the trader's current position with a maximum sized join order. The word "attempting" is used because a limit order may or may not get filled. In other examples, other order types may be applied (market orders, stop orders, bracket orders, timed orders, etc). Further, volume applied to orders may be any default volume or any special volume assignment (an assignment typically applied for one order only). And still further, side-selection functions may be of a large variety and are discussed in more detail herein.

Macro 5:
ASSESS VARIABLES
Choose SAME Side (as CURRENT POSITION)
Next Volume Max Buy
Next Volume Max Sell
Buy Join
Sell Join
Clear Special Volume Assignment Even though in many of the examples provided, the "Assess Variables" function was the point at which the system assessed the status of the one or more variables such as the user's current position variable, the target position variable, etc., in other systems, there may be no need to instruct the system to perform a variable assessment. Assessments may already be available in memory or may already be performed in real-time or at pre-determined intervals without invocation required.

In the next example, referred to as "Macro 6" herein, all orders on the same side of the market as the trader's current position, if any, are canceled. Further, an offset order three ticks away from the best bid or offer is placed on the opposite side of the market as the trader's current position, if any. In another version of this macro, prior to the two offset orders, the user could set the volume to be used to be the current position held in the account, thereby calling for a full liquidation of the user's current position. By the example provided, it is shown how multiple side-selection functions and the associated selective execution methods which follow may be incorporated into the same macro and by referencing the same assessment performed by the "Assess Variables" function. In Macro 6, the target process is not involved.

Macro 6:
ASSESS VARIABLES
Choose SAME Side (as CURRENT POSITION)
Cancel All Buys
Cancel All Sell
Choose OPPOSITE Side (as CURRENT POSITION)
Buy Offset—3
Sell Offset—3

In the next example, referred to as "Macro 7" herein, the target process is combined with a side-selection methodology to provide enhanced functionality. Further, save/recall methods are applied as well. In order of the functions as shown in Macro 7, we see that first the current value of the target position is saved. Then the value of the target position is initialized to zero and then raised to three. Next, the "Assess Variables" function is applied, which assesses the trader's current position and further assesses the trader's current position in relationship to the target position of three. It is at this point that it is determined what type of transaction (liquidation, reverse, or add), if any, is required to reach the target position from the current position. With the next function "Choose SAME Side (to Reverse, Add towards Target)", the system is instructed to selectively execute functions only on the same side of the market which serve to reverse or add towards the target position from the current position, and to apply this selective execution methodology for all functions for the remainder of the macro unless a command to do otherwise is received, such as a different side-selection function or an "Allow All Functions" command. It is noted that the side-selection function does not have to come immediately after the "Assess Variables" function as shown; it may come later or not at all. Continuing after the side-selection function in Macro 7, the "Next Volume: Position to Target" function sets the volume for the next order to be the volume required to reach the target position from the current position. If the current position size equals the target position already, this function may set the volume to be zero or null. In the following step, depending on the trader's current position in comparison to their target position, either a buy join order or a sell join order is sent to market using the position size required to reach the target position from the current position, or if the current position already equals the target position, then no order is sent. In case that no order is required and the "Next Volume: Position To Target" sets the volume to zero, this special volume assignment of zero is cleared using the "Clear Special Volume Assignment" function. In the last step of the macro, the target position is reset to be the value that existed before Macro 7 was executed, based on whatever value was saved using the "SAVE Target Position" function in the first step of Macro 7. In summary, Macro 7 has the effect of attempting to trade to a target position of three using a join order, but only if the type of transaction which is required to trade to that figure is a transaction which reverses or adds to the trader's position. In an example, if the user has a position of negative five, then Macro 7 would have the effect of placing a join order to buy eight contracts at the highest bid in the market. In another example, if the user has a position of positive one, then Macro 7 would have the effect of placing a join order to buy two contracts at the highest bid in the market. In another example, if the user has a position of positive six, then Macro 7 would perform no order functions at all, because the user has not instructed the system to include liquidation actions, but rather only reverse and add types of transactions. It is noted that even if the side-selection function used was slightly modified to allow all transaction types, such as by using the side-selection function "Choose SAME Side (to Reverse, Add, or Liquidate towards Target)", selective execution is still used to either selectively execute functions on only one side of the market, or to restrict functions on both sides of the market in the case that the current position already equals the target position.

Macro 7:
SAVE Target Position
SET Target Position to Zero
Raise Target Position
Raise Target Position
Raise Target Position
ASSESS VARIABLES
Choose SAME Side (to Reverse, Add towards Target)
Next Volume Position To Target
Buy Join
Sell Join
Clear Special Volume Assignment
RECALL Target Position In the prior example, all of the functions in Macro 7 were run for only one tradable instrument, referred to as "Contract 1." In this example, there is a "Macro 8" having the exact same functions as Macro 7, but applied to "Contract 2" and "Macro 9" having the exact same functions as Macro 7, but applied to "Contract 3." "Macro 10," which is shown below, includes macro calls to each of the Macros 7, 8, and 9. Recall that when macros are called from other macros, the execution approach which was assigned to each of the macros involved may be considered when determining if or how the parent macro executes at run-time. With reference back to the example shown in FIG. 10, there may be three possible execution approaches: high safety, medium safety and low safety. An example of one methodology for determining the execution approach at run-time is that the highest level of safety which is assigned to a parent macro itself or assigned to any of macros called by the parent macro is the level of safety which is applied for the parent macro at run-time. This method is referred to as the "maximum safety method" below. In the examples discussed herein and shown in FIG. 10, high safety is highest level of safety, followed by medium safety, and further followed by low safety. Keep in mind that the only reason it is a valuable approach to consider the execution approach assigned to children, grandchildren, etc when determining how the parent macro should function at run-time is because macros are able to be called from other macros. If this were not permitted, it would make sense just to have the execution approach which was assigned for the parent be the exact execution approach which is applied at run-time. Note that the execution approach methodology is flexible in terms of how it may be assigned and how the assignments may be used at run-time. In an example other than the highest level of safety method discussed above, the execution approach of the parent macro is the execution approach which is applied at run-time, thereby ignoring the execution approach of the child macros, grandchild macros, etc. In reference to the example discussed above, if the execution approach assigned to the child macros, grandchild macros, etc were ignored, then if the parent macro had a low or medium safety assignment for execution approach, even if one or more child macros had a high safety assignment, the low or medium safety assignment would be applied when the macro is executed. Other methods may also be used. In this way, execution approach is intended to be extremely flexible.

Let's consider a few examples which highlight how execution approach may be used. If at least one of the Macros 7, 8, 9, and 10 have execution approach assigned as "high safety", then the high safety method will be implemented and none of the functions contained in any of Macro 10 (containing Macros 7, 8, 9) will execute unless the tradable instrument state for all of contracts 1, 2, and 3 is on. In another example, if at least one of the Macros 7, 8, 9, and 10 all have execution approach assigned as "medium safety", but none of the Macros 7, 8, 9, or 10 have a "high safety" assignment, then by applying the maximum safety method, the medium safety method will be implemented, and only the functions contained in Macro 10 which involve contracts which have their tradable instrument state on will execute; other functions will be ignored. If Macro 7, 8, 9, and 10 all have execution approach assigned as "low safety", then all of the functions contained in the Macros 7, 8, 9 will execute regardless of tradable instrument state. Note that even though in this example multiple macros were referred to by Macro 10, execution approach may be important regardless of how many different macro calls are made within the parent macro. If a macro contains only functions and no macro calls, but if the functions contained within the macro are for more than one tradable instrument, then the functions are similarly handled based on the safety settings as defined by execution approach as discussed herein.

Macro 10:
  Call to Macro 7:
  Call to Macro 8:
  Call to Macro 9:

FIGS. 19-25 display a trading environment 384 which will be used as an example to illustrate the effect of various example macros. In FIGS. 19-25, there is a top row of three market data windows 386, each corresponding to a tradable instrument. Below each of these three market data windows 386 are three trading view windows 388 corresponding to each of the three tradable instruments, respectively. The trading view windows 388 correspond to the tradable instruments in the market data windows 386 above them. In the trading view windows 388, the tradable instrument state may be toggled on or off for each of the tradable instruments using the toggle button 390. For the examples that follow, the focus is on three things: the current position 392 of each of the tradable instruments (which is displayed as "NetPos" in the current position window); the open orders 394 which exist in the market for each tradable instrument; and the associated on/off tradable instrument state for each of the trading view windows 388. Open orders 394 are displayed for each tradable instrument in each of the three market data windows 386. All open orders 394 used in this example are at the inside bid or offer, and are notated by "W:" followed by the number of contracts in the open order.

For all of the examples which follow, the current position for each of these tradable instruments is one for Contract 1, negative seven for Contract 2, and five for Contract 3. Further, recall that in Macro 10, which contains Macros 7, 8, and 9, the quantity of the target position variable is set to a value of three. Therefore, we know that for Contract 1, the type of transaction required to reach the target position from the initial (current) position is add, and the order required is a buy, and the quantity of the order required is two (three minus one). We also know that for Contract 2, the type of transaction required to reach the target position from the initial (current) position is reverse, and the order required is a buy, and the quantity of the order required is ten (three minus negative seven). Lastly, we know that for Contract 3, the type of transaction required to reach the target position from the initial (current) position is liquidate, and the order required is a sell, and the quantity of the order required is two (absolute value of three minus five).

Figure 19:
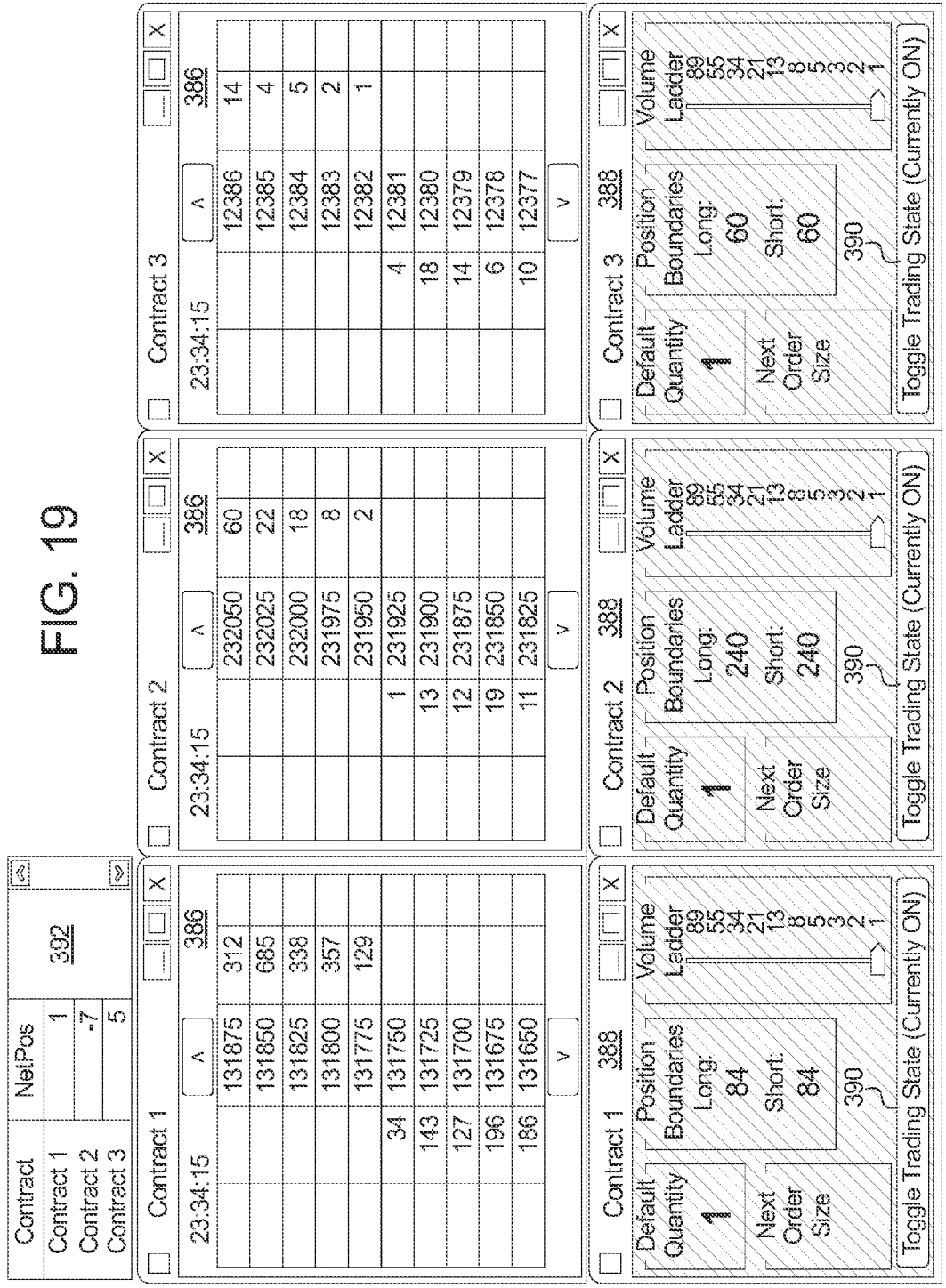

FIG. 19 displays an example of the trading environment 384 in its initial state 202. Each of the examples in FIGS. 20-25 is the trading environment 384 after a macro has been run, the macro taking the trading environment 384 from the initial state 202 shown in FIG. 19 to the ending state shown in the corresponding FIGS. 20-25. In this way, the examples which follow in FIGS. 20-25 are not cumulative or sequential.

Figure 20:
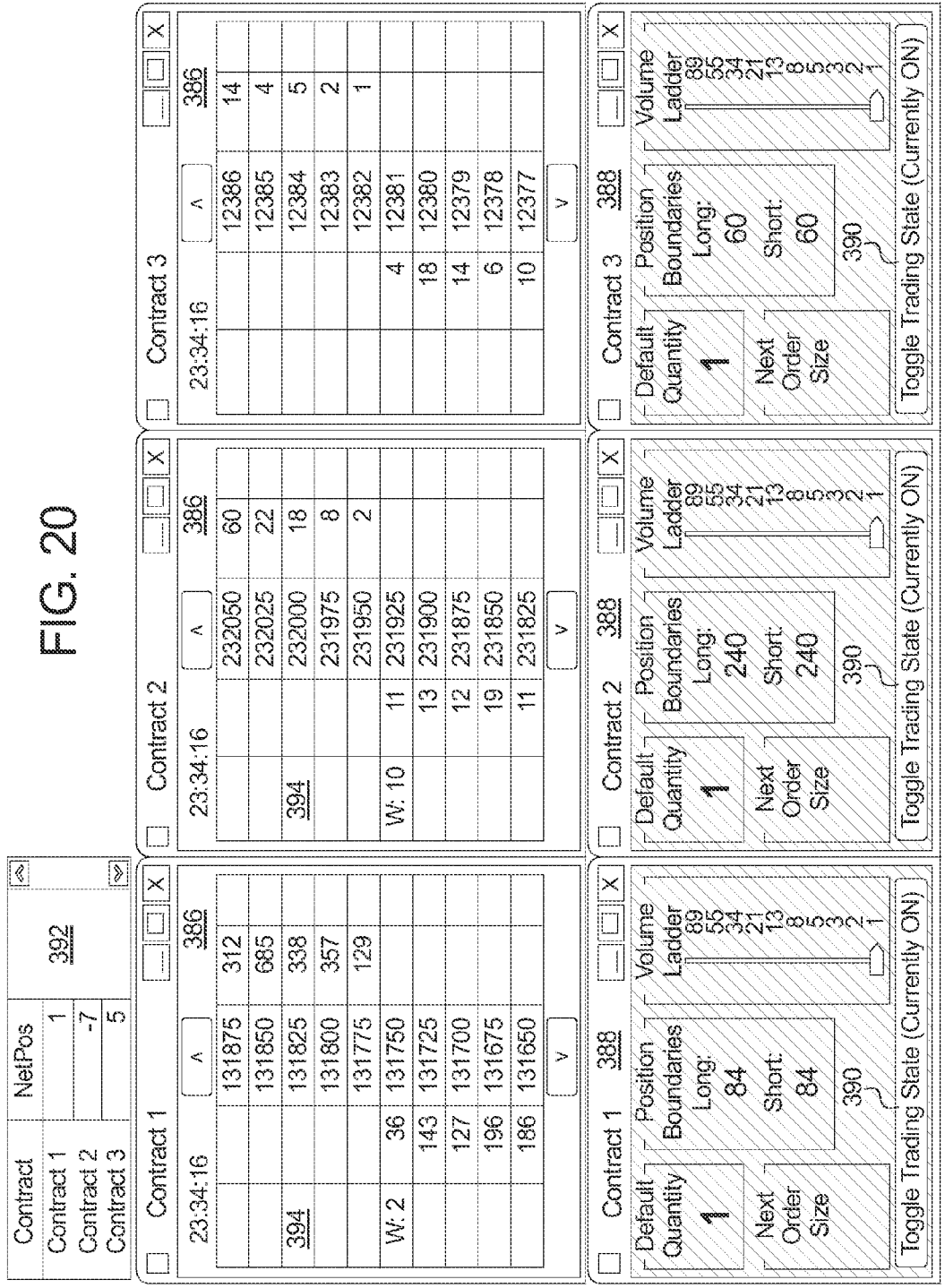

FIG. 20 displays the trading environment 384 after Macro 10 has been run with a cumulative (actual) execution approach applied at runtime for Macro 10 of medium safety, and further where all tradable instrument states were on when Macro 10 was run, which can be seen by the darker shading on the trading view windows 388. Because each of the Macros 7, 8, and 9 use selective execution methods to only execute functions on the same side of the market required to add and reverse towards the target position from the initial position (and not to liquidate), we see in FIG. 20 that open orders 394 are only seen for the first two tradable instruments (Contract 1 and Contract 2) while no order is placed for Contract 3 because the type of transaction required for Contract 3 is a liquidation transaction. Further note the quantity of the working contracts contained in the open orders 394 displayed is specifically the number of contracts required to reach the target position of three from the initial position for each tradable instrument.

FIG. 21 displays the trading environment 384 after Macro 10 was run with a cumulative (actual) execution approach applied at runtime for Macro 10 of medium safety (only execute functions associated with tradable instruments which have tradable instrument state in an on state), and further where the tradable instrument state for Contact 2 was "off" when the macro was run. This is the only difference in comparison to the example shown in FIG. 20, and this is why, in comparison to FIG. 20, we see no open orders 394 on Contract 2 in FIG. 21.

Figure 22:
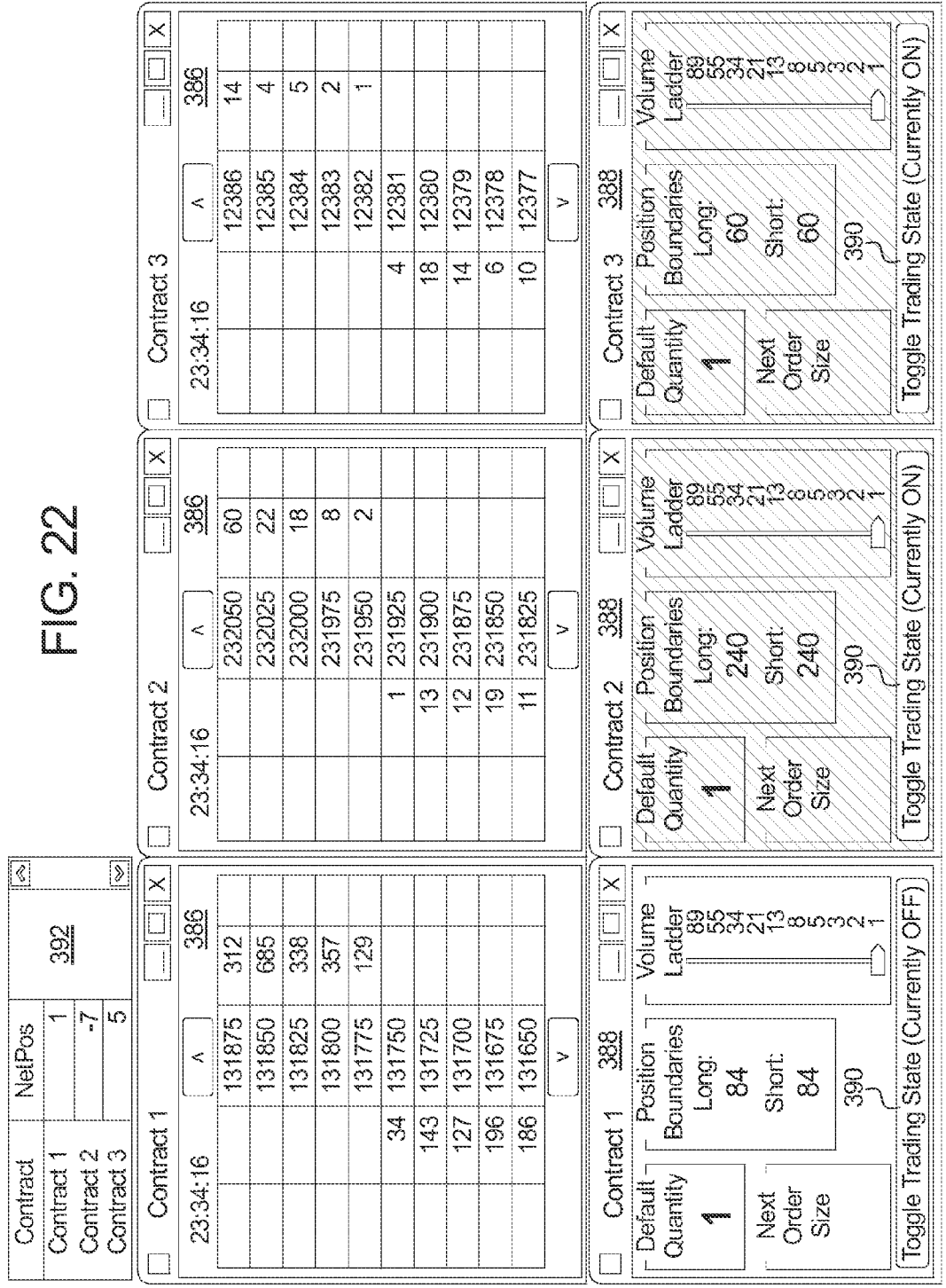

FIG. 22 displays the trading environment 384 after Macro 10 was run with a cumulative (actual) execution approach applied at runtime for Macro 10 of high safety (all tradable instrument states must be on to execute any function in the entire macro), and further where the tradable instrument state for Contract 1 was "off" when the macro was run. Because at least one tradable instrument state was "off" for a tradable instrument which is referred to by Macro 10 (via Macro 10's call to Macro 7), we see that Macro 10 is not run at all, and therefore no open orders 394 are displayed in FIG. 22.

Figure 23:
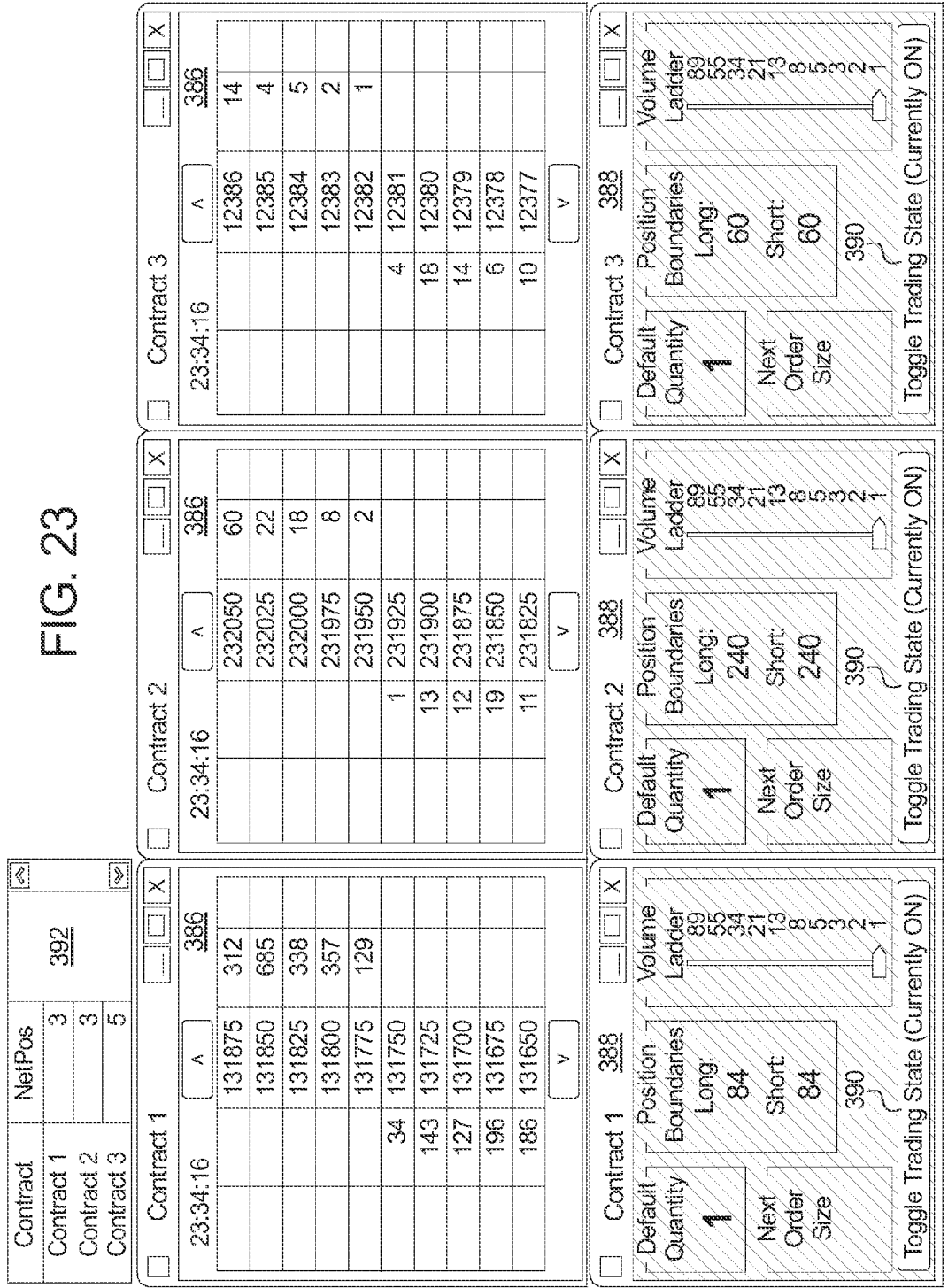

FIG. 23 displays the trading environment 384 after a modified Macro 10 was run, and where the cumulative (actual) execution approach applied at runtime for Macro 10 was medium safety, and further where all of the tradable instrument states were on when the macro was run. The modification to Macro 10 is that each of the "Buy Join" and "Sell Join" orders in Macros 7, 8 and 9 have been changed to "Buy Market" and "Sell Market" orders. Due to this change, we now see in FIG. 23 that while there are no open orders 394 in the market, the current position of the tradable instruments Contract 1 and Contract 2 is now three, which is the target position assigned in Macros 7 and 8. Again, no market order was placed on Contract 3 because the side-selection function applied was only to reverse or add towards the target position from the initial (current) position, but not to liquidate.

Figure 24:
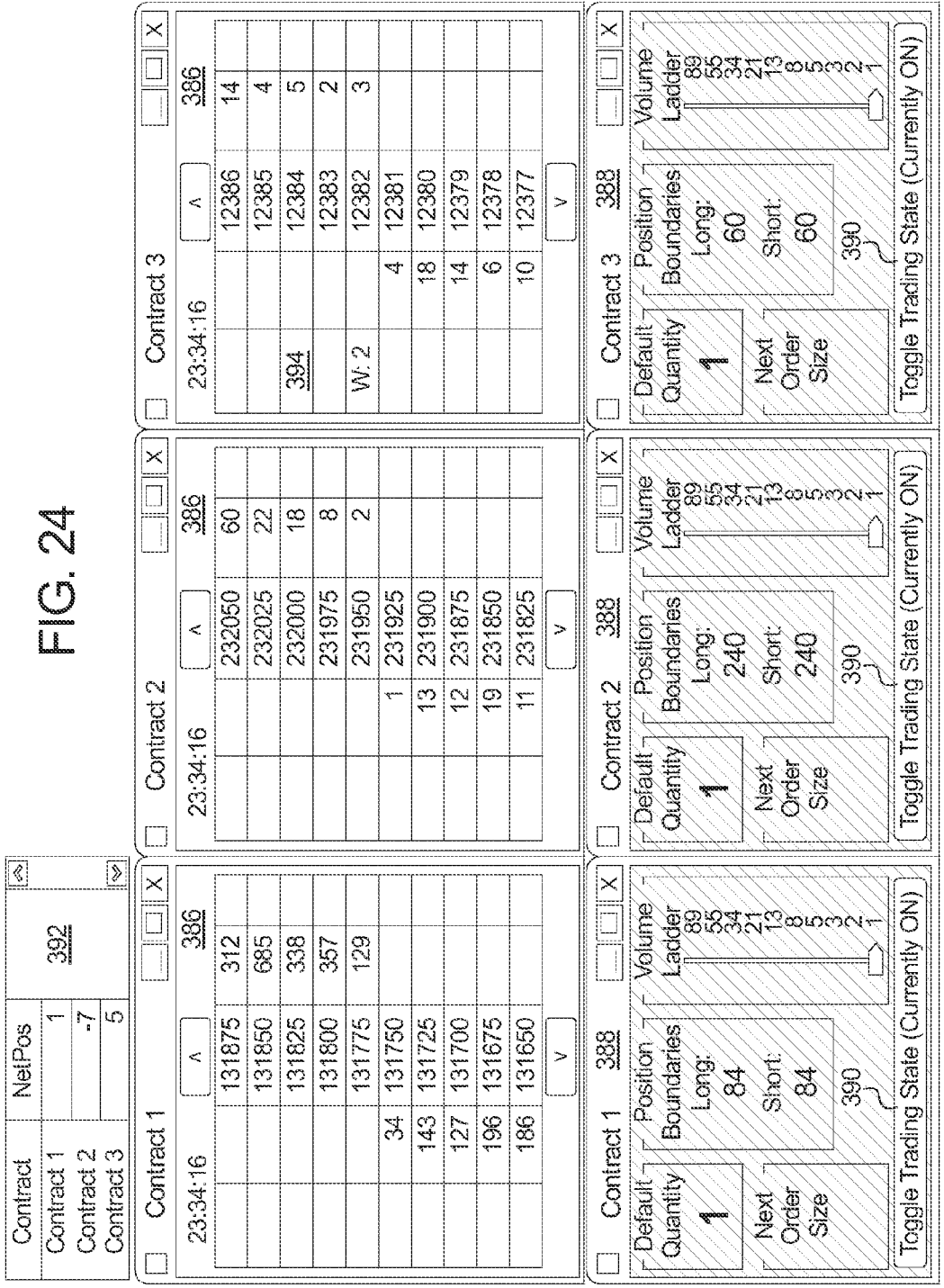

FIG. 24 displays the trading environment 384 after another modified Macro 10 was run, and where the cumulative (actual) execution approach applied at runtime for Macro 10 was medium safety, and further where all of the tradable instrument states were on when the macro was run. The modification from Macro 10 is that each of the side-selection functions in Macros 7,8, and 9 changed from "Choose SAME Side (to Reverse, Add towards Target)" to "Choose SAME Side (to Liquidate towards Target)". Due to this change, we see that in FIG. 24 there exists an open order 394 on Contract 3, but no open orders 394 on Contract 1 or Contract 2.

Figure 25:
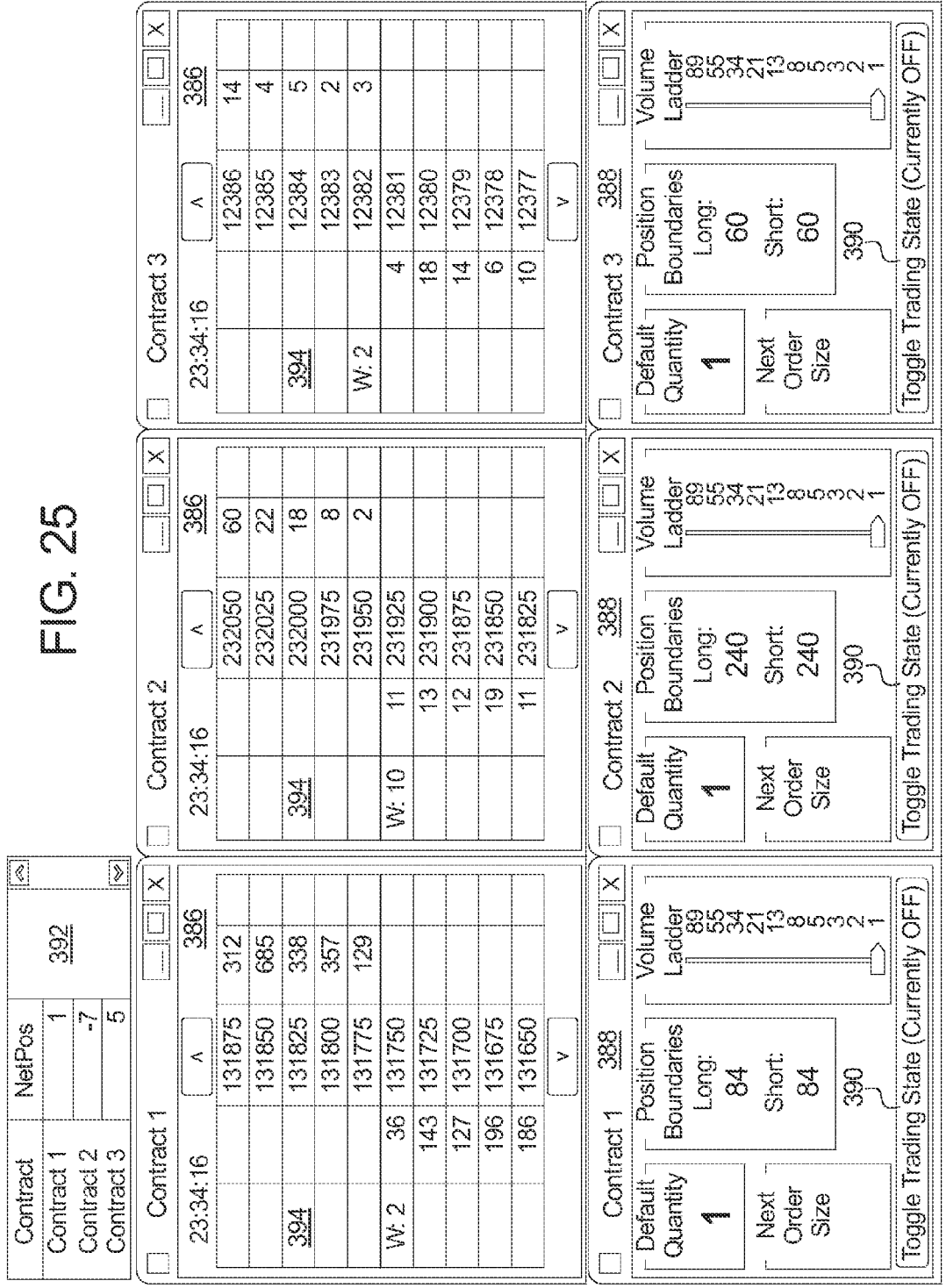

FIG. 25 displays the trading environment 384 after another modified Macro 10 was run, and where the cumulative (actual) execution approach applied at runtime for Macro 10 was low safety (all functions are executed regardless of tradable instrument state), and further where all of the tradable instrument states were off when the macro was run. The modification from Macro 10 is that each of the side-selection functions in Macros 7, 8 and 9 were changed from "Choose SAME Side (to Reverse, Add towards Target)" to "Choose SAME Side (to Reverse, Add, Liquidate towards Target)". Due to the combination of execution approach being low safety, as well as the selection of all transaction types (reverse, add, liquidate), we see that open orders 394 exist for all three tradable instruments.

If the side-selection functions used in the examples corresponding to FIGS. 20-25 had applied an "OPPOSITE" side-selection methodology, then for all of these examples where orders were placed, the same orders would have been executed on the opposite side of market as were shown.

Figure 6:
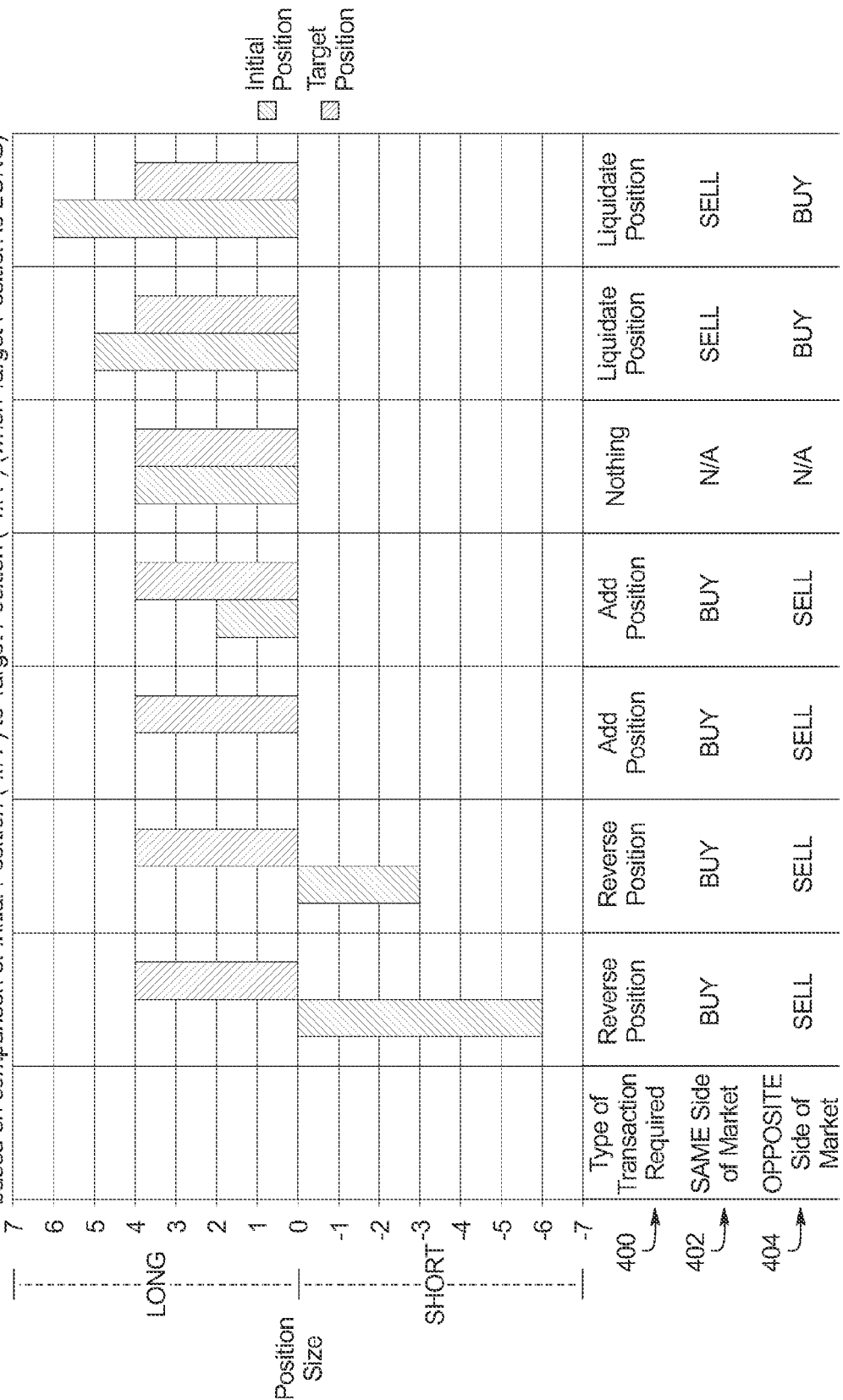
FIG. 6 is a chart illustrating the types of transactions required to reach a long target position from a given initial position.
Figure 14B:
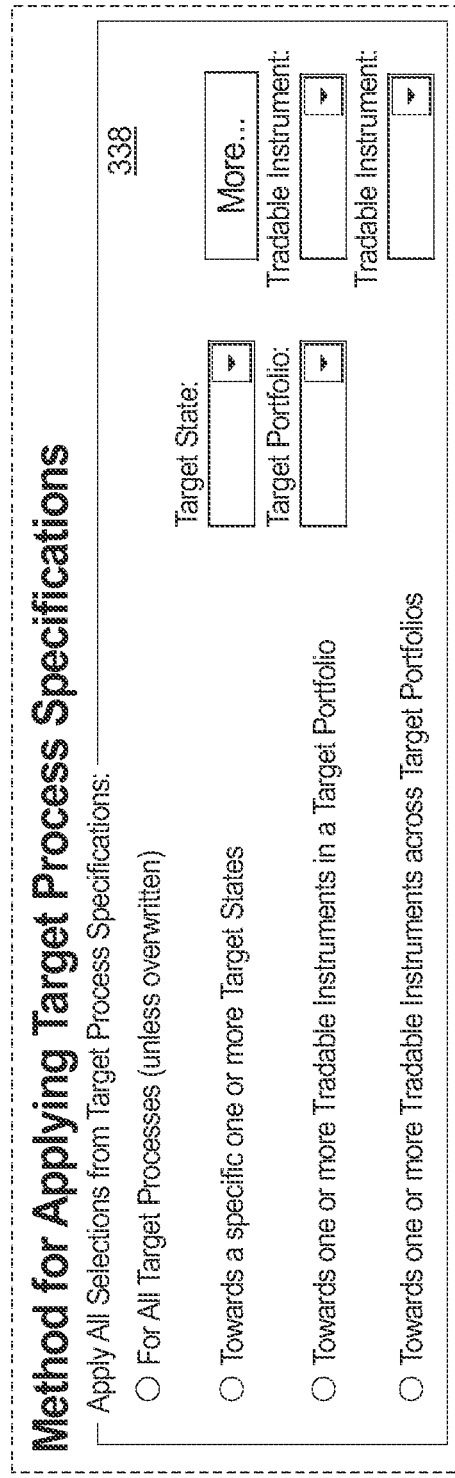
FIG. 14 is a representative example of a target process specifications manager.
Figure 14D:
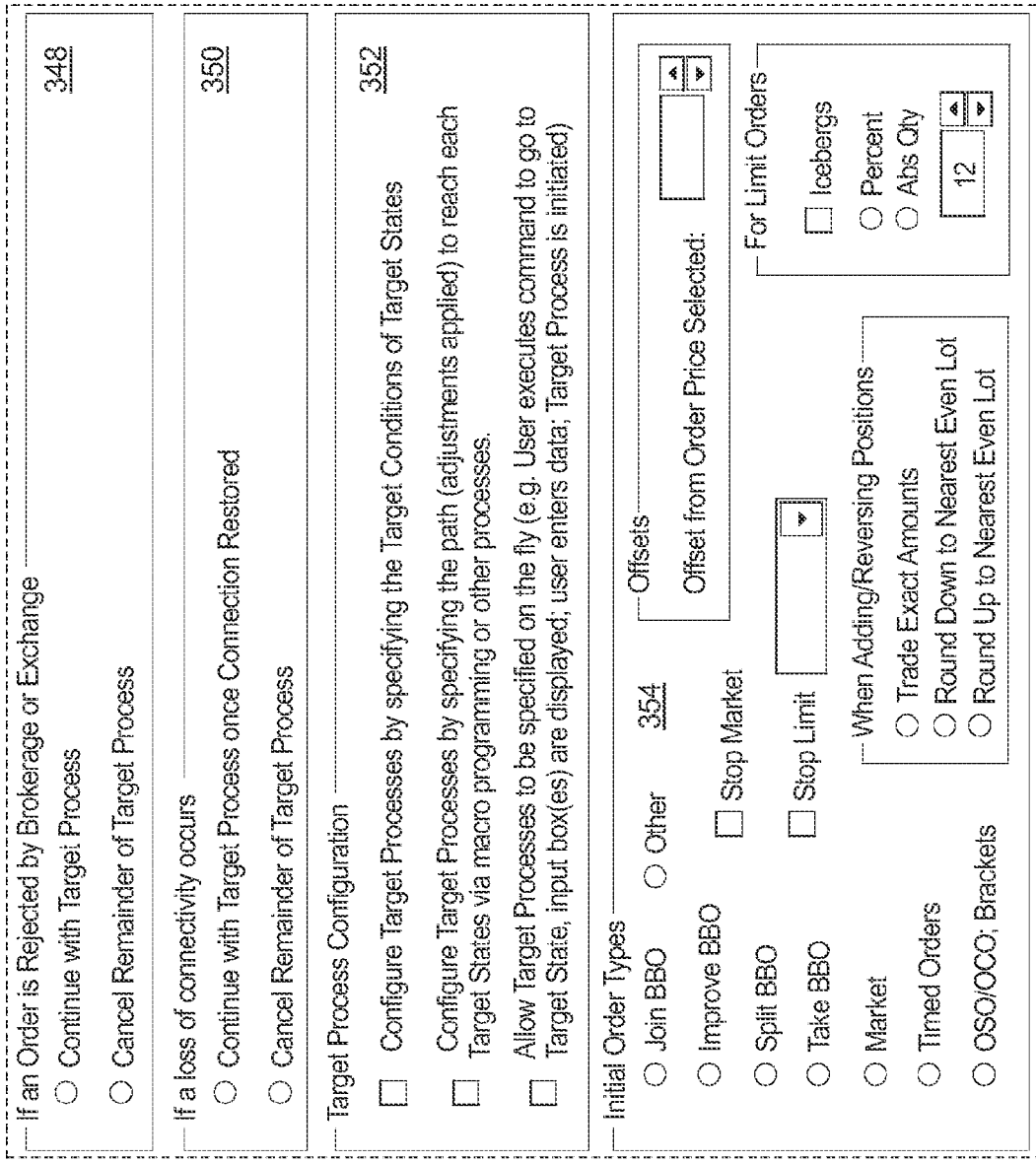
Figure 14E:
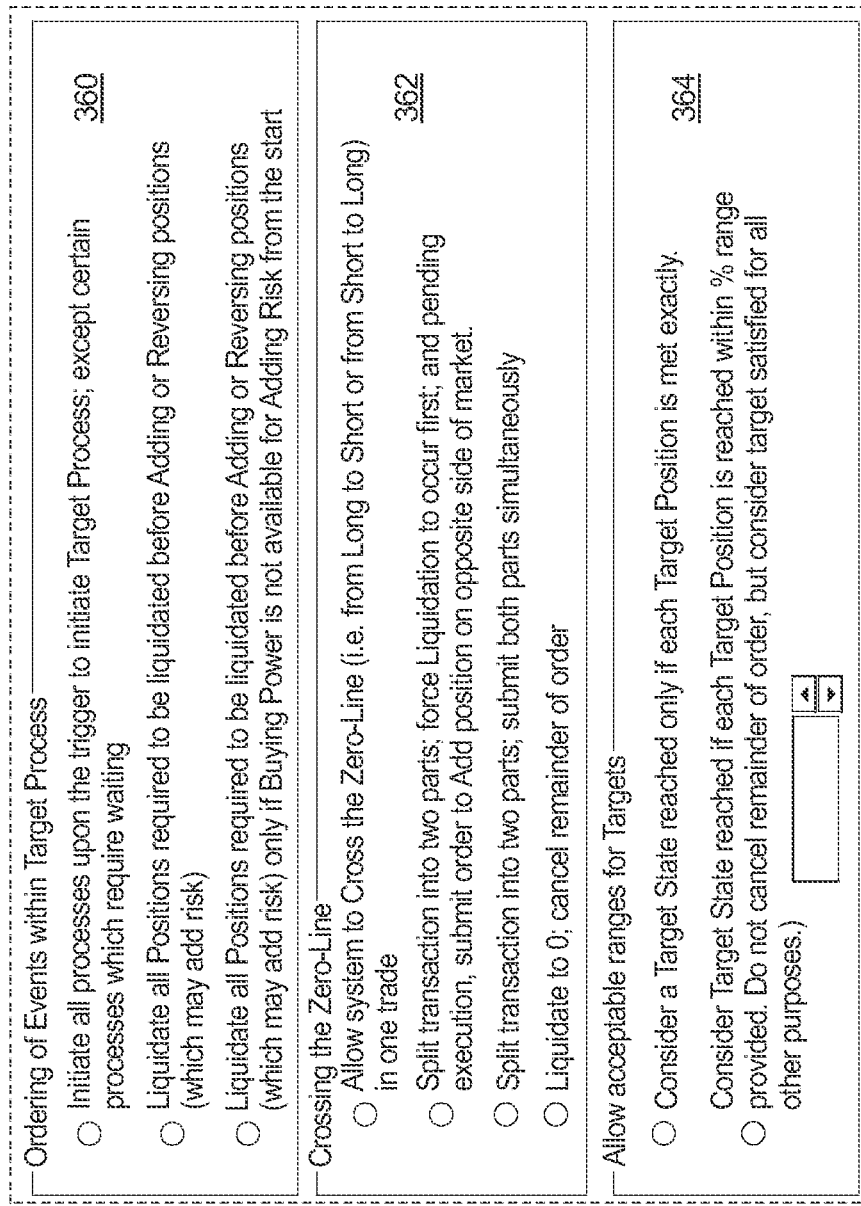
Figure 14G:
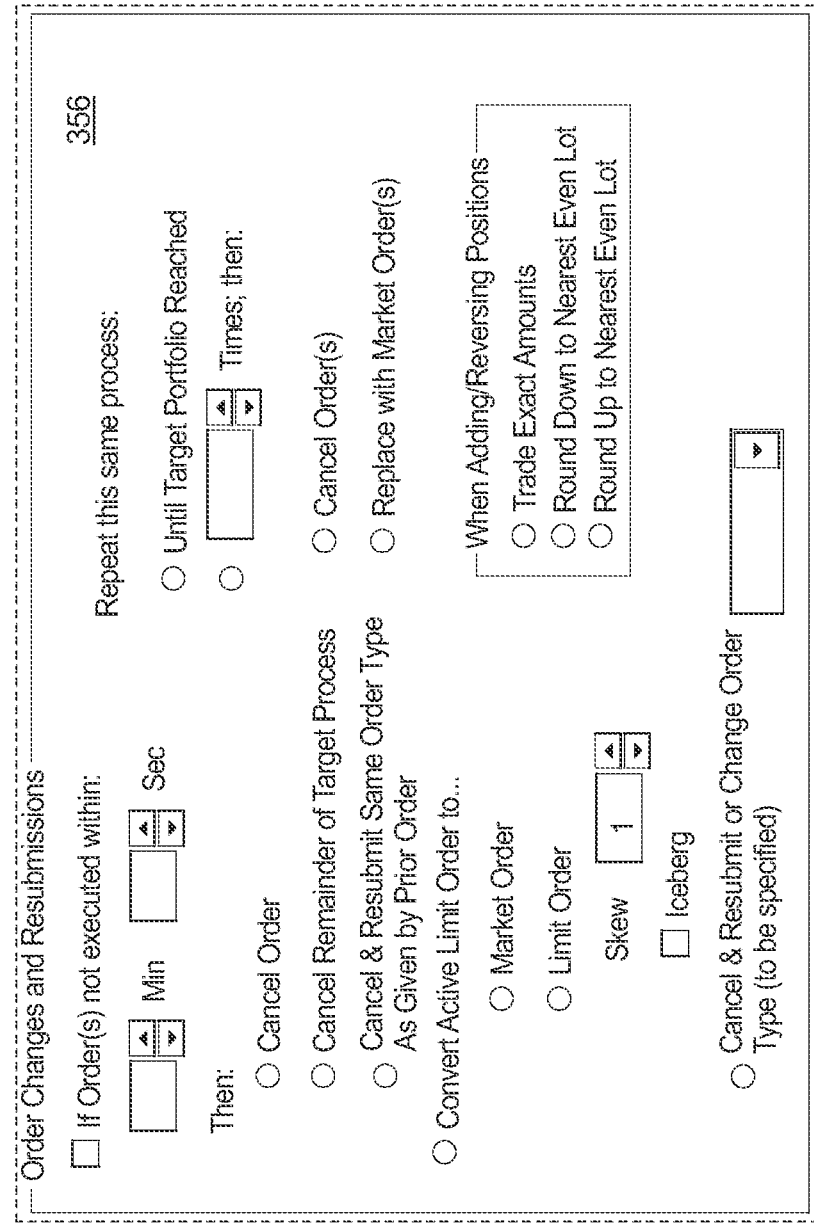
Figure 14H:
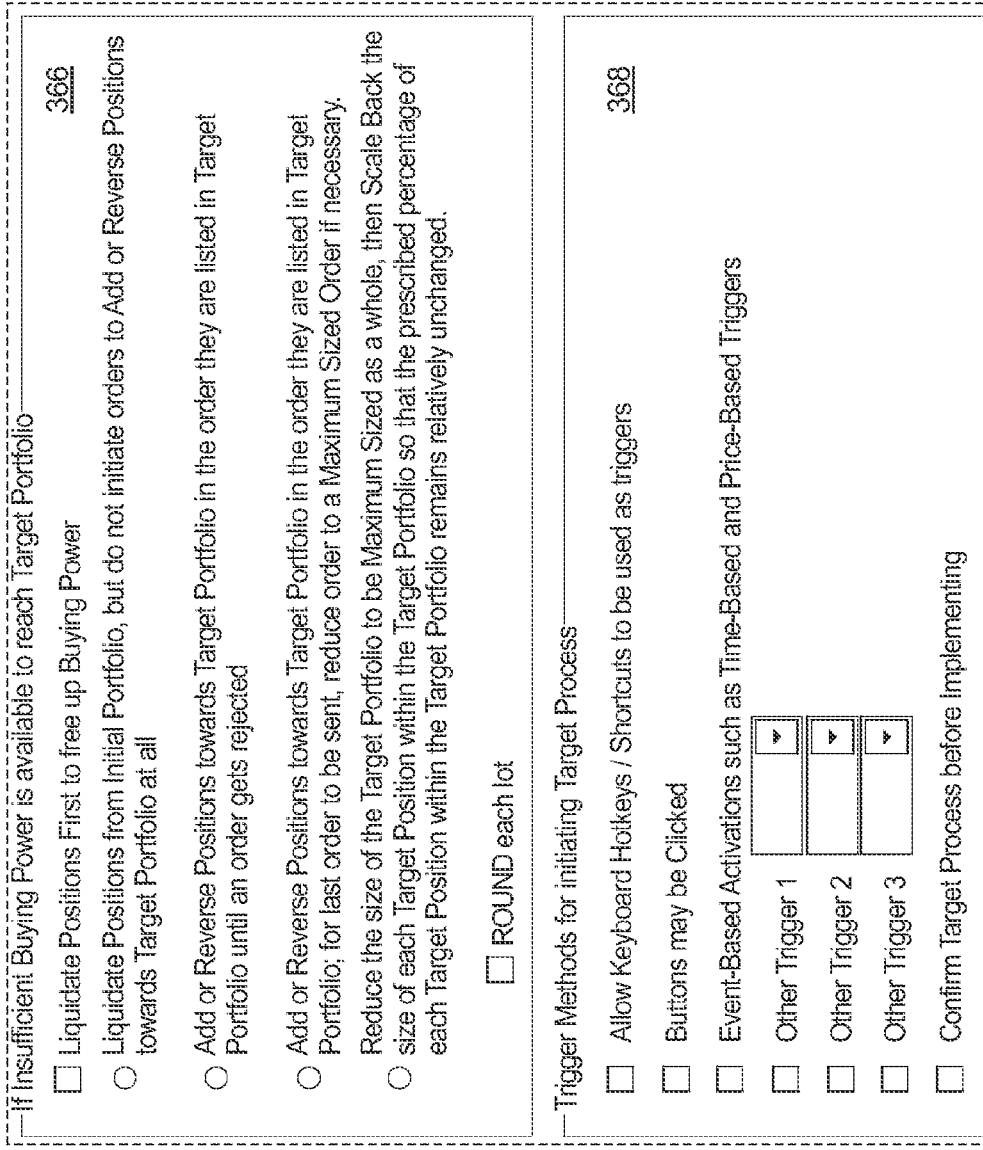

FIG. 6 shows seven examples of the transaction types required to reach a long target position from various initial positions. For each of the seven examples, the type of transaction required is displayed in a "type of transaction required" row 400. Below that, in a "SAME Side of Market" row 402, the derivation of the side of market which is required to reach the long target position from the various initial positions is shown to either be the buy side, the sell side, or no side. Below that, in a "OPPOSITE Side of Market" row 404, the derivation of the side of market which is opposite of that required to reach the long target position from the various initial positions is shown to either be the buy side, the sell side, or no side. In the first two examples seen in the bar chart, we see that the type of transaction required to go from two different negative initial positions to a long target position of four is reverse in both examples, regardless of whether the absolute value of the initial position is greater than, equal to, or less than the value of the target position. We further see that the same side of the market required to reverse to a long target position from a short initial position is the buy side of the market. In other words, if a user wanted to allow orders (and other functions) to be executed on the (same) side of the market required to go to a long target position from a short initial position, buy orders would be required. Further, if a user wanted to allow orders to be executed on the opposite side of the market required to go to a long target position from a short initial position, sell orders would be required. In the third example, we see that if the initial position is flat, the type of transaction required to go to the long target position of four is to add. In the fourth example, we see that if the initial position is long, but of a lesser value than the target position, the type of transaction required to go to the target position is also add. In the fifth example, we see that if the initial position equals the target position, no transaction is required. In the last two examples, we see that if the initial position is larger than the target position, the type of transaction required to reach the target position is liquidate. When a user applies a same or opposite side-selection methodology within a target state process manager 304, or any other macro builder, the same types of determinations as are shown here by example may happen automatically within the trading system 100. As discussed earlier, the same and opposite side-selection methods may also be used for other non-order actions, such as order cancels, order changes, setting of volume amounts, etc.

While in most of the examples discussed herein, the categories for types of transactions discussed are add, reverse, and liquidate, in other embodiments of the invention, categories may be defined differently or broken down in slightly different ways. For example, absolute value may come into play with regards to the reverse type of transaction, as discussed in the previous example with reference to FIG. 6. For instance, a reverse transaction which serves to reduce the overall risk in the account may be of one category, while a reverse transaction which serves to increase the overall risk in the account may be of another category, and lastly a reverse transaction which serves to keep risk the same may be still of another category. In other embodiments of the invention, other categories may exist as well.

Based on the methods discussed herein, if the trader chose to use a same side-selection function in the first four examples of FIG. 6, then even if buy and sell functions were included in a macro after the same side-selection function, the buy functions would be executed while the sell functions would not be executed. If only buy functions were included in the macro, then these functions would be executed. If only sell functions were included in the macro, none of these functions would be executed, at least until the macro ended, or an "allow all functions" function was encountered, etc. Specifically, using the systems and methods described herein, a user may halt the described selective execution of functions during a macro by applying an "allow all functions" command, although this methodology may differ in other systems. In one version of the systems and methods described herein, the selective execution methodologies halt on their own at the end of a macro, at which point all functions are automatically allowed (executed) again, at least until the time in which another side-selection methodology is invoked. Note that if the trader chose to use an opposite side-selection function in the first four examples of FIG. 6, the result is that only sell functions would be allowed (executed) while the buy functions would be disallowed (not executed).

FIGS. 7 and 8 are very similar to FIG. 6. In FIG. 7, the types of transactions required and associated side of market information are displayed; however in FIG. 7, all examples are shown in the context of going towards a short target position from various initial positions. Further in FIG. 8, the types of transactions required and associated side of market information are displayed, however, in FIG. 8, all examples are shown in the context of going towards a flat target position from various initial positions.

FIG. 9 is a chart summarizing the types of transaction required (reverse position, add position, liquidate position and no action) to reach a target position from an initial position. As shown, when the initial position is short and the target position is long, or wherein the initial position is long and the target position is short, the trader must reverse position to reach the target position. When the initial position is flat or less long than a long target position, or where the initial position is flat or less short than a short target position, the trader must add position to reach the target position. When the initial position is longer than a long or flat target position, or where the initial position is shorter than a short or flat target position, the trader must liquidate position to reach the target position. Of course, when the initial position is the same as the target position no action is required to reach the target position.

FIG. 18 is a graphic representation of the various side-selections may be derived in the context of the three mutually exclusive types of transactions (reverse, add, liquidate). As shown, FIG. 18 provides a chart illustrating each of the side-selection results for each combination of choosing either the same side or opposite side of the market and each combination of reverse, add and liquidate. Specifically FIG. 18 shows which functions are allowed and disallowed for each scenario based on the type of transaction and the comparison of the initial position ("I.P") to the target position ("T.P."). Note that if buy or sell functions are permitted (e.g., "Buy Functions Allowed" or "Sell Functions Allowed") for one category (reverse, add, liquidate), then no functions are allowed on the same or other side of the market for the other two categories (reverse, add, liquidate). Further, if buy or sell functions are permitted for one category (reverse, add, liquidate), then the opposing functions are not allowed for the same category (if buys are allowed, sells are not allowed; if sells are allowed, buys are not allowed). Still further, note the opposite side function section of FIG. 18 gives "Sell Functions Allowed" where there are "Buy Functions Allowed" in the corresponding same side function section, and "Buy Functions Allowed" where there are "Sell Functions Allowed" in the corresponding same side function section. As the three types of transactions (reverse, add, liquidate) as shown are mutually exclusive, we see that the combination functions (such as "Choose SAME Side (to Reverse, Add towards Target)" or "Choose OPPOSITE Side (to Add, Liquidate towards Target)") simply add up the mutually exclusive parts. For example, if you ran the "Choose SAME Side (to Reverse towards Target)" function, then a pair of buy/sell functions, and then subsequently ran the "Choose SAME Side (to Add towards Target)" function, then another pair of buy/sell functions, you would get the same result as if you instead ran the "Choose SAME Side (to Reverse, Add towards Target)" function and then the pair of buy/sell functions in one step.

As discussed herein, the systems and methods presented make it easier for traders to trade multiple tradable instruments at the same time, such as by using selective execution methods and/or execution approach. Further, it is noted that when traders place orders for multiple tradable instruments at the same time, they may find they have a need to adjust orders after they have been placed. Using a macro builder, such as described by example herein, or via other processes, users may apply commands to move working orders closer to or farther away from the current market. In this way, if a trader is working one or more orders for tradable instruments on the buy side, and simultaneously working one or more orders for multiple tradable instruments on the sell side, then by applying a "move towards market" (or similar command) for all tradable instruments at the same time, the trader may move all working buy and sell orders closer to the inside market. This would have the effect of simultaneously lowering the limit prices for working sell orders and raising the limit prices for working buy orders. "Move away from market" (or similar commands) would have the opposite effect. Note that these functions may also be used with only one order at a time to have the desired effect, but are simply more powerful when applied to working orders on both sides of the market at the same time.

Using the systems and methods presented herein, users may define the quantity of a target position as a derivative of the current target position quantity. For example, users may define the quantity of a target position to be the current target position quantity multiplied by or divided by a given variable value. In another example, users may define the quantity of a target position to be the current target position quantity plus or minus a given variable value. In a specific example, if a trader has a current target position quantity of 10, which may represent their desire to maintain (or trade around) a core position of 10, then the trader may further have defined an offset value of 20, which may be added to or subtracted from the target (core) position quantity of 10. In this way, trader may trade to a value of negative 10 (10−20) contracts short or positive 30 (10+20) contracts long. This may be performed rather easily using the save/recall methods as described herein in the context of the macro builder. For example, the user may first save the value of 10 as the target position quantity, then add or subtract the offset value of 20 from the target position quantity, then trade to this new target position (of −10 or 30), then recall the prior target position of 10. In this way, the user may trade back and forth between the values of −10 and 30, all while continuing to store the target position quantity of 10 within the platform. Keeping this core position (target) value stored may be of further use, given that the trader may wish to have additional functions, such as a position to trade to the (current) target position quantity of 10. Using the systems and methods described herein, users may not only adjust the target position quantity on a regular basis, but may further adjust an offset to be added to or subtracted from a target position quantity on a regular basis, and may further adjust any value to be used in multiplication, division, or used in any other way to adjust a target position quantity on a regular basis. It is noted that using the systems and methods presented herein, the target position quantity is not required to be based on the value of a current or prior target position, or the user's current position, initial position, prior position, etc. Even though in one example, a user may define a target position to be negative one multiplied by the current target position, or in another example one-third of the current (or initial) position, in other instances, the target position may simply defined independently of other variables, such as a target position quantity of three, or a target position quantity of 10.

In some embodiments of the trading system 100, users may submit functions which allow them to preview orders before the orders are sent to market. This is mainly useful for limit orders. Orders may be first previewed, and then either sent to market or cleared (and not sent to market). Before being sent to market or cleared, orders may be raised or lowered in price, may have quantity raised or lowered, or may have other order conditions applied, unapplied or changed. Orders which are being previewed may also be replaced with another previewed order, thereby clearing the currently stored previewed order from memory. Multiple orders may be previewed concurrently, whether the orders are orders identified towards a target portfolio, or whether the orders serve to reach other trader goals. The preview order methods may be used within macros or other processes involving stacked functions, or may be used standalone.

Using the systems and methods presented herein, users may build and/or implement functions, macros or processes involving stacked functions, such as with a macro builder as discussed herein, such that a tradable instrument which is applied within or referenced by a macro may be a dynamic tradable instrument which will resolve to a value at the time the function, macro or process is executed. In one example, a macro which is written to liquidate a position in an account and reduce order quantity to a minimum may be applied on a "dynamic contract". Then, the trader may assign any one of a variety of different tradable instruments (such as DELL stock, ESZ11 futures, etc) to be this dynamic contract, according to system functionality. Then at the time the function, macro or process is executed, whichever tradable instrument is the one which is currently applied as the dynamic contract (or selected contract, etc), then this is the tradable instrument which will have the macro or other process performed on it. Multiple dynamic contracts may be referred to within one or more macros, with each contract resolving to same or different tradable instruments. In one example, a macro may contain references to two dynamic contracts, such as a macro which liquidates the position on two different contracts. Before the macro is executed by the trader, the trader assigns the first dynamic contract to be the tradable instrument "Crude Oil December 2011 Futures" and assigns the second dynamic contract to be the tradable instrument "Silver September 2011 Futures". When the macro is executed, positions on both of these tradable instruments ("Crude Oil December 2011 Futures", "Silver September 2011 Futures") are liquidated. In some embodiments of the invention, the dynamic contract may be chosen automatically by the trading system 100. Additional examples of methods and systems for managing functions and macros are provided in U.S. patent application Ser. No. 13/228,419, filed on Sep. 8, 2011, the entirety of which is incorporated by reference herein.

In some embodiments of the trading system 100, the target process and/or macros may be automatically triggered based on the status of one or more factors and/or functions. The factors and/or functions may be linked to a data source. The data source may be a market data provider, may be a real-time data link to Microsoft Excel, or any other data source. The data source may supply any type of variable to the trading system 100, such as Boolean or scaled variables, or may communicate with the trading system 100 in another way. The trading system 100 may apply the Boolean, scaled or other variables in such a way that based on the state of these variables, a target process or macro may be triggered. In one example, if a Boolean variable linked from Microsoft Excel changes from a zero to a one, then the trading system 100 may detect this variable change and may further take the action of executing a given target process or macro as discussed herein. The process may involve the target process as discussed, side-selection methodologies as discussed, selective execution as discussed, execution approach as discussed, save/recall methods as discussed, or may involve any of the other methodologies as discussed herein or combinations thereof. The embodiments described herein could be considered event-based activations of the target process, or event-based activations of macros. Further, just as it was discussed previously how the target process could be triggered based on the monitored status of factors and/or functions, the same can now be seen for macros in general. Macros using any one or combination of the methods discussed herein may be triggered not only by direct user-input, but also by event-based activations, which include but are not limited to the changed status of Boolean or scaled variables, changed market conditions, changed user-performance, time of day, etc. In an example of how an event-based trigger triggers a macro, a macro may be triggered based on the trader's profit/loss in the account. If a loss exists, and if that loss exceeds a given value, the macro is triggered. This macro may serve to liquidate the current losing position, reduce the buying power limits and/or buying power boundaries, and optionally lock the buying power limits and/or buying power boundaries. Other examples may involve event-based triggers which invoke macros or other processes unrelated to buying power limits/boundaries or liquidation of positions, such as the changing of default quantity to use for orders. Other methods are included as well but omitted here for simplicity.

Turning now to FIG. 14, an example of the target process specifications manager 306 is provided. Through the target process specifications manager 306, a user may set, adjust and define specifications related to the target process. The first section shown on FIG. 14 is the "method for applying target process specifications" section 338. The examples provided in FIG. 14 may be applicable at various levels (e.g. for all target processes unless overwritten by another assignment, towards a specific one or more target states 208, towards one or more tradable instruments in a target portfolio, towards one or more tradable instruments across target portfolios, etc.) The "method for applying target process specifications" section 338 is used to associate the specifications to the appropriate intended level within the trading system 100. Accordingly the example shown may be adapted in various ways to make the interface more appropriate for the intended level at which the specifications are to be applied, such as using a software wizard.

The remainder of FIG. 14 is the "target process specifications" section 340, where target process specifications are adjustable by a user. In "Identify and/or Execute Orders" section 341, users may choose to identify, identify and execute, or execute orders required to reach a target portfolio from an initial portfolio. The "approach towards target portfolio" section 342 includes user options for controlling selective execution methods for which the trading system 100 should follow when executing the associated target process. Provided in the "approach towards target portfolio" section 342 are the following options: "liquidate positions only from initial portfolio towards target portfolio as a whole," "add positions only from initial portfolio towards target portfolio as a whole," "reverse positions only from initial portfolio towards target portfolio as a whole," "add or reverse positions from initial portfolio towards target portfolio as a whole," "add or liquidate positions from initial portfolio towards target portfolio as a whole," "liquidate or reverse positions from initial portfolio towards target portfolio as a whole," "go from initial portfolio towards target portfolio as a whole no matter what path," and "none of the above; define approach at the target position level." The "approach towards target portfolio" section 342 is similar to the "approach towards target position" section 324 from the target state settings manager 302 shown in FIG. 5. The main difference is that the "approach towards target position" section 324 allowed users to control selective execution methods at the level of the target position, whereas the "approach towards target portfolio" section 342 allows users to control selective execution methods at the level of the target portfolio. Based on the trading system 100 functionality and configurability, both sections 324 and 342 may be used in combination, with one set of rules taking precedence over the other set of rules, when conflicts apply. Alternatively, the functions provided in the examples shown may be implemented in a single user entry form or other interface within the trading system 100. Other embodiments may incorporate other methods of approach towards target position, approach towards target portfolio, etc aside from the levels and methods discussed herein.

In the "handling positions from the initial portfolio not included in target portfolio" section 343, the user is given options for how to specifically handle positions from the initial portfolio not included in the target portfolio. Note that these positions were not handled in the example of the "approach towards target portfolio" section 342, shown in FIG. 14. Shown first in "handling positions from the initial portfolio not included in target portfolio" section 343 is a checkbox that allows the user to specify whether to identify orders for positions included in initial portfolio but not included in target portfolio. Next is a checkbox that allows the user to specify whether to execute orders for positions included in initial portfolio but not included in target portfolio. It is generally to be assumed that orders will typically not be executed unless they are first identified; however that is not necessarily always the case. Whether the orders are in fact identified and/or executed may further be dependent upon settings located elsewhere in the trading system 100 or may be by system-default. If at least one of the checkboxes is selected, then the user may select from the further options provided below. These options allow the user to "cover shorts only," to "sell longs only," or to "cover shorts and sell longs" as part of the liquidation process for positions held in the initial portfolio but not held in the target portfolio. Based on the user's further selections, the user may then select the types of orders which may be applied towards the liquidation of positions from the initial portfolio. Options shown in FIG. 14 are: market orders, limit orders, timed orders, bracket orders, stop limit orders, stop market orders, another order type to be specified by the user, and the allowance for the user to assign groups to tradable instruments, and to then assign order types to groups. Further, it is to be assumed that, based on the order types applied, there may likely be a larger list of options that may be configured within the system. This may best be handled by a software wizard given the large number of order options available, or via other interface options. The numerous variations that may be provided by such an interface will be appreciated by one of ordinary skill in the art based on the descriptions provided herein.

Within the "If Market Closes before Target State has been reached" section 344 shown in FIG. 14, the user is able to assign specifications for how the target process should operate in the situation where the market closes before an assigned target state 208 has been reached. Options provided allow for the remainder of the target process to be cancelled, for the target process to be re-started when the market re-opens, and for the methods to be adjusted to a more passive state, which may be appropriate for after-hours trading. These options and other similar options shown here may be adjustable by a user of the trading system 100, or may be applied by system defaults without user control.

Within the "if market opens after target process has begun" section 346 of FIG. 14, the user is able to assign specifications for how the target process should operate in the situation where the market opens after a target process has begun. This is very similar to the "If Market Closes before Target State has been reached" section 344, although in this case, it can be assumed that the target process was initiated during a pre-market state which usually involves less volume and volatility than is typical during regular market hours. Therefore, once the market opens, the user may wish to change the methods to more aggressive methods than could be implemented during the pre-market hours. This is provided as one of the options, as is the option to cancel the remainder of the target process. In one example of how the "if market opens after target process has begun" section 346 might be applied, a trader may, after the release of a key economic report before the market officially opens, but during the pre-market hours, initiate a target process such that, if the trader may have the trading system 100 automatically attempt to passively build a portfolio during the pre-market, such as only using limit orders, and then, after the market opens, cancel the limit orders and submit market orders towards the target portfolio. All of these processes may be automated as part of the target process. It is noted that even though these sections address examples of scenarios which involve a shift in the environment, such as the market open or market close occurring during the target process, there are other such scenarios for how the environment may change, and the target process may be configured to respond with appropriate adjustments during these changes in environment.

Within the "if an order is rejected by brokerage or exchange" section 348 of FIG. 14, the user is able to configure the specifications for how the target process should operate when an order as part of that process is rejected by a brokerage or exchange. In the examples provided, the remainder of the target process may be cancelled, or the target process may be continued.

Within the "if a loss of connectivity occurs" section 350, a user is able to configure the specifications for how the target process should operate when a loss of connectivity occurs. The user may choose to have the target process pick up where it left off once connectivity is restored, or the user may choose to have the remainder of the target process cancelled. As with each of the sections shown in the example of the target process specifications manager 306 provided, other options may be provided or no options may be provided and the specifications may simply be inherent in the system.

In the "target process configuration" section 352, a user is able control how target processes are configured for use and how target processes may be triggered. Using the first option, the user may configure target processes by specifying the values and settings of target conditions and components of target portfolios, etc., such as by using a target state settings manager 302. Using the second option, users may configure target processes by specifying the path (adjustments applied) to reach each target state 208 via macro programming or other processes, such as was shown in the detailed examples involving a target state process manager 304 and the macro builder. For example, the user may be allowed to assign or adjust the quantity or other components of each target position in a target portfolio by programming a macro or other function to make such assignments or adjustments. The last option shown allows users to control the target processes without specifically storing target portfolios or processes towards target portfolios or components of a target condition state on disk or in memory. Rather, users may execute a command to go to a target state 208, at which point an input box or other input method may be displayed, the user would enter data (such as a target position), and a target process would be initiated. Other target processes which involve user-input at the approximate time a target process is to be initiated or just before the target process is to be initiated fall into this category.

In the "initial order types" section 354, a user is able to control the order types that may be initially sent to market for one or more orders required as part of the target process for orders related to the tradable instruments held in the target portfolio. Recall that orders that serve to handle the liquidation of positions from the initial portfolio but not included in the target portfolio were handled in the "handling positions from the initial portfolio not included in target portfolio" section 343. The "initial order types" section 354 is an area in which it may make particular sense to users to apply different types of orders for different tradable instruments. For example, for a stock trading at $1.00, a one penny spread is one percent of the value of the stock, but for a stock trading at $100.00, a one penny spread is only 0.01% of the value of the stock. Therefore, a user may wish to use market orders for higher priced stocks but more passive limit orders for lower priced stocks. As was discussed in the context of the "method for applying target process specifications" section 338, the target process specifications may be applied in various ways, such as for all target processes, towards a specific one or more target states 208, or towards a specific one or more tradable instruments included in a target portfolio. In the "initial order types" section 354, users may configure all orders required as part of all target processes, all orders towards a specific one or more target portfolios, orders towards one or more tradable instruments in a target portfolio, orders towards one or more tradable instruments across target portfolios, etc. The "initial order types" section 354 may best be organized using a software wizard given its complexity. Also note, the entire "initial order types" section 354 could easily be integrated into the "tradable instrument, side, quantity, approach towards target position" section 316 of the target state settings manager 302 instead of being managed separately within the target process specifications manager 306.

Users may also assign order types to specific groups, to which specific tradable instruments may be assigned by the user, or to which specific tradable instruments may be categorized automatically based on their parameters. For example, tradable instruments may be grouped by their prices, their volatility, their volume, or may be grouped based on a combination of these factors. Further, any assignment of order types to one tradable instrument or one group may overwrite or be overwritten by specifications applied to other components of the target state 208, based on variations of the trading system 100 and variations of the extent of user control provided therein.

Options provided in the "initial order types" section 354 allow the user to apply all types of orders including join BBO (BBO is the best bid or offer), improve BBO, split BBO, take BBO, market orders, timed orders, stop limit and stop market orders, as well as OSO (order sends order)/OCO (order cancels order) and bracket orders. Other order types may be applied as well. Further, any type of order conditions may be applied to orders as well. Shown in the example in FIG. 14, the user may apply offsets to their orders, as well as icebergs to their orders. Other examples may include optional order specifications such as all-or-none, fill-or-kill, etc. Other specialized order types that include a time-component include market-on-open and market-on-close orders. As is further noted, the user may apply any rounding options up or down or may apply the exact amounts as calculated or entered. The title of the rounding options section is shown as "when adding/reversing positions" (which does not include liquidate).

This is simply because in this example it is assumed that when traders need to liquidate their position, they typically liquidate their full position, even if is an odd-lot. It is noted that while may of the order types, such as market orders, shown within the "initial order types" section 354 may bring the user to a target position relatively quickly, other order types, such as stop orders, may not even get triggered within the same day or even the same week or month.

In the "order changes and resubmissions" section 356, a user is able to control what steps the trading system 100 may take if there remain unfilled orders within the trading system 100 after a certain amount of time. For example, the user may use one type of orders initially, as controlled for in the "initial order types" section 354 and "handling positions from the initial portfolio not included in target portfolio" section 343, but after a certain amount of time, if the target portfolio has not been reached, the trading system 100 may cancel one or more of the open orders and re-submit different order types, e.g., more aggressive order types. So, for example, the user might initially submit limit orders, but after 30 seconds, if the target portfolio has not been reached, all open orders may be cancelled, and then, once confirmation of cancels has been received, market orders may be sent immediately intended to bring the user to the target portfolio in quick time. In a further example, there might be more than the two steps of order cancels and re-submission shown in FIG. 14. The steps of which orders are cancelled and replaced versus which orders are left untouched may vary and may be specified in advance within the "order changes and resubmissions" section 356. The types of specifications which may be assigned within the "order changes and resubmissions" section 356 include all of the complex assignment methods as were described in reference to the "initial order types" section 354, as applicable.

As is shown in the "order changes and resubmissions" section 356, the user may optionally choose to run the processes described, or the user may skip these order changes and resubmissions. If the user proceeds, they may specify a number of minutes and/or seconds that must go by for the first order adjustments to be made. The order adjustment options displayed here are cancel order, cancel remainder of target process, cancel and resubmit same order types as given by prior order, convert active limit order to market or limit order, and may adjust the skew of the limit order and optionally apply an iceberg condition. The user may also cancel and resubmit the same order type or may apply a different order type which may be specified by the user. Further, it is shown how the user may repeat the described process just outlined until the target portfolio is reached or a certain number of times, at which point the order(s) may be cancelled or replaced with market orders(s). As is further noted, the user may apply any rounding options up or down or may apply the exact amounts as calculated or entered. The title of the rounding options section is shown as "when adding/reversing positions" this is simply because in this example it is assumed that when traders need to liquidate their position, they typically liquidate their full position, even if is an odd-lot.

In the "ordering of events within target process" section 360, the user is able to manage the ordering of events within the target process. The first option displayed in FIG. 14 allows the user to direct the trading system 100 to initiate all processes upon the trigger to initiate a Target Process, except certain processes which require waiting. The second option allows the user to direct the trading system 100 to liquidate all positions required to be liquidated as part of the target process before adding or reversing positions towards the target portfolio which may add risk. The last option is similar to the second option, except in this scenario the trading system 100 would only wait to add or reverse positions (which may add risk) if buying power is not available for adding risk from the start; i.e., right upon the trigger of the target process.

Some trading platforms for tradable instruments do not allow a trader to cross over from short to long positions or from long to short positions in a single transaction, which we refer to herein as crossing the zero-line. Restrictions on this activity often exist in equity trading platforms. In the "crossing the zero-line" section 362, the trading system 100 allows for user-specification over how to handle scenarios where the zero-line could be crossed. In the "crossing the zero-line" section 362, users may choose from a few options: (1) to allow the system to cross the zero-line (e.g., from long to short or from short to long) in one trade; (2) to split the transaction into two parts: force liquidation to occur first; and pending execution, submit order to add position on opposite side of market; (3) to split transaction into two parts; submit both parts simultaneously; or (4) to only liquidate to a flat position and cancel the remainder of the transaction (the part which would add a position on the opposite side of the market).

Accordingly, the target process may be configured to implement various methodologies with respect to crossing the zero-line. Even though this information is shown being provided in the target process specifications manager 306, these controls may be inherent in the trading platform, without being configurable by users. This may be due to industry regulations or departments specific to brokerage firms who regulate the platform methodologies internally. The options taught herein may only be available to the extent that they are approvable by the appropriate regulators.

In one example of when a trader chooses to cross the zero line by splitting the transaction into two parts, and assuming the trader has a prescribed target of five contracts long and an initial position size of sixteen contracts short, the trigger of a target process may first buy sixteen contracts to bring the trader to zero and then, once the confirmation of the first buy order being executed has been received, a second buy order of five contracts may be processed. While merely one example, it is shown that a target state 208 that contains only a single target position in the target portfolio may involve numerous steps.

As is shown in the "Allow acceptable range for Targets" section 364, specifications provided for a target state 208 may include prescribing an acceptable range for one or more target positions included in the target portfolio, and/or an acceptable range for the target portfolio as a whole. In one example, a target position for one tradable instrument is specified by a value of $10,000, with an acceptable range being specified as five percent. Accordingly, if the execution of a target process brings the trader's position to be valued at $9,650, then the target position condition may be considered to be satisfied. Exactly what it means that the target position may be considered to be satisfied may be specific to the target position, target portfolio or target state 208, and may be adjustable by the user.

Whether or not a target position is considered satisfied, or whether or not a target state 208 is considered satisfied with respect to its components, may determine the behavior of other parts of a target process. For example, if the trader's target position has only reached $9,650 but is considered satisfied, then the "order changes and resubmissions" section 356 may cease to cancel and resubmit orders with respects to the target positions that are within their acceptable ranges. In order to appreciate the value of whether a target position or target state 208 is considered satisfied, consider an example in which there was no acceptable range, but the condition must be met precisely. Let's assume that a trader has filled 9,900 shares of a 10,000 share order. If the target process did not allow for an acceptable range, the 100 remaining shares may be cancelled and resubmitted at another price due to settings applied in the "order changes and resubmissions" section 356. If the brokerage charged the customer for every trade, then it might cost the trader an extra $10 just to improve the pricing for the remaining 100 shares. It may be seen how this will save the trader in commissions when they are already materially close enough to their target position(s). As can be appreciated, the target process may be extremely complicated, and configurations may be made to enormous levels of detail to handle all of the various types of situations that may arise. Moreover, the configuration of the details, such as those controlled in the "Allow acceptable range for Targets" section 364 may have a profound impact on user profitability. Other affects of the settings applied within the "Allow acceptable range for Targets" section 364 may involve sections "If Market Closes before Target State has been reached" section 344, "if market opens after target process has begun" section 346, etc., where those sections may not change trading methods to passive or aggressive if a target position is already within its acceptable range. Other examples are omitted for simplicity.

In the "if insufficient buying power is available to reach target portfolio" section 366, users are able to control how the trading system 100 responds when insufficient buying power is available to reach the target portfolio during a target process. The first option given to the user is a checkbox, which allows the user to specify that the target process liquidate positions first to free up buying power. It is understood that only when all positions have been liquidated would the target process continue to handle further orders, if they are to be processed at all. Shown next in the "if insufficient buying power is available to reach target portfolio" section 366 are four options. With the first option, positions would be liquidated from the initial portfolio towards the target portfolio, but no orders to add or reverse positions towards the target portfolio would be implemented at all. With the second option, positions would be added or reversed towards the target portfolio in the order they are listed in the target portfolio, such as the order in which they are shown in the target portfolio 315, until an order gets rejected. For the third and fourth options provided, the trading system 100 would allow the user to choose to scale back the quantities which would be applied to orders which have the effect of adding positions or reversing positions towards one or more target positions in the target portfolio. The third option would continue to send the prescribed order sizes for every target position in the target portfolio until it reached an order that would be rejected due to buying power constraints; for this last order, the order size would be reduced to a maximum sized order, i.e., the largest sized order that the system could send for the tradable instrument that would successfully pass through the software, brokerage and exchange without getting rejected due to the buying power limits. The fourth option would reduce the size of the target portfolio to be maximum sized as a whole, then would scale back the size of each target position within the target portfolio so that the prescribed percentage of each target position within the target portfolio remains relatively unchanged. In an example of this fourth option, if a trader triggered the target process, in which case the initial portfolio was empty and in which the target state 208 contained a target portfolio of 40 contracts of crude oil and 20 contracts of heating oil, and also in which case only one half of the required buying power was available, then the position sizes could be reduced from 40 to 20 contracts of crude oil, and 20 to 10 contracts of heating oil. In this fourth option, as much of the buying power that is available is used, and the quantities of each position to be held in the target portfolio are all scaled back so that the percentage weighting of each target position in the target portfolio remains unchanged. Other methods exist for handling these types of situations, but will be left out of this example for sake of clarity. As can be seen in the "if insufficient buying power is available to reach target portfolio" section 366, there may be an option to apply round lots when applicable. As described above, there may be scenarios in which the submission of maximum sized orders may be beneficial to the user. Additional description of systems and processes for executing maximum sized orders is provided in U.S. patent application Ser. No. 13/005,520, filed on Jan. 12, 2011, the entirety of which is incorporated herein by reference.

In "trigger methods for initiating target processes" section 368 the user is able to assign trigger methods used to initiating the target process. Options provided to the user are for keyboard hotkeys/shortcuts to be used, for buttons to be clickable, for event-based triggers such as time-based and price-based triggers of the target process, as well as other triggers. Further, the user may choose to turn confirmations on or off for a target process before it runs.

It should be noted that all of the components included in the target process specifications manager 306 as shown in the example in FIG. 14 may be settings applied within the trading system 100 without being adjustable or assigned by a user. Further, many variations of the functionality displayed in FIG. 14 may be implemented. Further, many of settings may be applied to other areas of the trading system 100, such as within the target state settings manager 302, the target state process manager 304, or another component of the described trading system 100. Many of specifications shown in FIG. 14 might better be applied using a software wizard, given their complexity as well as the interaction between many of the specifications and related settings and processes.

Figure 15:
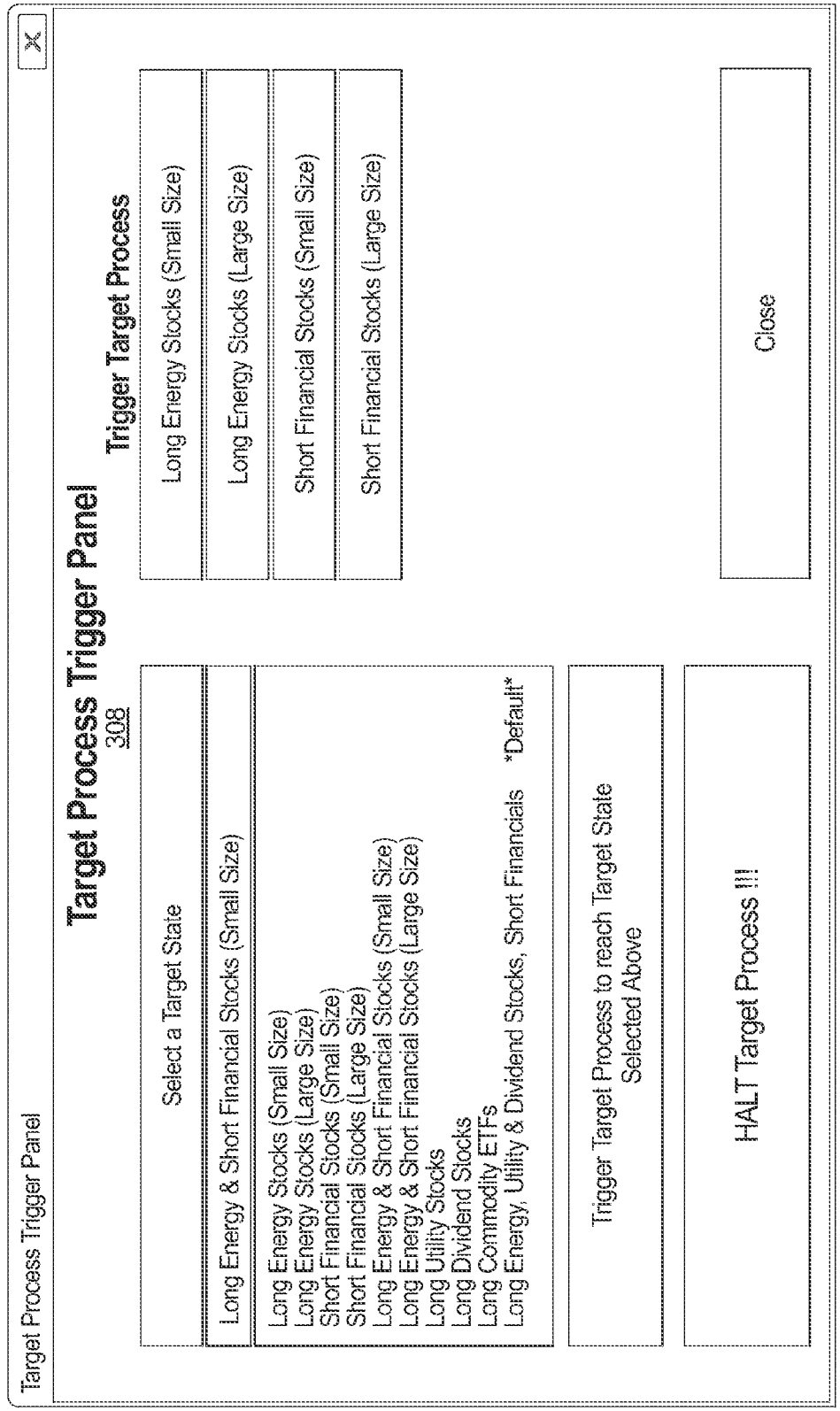
FIG. 15 is a representative example of a target process trigger panel.

FIG. 15 displays an example of a target process trigger panel 308. The target process trigger panel 308 shown in FIG. 15 provides various buttons through which a user may trigger different target processes. On the left side of FIG. 15, the user is able to select any of the saved target states 208 by highlighting a target state 208 from the list box shown, and then by pressing the "Select a Target State" button. The user may then trigger a target process to the selected target state 208 by pressing the button which reads "Trigger Target Process to reach Target State Selected Above." On the right side of FIG. 15, users are able to trigger target processes to go to the target state 208 identified by the various buttons without first having to select a target state 208. The trading system 100 may include either and/or both of the types of triggers illustrated in FIG. 15. Of course, additional triggers and types of triggers may be provided as well. On FIG. 15 there is also provided functionality allowing users to halt the target processes while it is operating. Note that designs other than the design shown in FIG. 15 may be used within a target process trigger panel 308, and the designs may incorporate other types of user-inputs to trigger a target process as discussed in the "trigger methods for initiating target processes" section 368 or elsewhere.

As discussed in the "trigger methods for initiating target processes" section 368, other trigger methods may be used for initiating a target process and, even though these other methods may not require a user interface for triggering the process such as is shown in FIG. 15, they may still require a user interface for properly defining the triggers. In one example, hotkeys/shortcuts may be used to trigger the target process.

In addition to user triggered target processes, the trading system 100 may be adapted to initiate a target process in response to one or more event-based triggers. In FIG. 16, an example of a target process trigger manager 309 is provided. The target process trigger manager 309 enables the user to configure event-based triggers for target processes. As is shown in the "event-based triggers setup" section 370 of FIG. 16, some of the different triggers may be price-based triggers, time-based triggers, or other triggers. In the "event-based trigger rules applied to trigger target process" section 372, there may be an unlimited list of event-based trigger rules applied to trigger a target process. Further, the event-based trigger rules may be associated by one or more relationships, such as "AND" and "OR." This way, users may specify if they would require only one, more than one, or all of the specified event-based trigger rules to be required to trigger a target process. As can also be seen in FIG. 16, the user may assign the event-based trigger rules to any target state 208 by pressing the "Apply to Selected Target State" button. In the example shown in FIG. 16, the user may select any of the target states 208 in the list at the top, and the currently applied event-based triggers may populate sections 370 and 372 with the saved specifications. The event based triggers may be developed similarly to the functions described in U.S. patent application Ser. No. 13/046,677, with the conditional logic based example provided herein merely one example of the complex functions that may be used for event-based triggers in the trading system 100.

Turning now to FIG. 17, an example of a target process summary panel 310 is provided. The target process summary panel 310 allows users to see how the steps of the target process will unfold, how they are currently unfolding and/or how they have already unfolded. The target process summary panel 310 may be viewed prior to the start of a target process, during a target process and/or after a target process has completed. In the top section of FIG. 17, "Initial State" section 406 and "Target State" section 408 are shown. Users may see in the "Initial State" section 406 which initial positions exist or existed within the initial portfolio before the initiation of the target process, as well as which open orders exist or existed. In the "Target State" section 408, users may see which target positions are included in the target portfolio, as well as which open orders and other conditions exist as part of the target state 208. In the example shown in FIG. 17, there are multiple target conditions that exist as part of the target state 208, including the setting of long and short buying power limits, the adjustment of volume for futures orders to a minimum, the opening of a workspace for energy and financial stocks so that the user is prepared to view market data pertinent to the target portfolio, the movement of the mouse location on the screen to a centralized location on one of the monitors and the turning off of the hotkeys. In other examples, an entirely different set of other target conditions as part of a target state 208 may be applied.

In the "orders identified as part of target process" section 410, a list of identified orders is shown. The identified orders shown are based on the difference between the positions in the initial portfolio and target portfolio, as well as by user-settings discussed earlier, such as whether positions included in the initial portfolio but not included in the target portfolio should be liquidated. Also included in the "orders identified as part of target process" section 410 are sections for the initial orders to place as well as subsequent orders to place (pending initial fills). As can be seen in this example, there is one buy order (for tradable instrument CVS) included in the list of subsequent orders to place. Note that this tradable instrument is also listed in the initial orders to place section, but in a buy to cover order. As can be seen in the list of orders required section, CVS is listed two times. This example is shown this way as an example of what might happen in the case where a platform does not allow a user to cross the zero-line. In this example, the user was not able to go from short to long in one order, so the order was automatically split into two parts, first a buy to cover order, and then a buy order. As can be further seen in the "orders required as part of target process" section 410, a summary is provided. This summary provides information regarding the number of trades required for initial and subsequent trades, the total shares required, as well as information related to commissions and fees. Additional or alternate information may be provided in the summary as may be useful for users of the trading system 100.

The "progress summary of target process" section 412 shows the progress of the target process. As is seen in the target process messages section, messages regarding orders that have been placed, as well as their real-time status updates are shown. Further shown is a list of completed changes in position, and a list of changes in position which are pending orders to be executed. Also shown are other steps in the target process that have been completed, and other steps in the target process which are pending completion. Also shown in the "progress summary of target process" section 412 is a target process summary, where users can see how many trades have been executed, how many trades are pending execution and how many trades have partial fills. Further detail is shown regarding the number of shares that have been traded, the percent of shares that have been executed, as well as other detail on commission and fees. Shown last on FIG. 17 is a "buying power" section 414. The "buying power" section 414 shows detail regarding the buying power available before the target process is initiated, the buying power available after the completion of the target process, as well as the expected change in buying power as a result of the target process.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A method of reaching one or more target positions in a user-directed trading system comprising the steps of:
    identifying one or more target positions, wherein each target position includes a tradable instrument identifier and a target quantity;
    for at least one of the target positions, identifying a corresponding initial position including a current quantity associated with the tradable instrument identifier; and
    triggering the trading system to identify one or more orders required to reach at least one target position from at least one initial position; and
    triggering the trading system to execute one or more of the orders identified as being required to reach the at least one target position from the at least one initial position,
    wherein the trading system is configured to take a selected execution approach in executing the one or more of the orders identified as being required to reach the at least one target position from the at least one initial position,
    wherein the selected execution approach is based on a tradable instrument state of at least one tradable instrument associated with the one or more of the orders identified as being required to reach the at least one target position from the at least one initial position, wherein the tradable instrument state setting is configured to be on or off,
    wherein the selected execution approach is selected from a group of execution approaches including an execution approach in which only those orders identified as being required to reach the target positions from the initial positions for which the tradable instrument state of the tradable instrument is on will be executed.

2. The method of claim 1 wherein the one or more target positions further identify the side of market.

3. The method of claim 1 wherein the one or more initial positions further identify the side of market.

4. The method of claim 1 wherein the execution approach is selected from the group consisting of:
the one or more of the orders identified as being required to reach the target positions from the initial positions will be executed if the tradable instrument state of the tradable instrument associated with each target position is on, if not, none of the one or more of the orders identified as being required to reach the target positions from the initial positions will be executed;
only those orders identified as being required to reach the target positions from the initial positions for which the tradable instrument state of the tradable instrument is on will be executed; and
the one or more of the orders identified as being required to reach the target positions from the initial positions will be executed regardless of whether or not the tradable instrument state of the tradable instrument associated with the target position is on for each of the one or more target positions.

5. The method of claim 1 wherein each target position further includes an approach towards target position condition, wherein the approach towards target condition position is any combination of approaches selected from the group consisting of liquidate, add, and reverse.

6. The method of claim 1 wherein the one or more orders required to reach at least one target position from at least one initial position include at least one order to add a position to a non-zero quantity initial position, wherein the non-zero quantity initial position has the same tradable instrument identifier as the target position.

7. The method of claim 1 wherein the one or more orders required to reach at least one target position from at least one initial position include at least one order to reverse a non-zero quantity initial position to a non-zero quantity target position, wherein the absolute value of the quantity of the initial position is not equal to the absolute value of the quantity of the target position.

8. The method of claim 1 wherein the one or more orders required to reach at least one target position from at least one initial position include at least one order to liquidate an initial position to a non-zero quantity target position, wherein the non-zero quantity target position has the same tradable instrument identifier as the initial position.

9. The method of claim 1 further including the step of triggering the trading system to selectively execute one or more of the orders identified as being required to reach at least one target position from at least one initial position.

10. The method of claim 9 wherein the selective execution is based on any combination of categories selected from the group consisting of order, order type, type of transaction, tradable instrument state, and exchange state.

11. The method of claim 1 wherein one or more of the target positions are user defined.

12. The method of claim 11 wherein the one or more of the target positions are defined by one or more functions provided in the trading system.

13. The method of claim 1 wherein the triggering the trading system to identify one or more orders required to reach at least one target position from at least one initial position is based on a user input trigger.

14. The method of claim 1 wherein the triggering the trading system to identify one or more orders required to reach at least one target position from at least one initial position is based on an event based trigger.

15. A user-directed trading system comprising:
a user interface; and
a controller directed through the user interface, wherein the controller is adapted to:
identify one or more target positions, wherein each target position includes a tradable instrument identifier and a target quantity;
for at least one of the target positions, identify a corresponding initial position including a current quantity associated with the tradable instrument identifier; and
identify one or more orders required to reach at least one target position from at least one initial position; and
trigger the trading system to execute one or more of the orders identified as being required to reach the at least one target position from the at least one initial position,
wherein the trading system is configured to take a selected execution approach in executing the one or more of the orders identified as being required to reach the at least one target position from the at least one initial position,
wherein the selected execution approach is based on a tradable instrument state of at least one tradable instrument associated with the one or more of the orders identified as being required to reach the at least one target position from the at least one initial position, wherein the tradable instrument state setting is configured to be on or off,
wherein the selected execution approach is selected from a group of execution approaches including an execution approach in which only those orders identified as being required to reach the target positions from the initial positions for which the tradable instrument state of the tradable instrument is on will be executed.

16. The trading system of claim 15 wherein the controller is further adapted to provide, through the user interface, a process manager through which a user defines a process for identifying the orders required to reach at least one target position from at least one initial position.

17. The trading system of claim 15 wherein the controller is further adapted to provide, through the user interface, a settings manager through which a user defines one or more conditions of a target state, wherein the target state includes the one or more target positions.

18. The trading system of claim 15 wherein the controller is further adapted to provide, through the user interface, a target process specifications manager through which a user may manage specifications related to the identification of orders required to reach at least one target position from at least one initial position.

19. The trading system of claim 15 wherein the execution approach is selected from the group consisting of:
the one or more of the orders identified as being required to reach the target positions from the initial positions will be executed if the tradable instrument state of the tradable instrument associated with each target position is on, if not, none of the one or more of the orders identified as being required to reach the target positions from the initial positions will be executed;
only those orders identified as being required to reach the target positions from the initial positions for which the tradable instrument state of the tradable instrument associated with the target position is on will be executed; and
the one or more of the orders identified as being required to reach the target positions from the initial positions will be executed regardless of whether or not the tradable instrument state of the tradable instrument associated with the target position is on for each of the one or more target positions.

20. A user-directed trading system comprising:
a user interface; and
a controller directed through the user interface, wherein the controller is adapted to:
identify an initial portfolio including one or more initial positions, wherein each initial position includes a tradable instrument identifier and a target quantity;
identify a first target portfolio including one or more target positions, wherein each target position includes a tradable instrument identifier and a target quantity;
identify a second target portfolio including one or more target positions, wherein each target position includes a tradable instrument identifier and a target quantity, wherein at least one tradable instrument identifier or one target quantity is different between each of the initial portfolio, the first target portfolio, and the second target portfolio;
provide a simultaneously available independent trigger for trading to each of the first target portfolio and the second target portfolio such that, in response to receiving a trigger command to trade to either the first target portfolio or the second target portfolio, the controller executes any actions required to trade from the initial portfolio to the target portfolio to which the trigger command corresponds.

21. The trading system of claim 20 wherein the received trigger command is manually triggered by a user.

22. The trading system of claim 20 wherein the received trigger command is an event based trigger.

* * * * *